(12) United States Patent
Yu et al.

(10) Patent No.: US 8,861,191 B1
(45) Date of Patent: Oct. 14, 2014

(54) APPARATUS RELATED TO A STRUCTURE OF A BASE PORTION OF A COMPUTING DEVICE

(71) Applicant: Google Inc., Mountain View, CA (US)

(72) Inventors: Michelle Yu, Oakland, CA (US); Ji Heun Lee, Sunnyvale, CA (US); Jeffrey Hayashida, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/041,629

(22) Filed: Sep. 30, 2013

(51) Int. Cl.
*G06F 1/16* (2006.01)

(52) U.S. Cl.
CPC ................................. *G06F 1/1601* (2013.01)
USPC ............. 361/679.27; 361/679.06; 361/679.26

(58) Field of Classification Search
USPC ................................................... 361/679.27
See application file for complete search history.

(56) References Cited

U.S. PATENT DOCUMENTS

| | | | |
|---|---|---|---|
| 4,823,863 A | 4/1989 | Nakajima et al. | |
| 5,379,183 A | 1/1995 | Okonsky et al. | |
| 5,483,418 A | 1/1996 | Hosoi | |
| 5,981,085 A | 11/1999 | Ninomiya et al. | |
| 6,104,604 A | 8/2000 | Anderson et al. | |
| 6,269,864 B1 | 8/2001 | Kabadi | |
| 6,459,591 B2 * | 10/2002 | Liu | 361/756 |
| 6,801,268 B2 | 10/2004 | Huang | |
| 6,826,040 B2 * | 11/2004 | Wang | 361/679.02 |
| 7,161,809 B2 | 1/2007 | Ford et al. | |
| 7,292,441 B2 | 11/2007 | Smalc et al. | |
| 7,349,040 B2 | 3/2008 | Lee et al. | |
| 7,626,807 B2 | 12/2009 | Hsu | |
| 7,778,016 B2 | 8/2010 | Minaguchi et al. | |
| 7,869,205 B2 * | 1/2011 | Chin | 361/679.34 |
| 7,960,913 B2 | 6/2011 | Yee et al. | |
| 7,990,693 B2 | 8/2011 | Nakajima | |
| 8,027,156 B2 | 9/2011 | Kobayashi et al. | |
| 8,089,758 B2 * | 1/2012 | Zhu et al. | 361/679.58 |
| 8,092,908 B2 | 1/2012 | Ohta et al. | |

(Continued)

FOREIGN PATENT DOCUMENTS

| | | |
|---|---|---|
| EP | 515664 B1 | 3/1999 |
| EP | 1145074 B1 | 9/2002 |

(Continued)

OTHER PUBLICATIONS

Non-Final Office Action for U.S. Appl. No. 14/041,466, mailed Dec. 30, 2013, 16 pages.

(Continued)

*Primary Examiner* — Anthony Q Edwards
(74) *Attorney, Agent, or Firm* — Brake Hughes Bellermann LLP

(57) ABSTRACT

In one general aspect, an apparatus can include a display portion, a base frame coupled to the display portion where the base frame includes a channel defined by a top wall opposite a bottom wall and a side wall coupled to the top wall and to the bottom wall. The side wall can have an outer surface defining at least a portion of an outer perimeter of the base frame. The channel can have a first portion on a first side of the base frame and a second portion on a second side of the base frame opposite the first side of the base frame. The apparatus can include a midplane having a first edge disposed in the first portion of the channel and having a second edge disposed in the second portion of the channel.

25 Claims, 52 Drawing Sheets

(56) References Cited

U.S. PATENT DOCUMENTS

| | | | |
|---|---|---|---|
| 8,199,469 B2 | 6/2012 | Coish et al. | |
| 8,270,914 B2 | 9/2012 | Pascolini et al. | |
| 8,339,775 B2 * | 12/2012 | Degner et al. | 361/679.09 |
| 8,350,984 B2 | 1/2013 | Perry et al. | |
| 8,372,495 B2 | 2/2013 | Kenney | |
| 8,374,378 B2 | 2/2013 | Hopkinson et al. | |
| 8,432,509 B2 | 4/2013 | Bergeron et al. | |
| 8,437,125 B2 * | 5/2013 | Jorgensen et al. | 361/679.27 |
| 8,467,195 B2 | 6/2013 | Zaitsu | |
| 8,537,530 B2 | 9/2013 | Murakami et al. | |
| 8,564,841 B2 | 10/2013 | Gil | |
| 2003/0011986 A1 | 1/2003 | Ariga | |
| 2004/0000048 A1 | 1/2004 | Wu | |
| 2004/0125268 A1 | 7/2004 | An | |
| 2007/0109737 A1 | 5/2007 | Kriege et al. | |
| 2008/0112119 A1 | 5/2008 | Wang et al. | |
| 2009/0279238 A1 | 11/2009 | Kobayashi et al. | |
| 2011/0043995 A1 | 2/2011 | Chen et al. | |
| 2011/0090630 A1 | 4/2011 | Bergeron et al. | |
| 2011/0116217 A1 | 5/2011 | Lee et al. | |
| 2011/0216488 A1 | 9/2011 | Perry et al. | |
| 2013/0009828 A1 | 1/2013 | Pascolini et al. | |
| 2013/0009898 A1 | 1/2013 | Mathew et al. | |
| 2013/0037228 A1 | 2/2013 | Verschoor et al. | |
| 2013/0070399 A1 | 3/2013 | Liu et al. | |
| 2013/0093657 A1 | 4/2013 | Song et al. | |
| 2014/0043744 A1 * | 2/2014 | Matsuoka et al. | 361/679.09 |

FOREIGN PATENT DOCUMENTS

| | | |
|---|---|---|
| EP | 1378926 A2 | 1/2004 |
| EP | 1519217 A1 | 3/2005 |
| EP | 1754993 B1 | 12/2008 |
| EP | 1620953 B1 | 4/2009 |
| EP | 2154109 A1 | 2/2010 |
| WO | 03001133 A2 | 1/2003 |
| WO | 2005048298 A2 | 5/2005 |
| WO | 2006033808 A2 | 3/2006 |
| WO | 2006132695 A2 | 12/2006 |
| WO | 2010005435 A1 | 1/2010 |

OTHER PUBLICATIONS

Restriction Requirement for U.S. Appl. No. 14/041,496, mailed Jan. 15, 2014, 6 pages.

Notice of Allowance for U.S. Appl. No. 14/041,466, mailed Apr. 23, 2014, 12 pages.

Notice of Allowance for U.S. Appl. No. 14/041,453, mailed Apr. 29, 2014, 10 pages.

Office Action Response for U.S. Appl. No. 14/041,496, filed Mar. 10, 2014, 2 pages.

Office Action Response for U.S. Appl. No. 14/041,466, filed Mar. 31, 2014, 10 pages.

Non-Final Office Action for U.S. Appl. No. 14/041,496, mailed May 23, 2014, 20 pages.

* cited by examiner

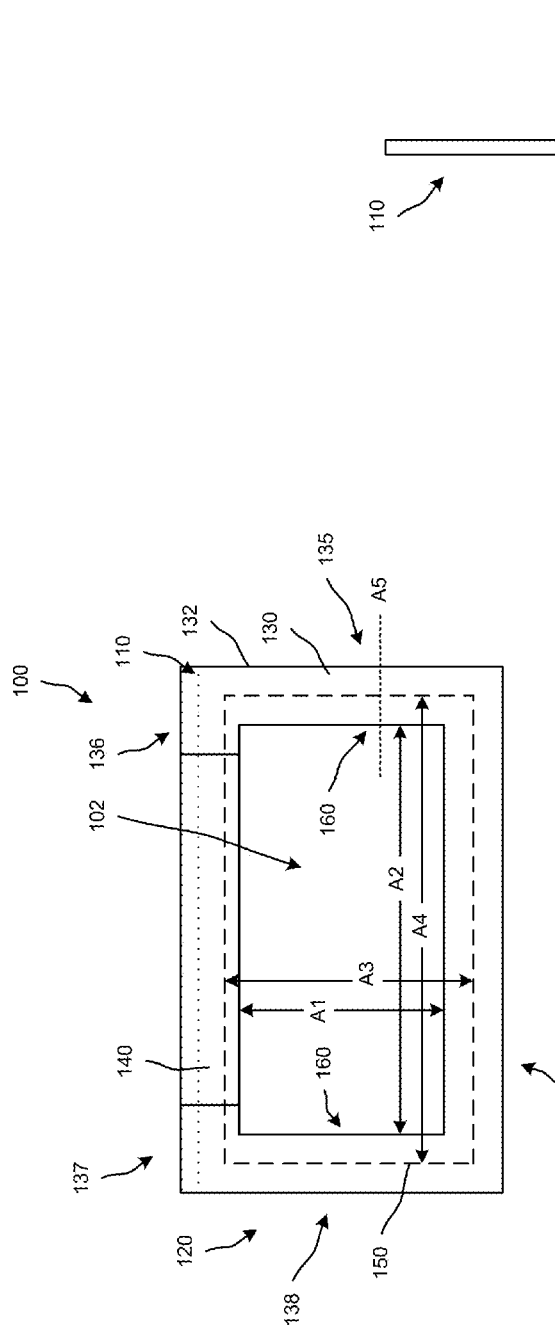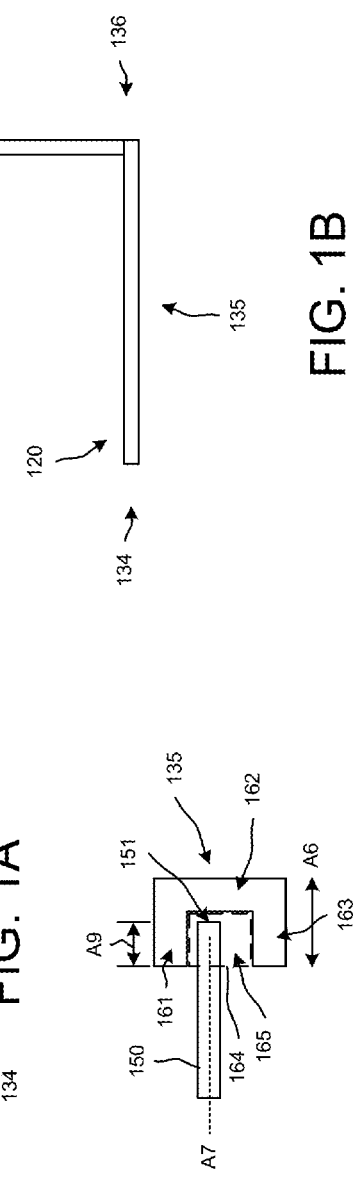

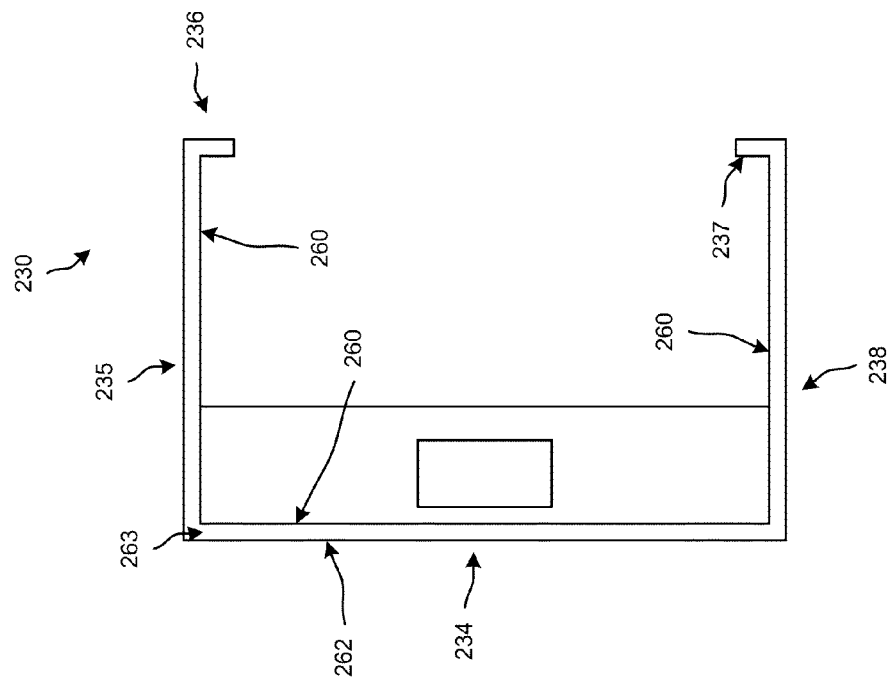
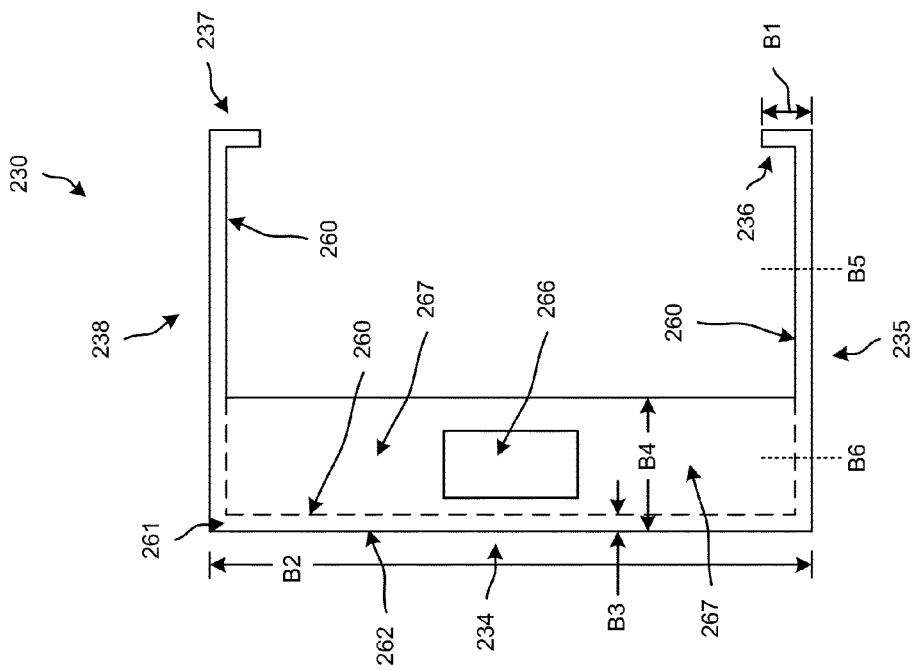
FIG. 2A
FIG. 2B

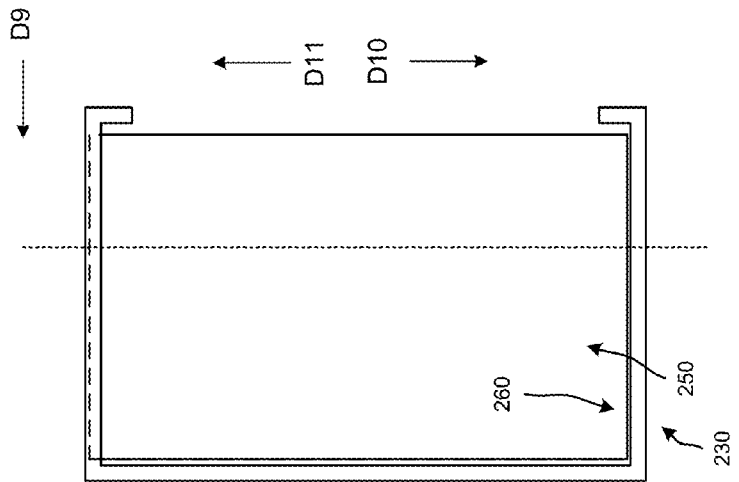
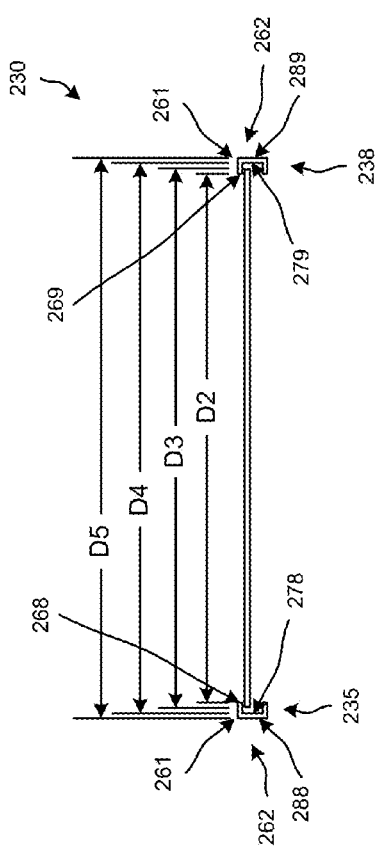
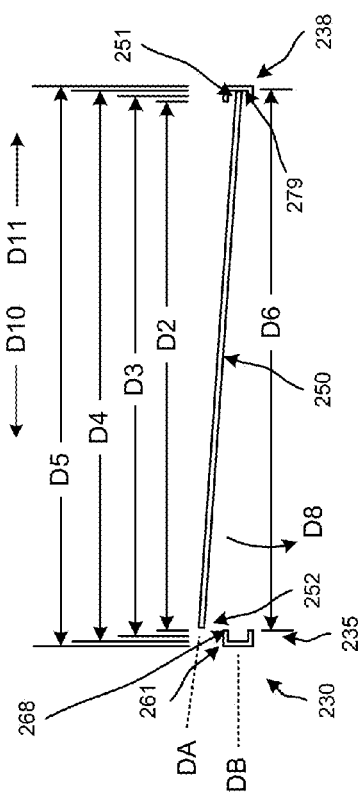
FIG. 3D
FIG. 3B
FIG. 3C

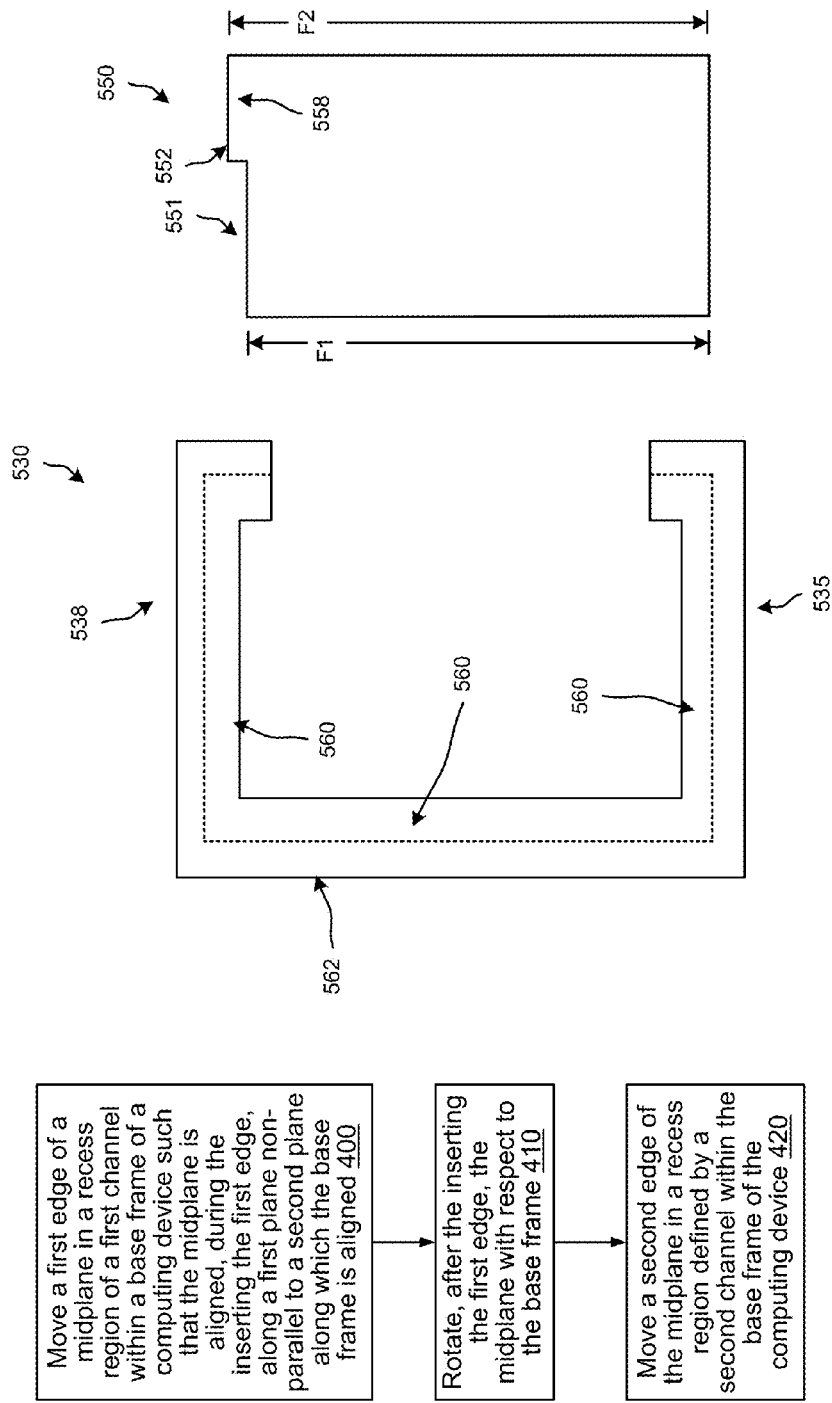

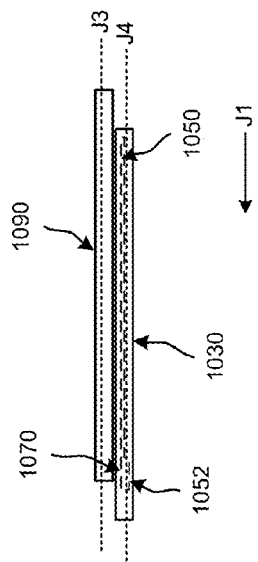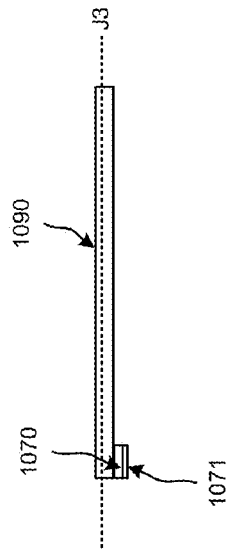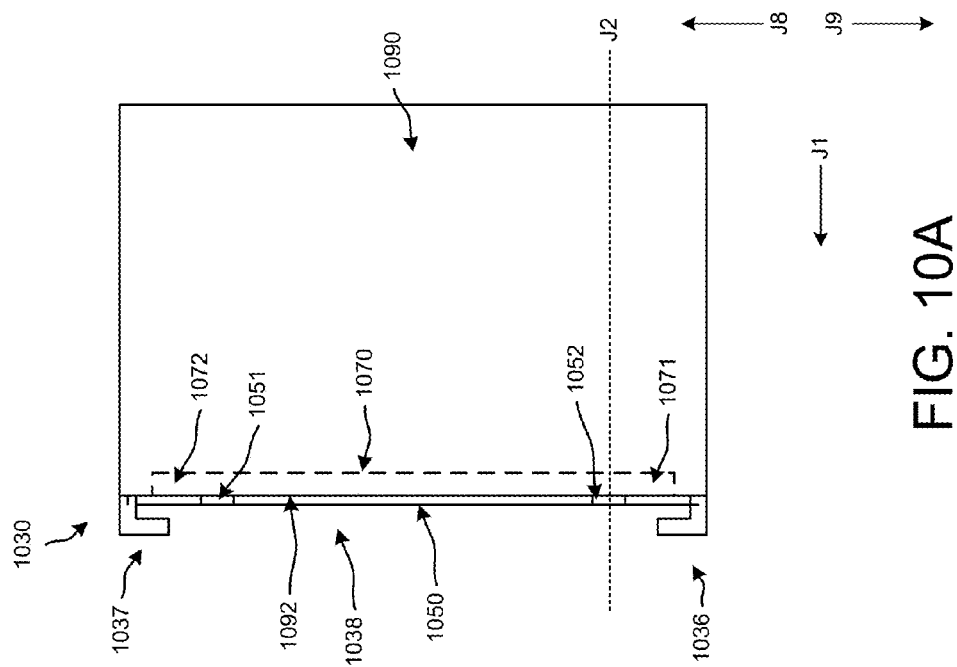

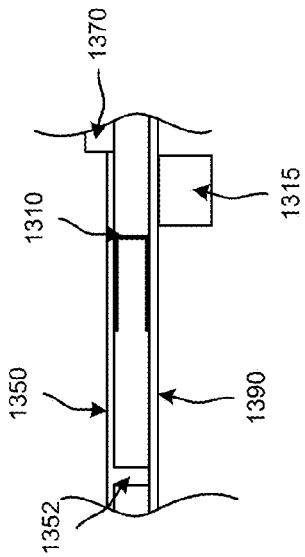
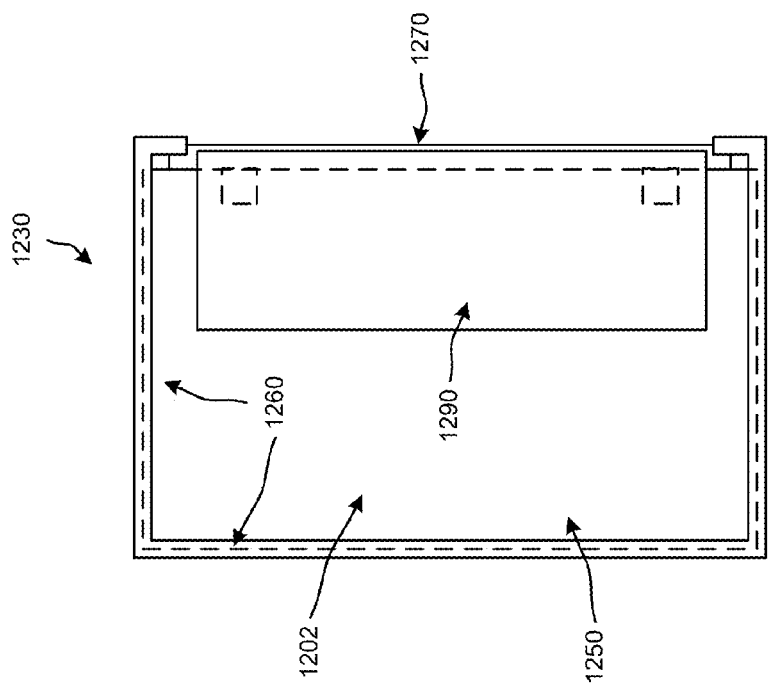
FIG. 13
FIG. 12

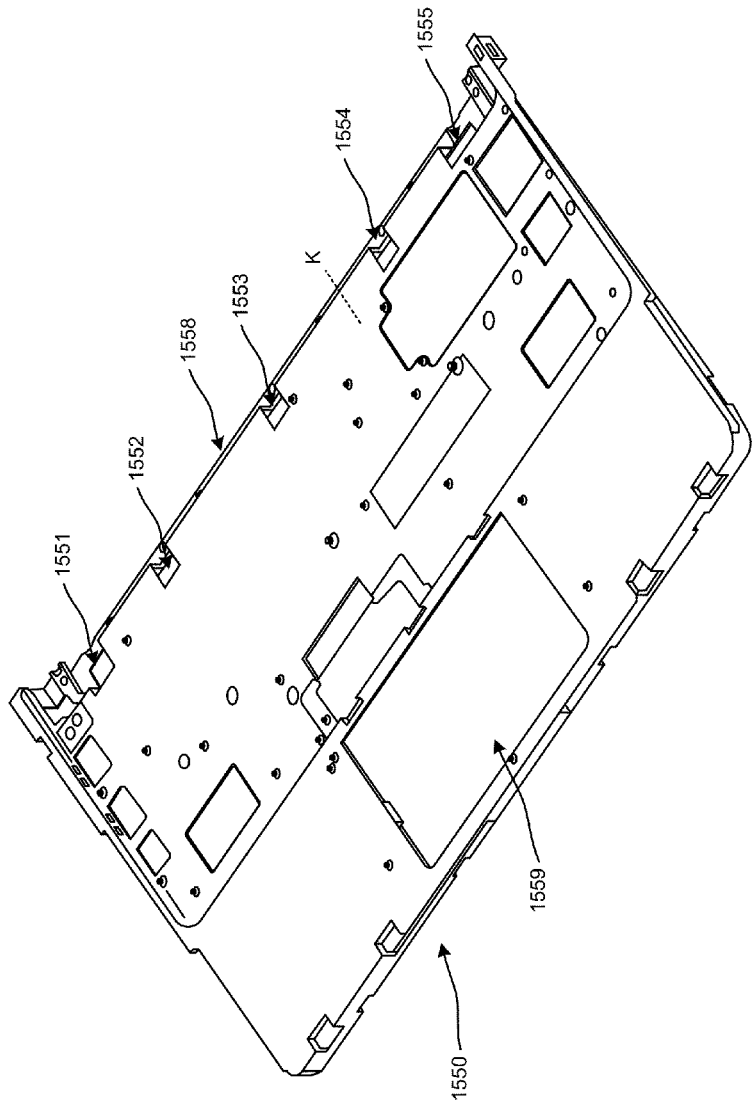
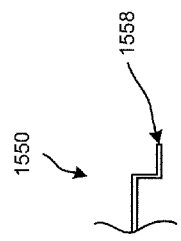
FIG. 15A
FIG. 15B

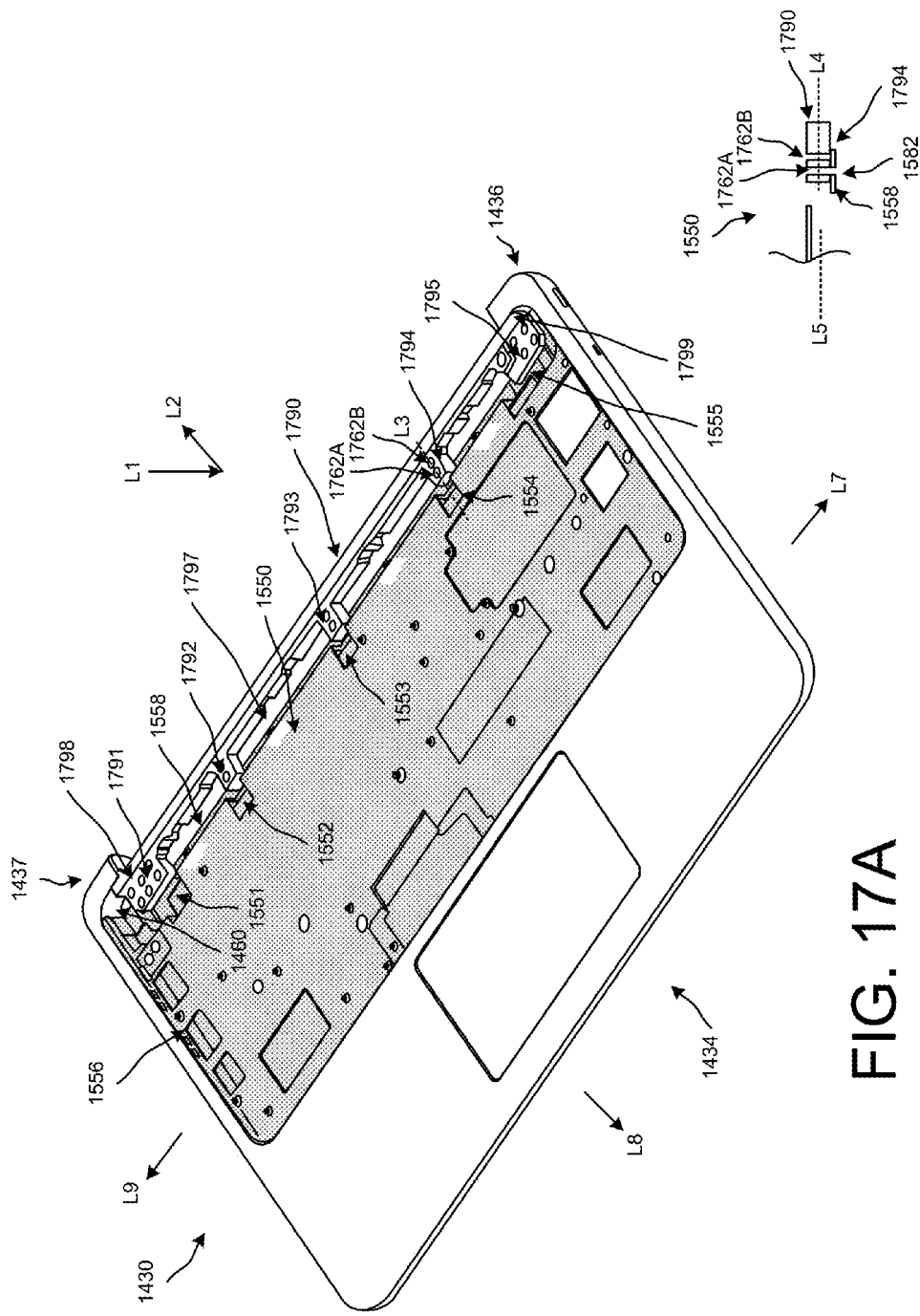

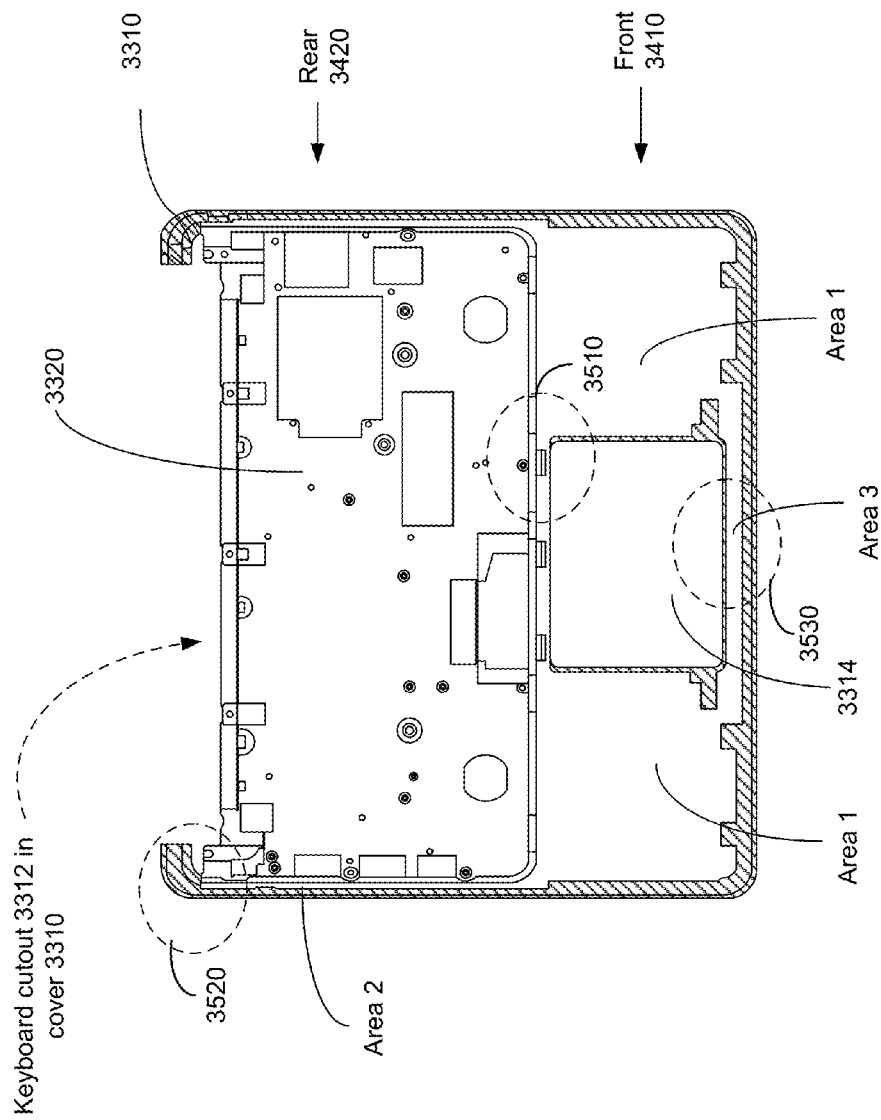

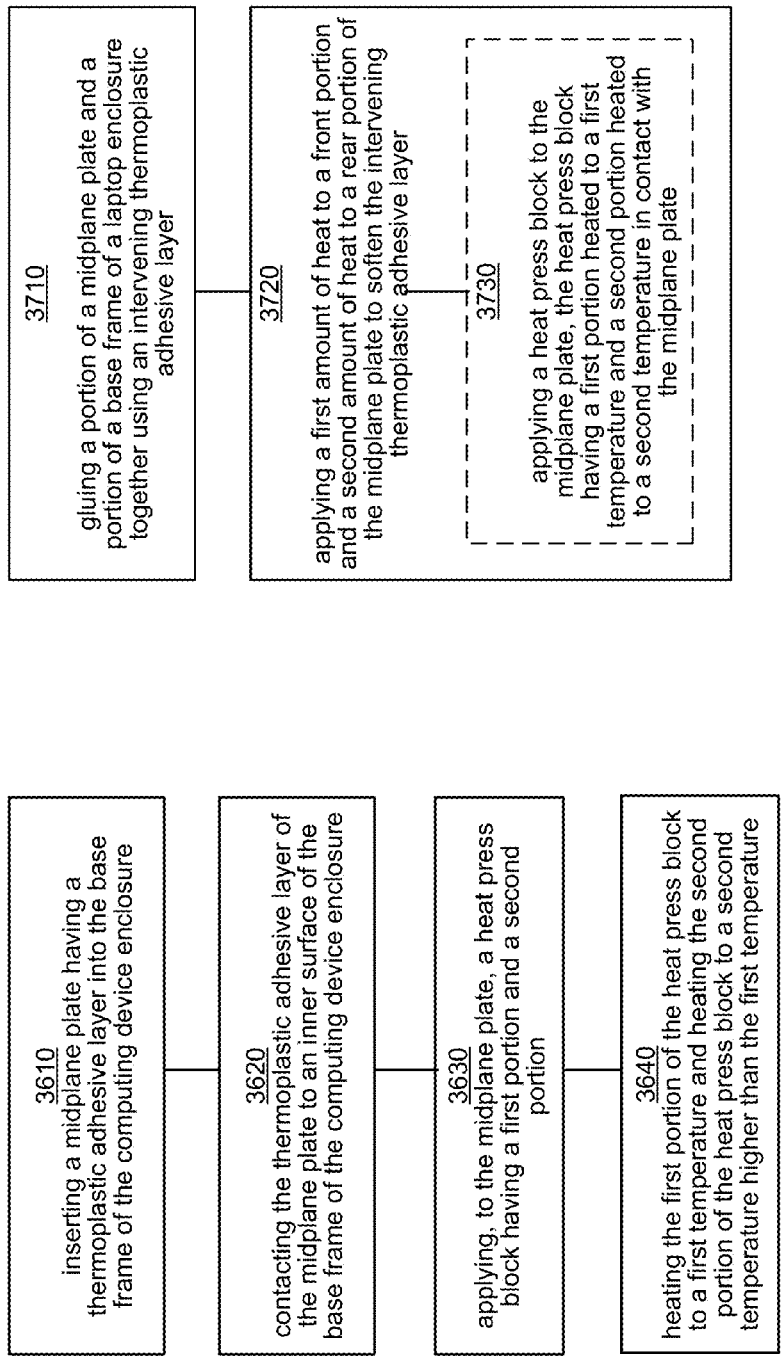

APPARATUS RELATED TO A STRUCTURE OF A BASE PORTION OF A COMPUTING DEVICE

TECHNICAL FIELD

This description generally relates to computing devices. The description, in particular, relates to a structure of the base portion of a computing device.

BACKGROUND

In general, relatively light and elegant computing devices are preferred by users. Miniaturization of computing device components (e.g., hard drives, circuits, batteries, etc.) can contribute to reducing the weight of a computing device and can allow for the design of thinner, slimmer enclosures that utilize light-weight materials. However, reductions in the size of and the use of light-weight materials for enclosures can result in an undesirable decrease in the structural integrity of the resulting computing devices. Thus, a need exists for systems, methods, and apparatus to address the shortfalls of present technology and to provide other new and innovative features.

SUMMARY

In one general aspect, an apparatus can include a display portion, a base frame coupled to the display portion where the base frame includes a channel defined by a top wall opposite a bottom wall and a side wall coupled to the top wall and to the bottom wall. The side wall can have an outer surface defining at least a portion of an outer perimeter of the base frame. The channel can have a first portion on a first side of the base frame and a second portion on a second side of the base frame opposite the first side of the base frame. The apparatus can include a midplane having a first edge disposed in the first portion of the channel and having a second edge disposed in the second portion of the channel.

In another general aspect, an apparatus can include a backbone component, a display portion coupled to the backbone component, and a base frame including a channel defined by a top wall opposite a bottom wall and a side wall coupled to the top wall and to the bottom wall. The side wall can have an outer surface defining at least a portion of an outer perimeter of the base frame. The channel can define a first recess region on a first side of the base frame and a second recess region on a second side of the base frame. The second side can be aligned along a longitudinal axis substantially orthogonal to a longitudinal axis along which the first side is aligned. The backbone component can have at least a portion disposed in the first recess region.

In yet another general aspect, a method can include moving a first edge of a midplane in a first channel within a base frame of a computing device. The midplane can be aligned, during the inserting the first edge, along a first plane non-parallel to a second plane along which the base frame is aligned. The method can include rotating, after the inserting the first edge, the midplane with respect to the base frame, and moving a second edge of the midplane in a second channel within the base frame of the computing device. The method can also include moving a backbone component in a recess included in the midplane.

The details of one or more implementations are set forth in the accompanying drawings and the description below. Other features will be apparent from the description and drawings, and from the claims.

BRIEF DESCRIPTION OF THE DRAWINGS

FIG. 1A is a diagram that illustrates portions of a computing device.

FIG. 1B is a diagram that illustrates a side view of the computing device shown in FIG. 1A.

FIG. 1C is a diagram that shows a cross-section of a portion of the computing device shown in FIG. 1A.

FIGS. 2A through 2D are diagrams that illustrate various views of components included in a base portion of a computing device.

FIG. 3B is a diagram that illustrates a cross-sectional view of the midplane and the base frame shown in FIG. 3A.

FIG. 3C is a diagram that illustrates a cross-sectional view of insertion of at least a portion of the midplane inside of the base frame.

FIG. 3D is a diagram that illustrates the midplane disposed inside of the base frame.

FIG. 4 is a flowchart that illustrates a method of coupling a midplane to a base frame.

FIGS. 5A through 5D are diagrams that illustrate a base frame including a channel and a midplane.

FIGS. 10A through 10E illustrate coupling of a display portion of a computing device with a base frame and midplane via a backbone component.

FIG. 12 is a diagram that illustrates a plate, according to an implementation.

FIG. 13 is a diagram that illustrates a side cross-sectional view of a midplane coupled to a plate.

FIG. 15A is a diagram that illustrates a perspective top view of a midplane.

FIG. 15B illustrates side cross-sectional view of a portion of the midplane shown in FIG. 15B.

FIG. 17A is a diagram that illustrates the midplane shown in FIGS. 15A and 15B coupled to a backbone component.

FIG. 17B is a diagram that illustrates a cross-sectional view of a portion of the backbone component and the midplane shown in FIG. 17A.

FIGS. 34A and 34B are illustrations of an example assembly of the parts of FIGS. 33A through 33C.

FIGS. 36 through 38 are illustrations of example methods for thermally bonding parts of a computing device enclosure.

DETAILED DESCRIPTION

Figure 3A:
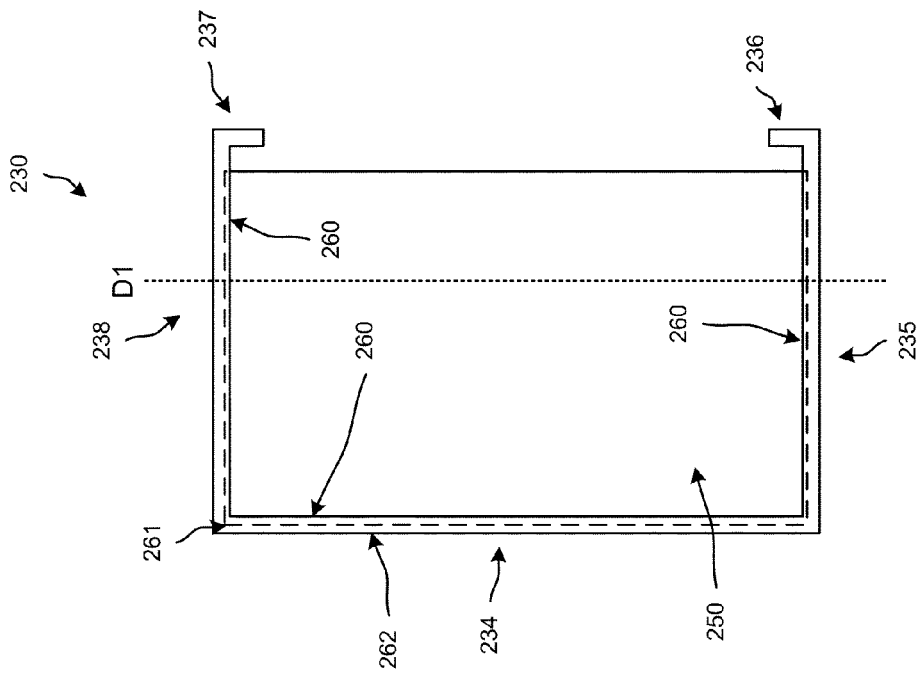
FIG. 3A is a diagram that illustrates a midplane disposed within at least a portion of the base frame shown in FIGS. 2A through 2D.

FIG. 1A is a diagram that illustrates portions of a computing device 100, according to an implementation. In this implementation, the computing device 100 includes a display portion 110 and a base portion 120. The base portion 120 includes a base frame 130 and a midplane 150. The midplane 150 has at least a portion disposed in at least a portion of the base portion 120. In this implementation, the midplane 150 has at least a portion disposed in a channel 160 (or undercut) defined by the base frame 130. The base portion 120 also includes a backbone component 140 coupled to the base frame 130. In some implementations, the backbone component 140 can have at least a portion disposed within at least a portion of the channel 160. More details related to the channel 160 are described in connection with, for example, FIG. 1C.

The base frame 130 has an outer surface 132 that defines at least a portion of an outer perimeter or profile of the base portion 120 of the computing device 100. The base frame 130 can be referred to as a C-case, or as a portion of a C-case. In this implementation, the computing device 100 is a laptop computing device. The display portion 110 is illustrated with dotted line in FIG. 1A so that other components of the computing device 100 can be visible.

A side view of the computing device 100 that illustrates the display portion 110 coupled to the base portion 120 (which includes the base frame 130) is illustrated in FIG. 1B. The computing device 100 is illustrated in an open configuration.

The base frame 130, the backbone component 140, and the midplane 150 can collectively define the basic structure of the base portion 140 of the computing device 100. Specifically, the base frame 130, the backbone component 140, and the midplane 150 can be coupled together to as a structure of the computing device 100 that provides rigidity and/or structural integrity. The base frame 130, the backbone component 140, and the midplane 150 can be structures or components to which other components (e.g., keyboard, circuit board, display portion 110) of the computing device 100 can be coupled. For example, the channel 160 included in the base frame 130 can provide rigidity and/or structural integrity to the computing device 100. In particular, the channel 160, when coupled to the midplane 150, can collectively define a rigid structure to which components (e.g., electronic components) of the computing device 100 can be coupled.

A proximal side or back side the computing device 100 is toward a top of FIG. 1A (toward the display portion 110 of the computing device 100). A distal side or front side of the computing device 100 is toward a bottom FIG. 1A (away from the display portion 110 of the computing device 100). Portions of the computing device 100 can be referred to using the proximal (or back) and distal (or front) designations. More details related to the display portion 110 and bezel of the computing device 100 are described in connection with at least FIGS. 18 through 30.

As shown in FIG. 1A, the base frame 130 has a proximal portion 134, a first distal portion 136, and a second distal portion 137. The base frame 130 also has a first side portion 135 (disposed between the proximal portion 134 and the first distal portion 136) and a second side portion 138 (disposed between the proximal portion 134 and the second distal portion 137). In some implementations, the proximal portion 134, the first distal portion 136, and the second distal portion 137 can be referred to as a side portion. The first distal portion 136 can be aligned along an axis that is substantially orthogonal to an axis along which the first side portion 135 is aligned. Similarly, the second distal portion 137 can be aligned along an axis substantially orthogonal to an axis along which the second side portion 138 is aligned. Although illustrated as a unitary component, in some implementations, the base frame 130 can include one or more components (or separate portions) that are coupled together using one or more coupling mechanisms such as a screw, a rivet, a weld, and/or so forth.

The backbone component 140 has at least a portion disposed between the first distal portion 136 and the second distal portion 137. As shown in FIG. 1A, in an area where the backbone component 140 is coupled between the first distal portion 136 and the second distal portion 137, a portion of the base frame 130 is excluded. Because the backbone component 140 can be coupled to the first distal portion 136 and/or the second distal portion 137, the first distal portion 136 and/or the second distal portion 137 can each (or collectively) be referred to as a backbone coupling portion(s) of the base frame 130.

In some implementations, the backbone component 140 can provide additional rigidity and structure to which electronic components can be coupled within the computing device 100. Although illustrated as a unitary component, in some implementations, the backbone component 140 can include one or more components (or separate portions) that are coupled together using one or more coupling mechanisms such as a screw, a rivet, a weld, and/or so forth.

The backbone component 140 and the base frame 130 collectively define an opening 102. The midplane 150 is coupled to the base frame 130 and/or to the backbone component 140 such that at least a portion of the midplane 150 is exposed through the opening 102.

As shown in FIG. 1A, the midplane 150 has a surface area or perimeter that is greater than an area or perimeter defined by the opening 102. Specifically, the midplane has a length A3 (also can be referred to as a distance, dimension, or width) that is greater than a length A1 of the opening 102 (which is aligned along or parallel to length A3). Similarly, the midplane 150 has a length A4 that is greater than a length A2 of the opening 102 (which is aligned along or parallel to length A4).

In some implementations, the surface area (or perimeter) of the midplane 150 can be less than or equal to the area (or perimeter) defined by the opening 102. In some implementations, one or more lengths of one or more portions of the midplane 150 can be less than or equal to one or more lengths of the opening 102 (along the same direction or parallel to one or more of the lengths of the midplane 150). Although illustrated as a unitary component, in some implementations, the midplane 150 can include one or more components (or separate portions) that are coupled together using one or more coupling mechanisms such as a screw, a rivet, a weld, and/or so forth.

FIG. 1C is a diagram that shows a cross-section (or cross-sectional profile) of at least the first side portion 135 of the base frame 130 along line A5 shown in FIG. 1A. As shown in FIG. 1C, the first side portion 135 includes walls (e.g., first wall, second wall, third wall) that are identified as a side wall 162 disposed between a top wall 161 and a bottom wall 163. The top wall 161, the side wall 162, and the bottom wall 163 can each be generically referred to as a wall. The walls 161, 162, 163 of the first side portion 135 define a portion 165 of the channel 160 or inner surfaces of the portion 165 of the channel 160. The portion 165 of the channel 160 (or the inner surfaces thereof) is disposed around or defines a recess region 164 (also can be referred to as a cavity), which is illustrated with a dashed line.

In some implementations, a portion of the channel 160 can be referred to as a channel portion. Accordingly, a first portion of the channel 160 can be referred to as a first channel portion, and a second portion of the channel 160 can be a second channel portion. In some implementations, the first portion of the channel 160 and the second portion of the channel 160 can be portions of the same channel 160. In some implementations, a first channel portion and a second channel portion can be portions of separate or noncontiguous channels.

In some implementations, the top wall 161 can be opposite the bottom wall 163. Said differently, the top wall 161 can have an inner surface facing an inner surface of the bottom wall 163. In some implementations, the base frame 130 can be monolithically formed. Accordingly, the top wall 161, the side wall 162, and the bottom wall 163 can be monolithically formed.

The shape of the channel 160, which is defined by the walls 161 come 106 two, 163 can provide rigidity to the structure of the base frame 130. This structural integrity can contribute to the structural integrity of a computing device including the base frame 130. Specifically, monolithic formation of the base frame 130 can further enhance the rigidity of the base frame 130.

As shown in FIG. 1C, an edge of the midplane 150 is disposed within the recess region 164. In other words, at least a portion of the midplane 150 is disposed within the recess region 164. In some implementations, one or more portions of the midplane 150 can be in coupled to (e.g., in contact with, bonded to), one or more inner surfaces of the portion 165 of the channel 160 defined by the first side portion 135.

In some implementations, the edge of midplane 150 can be a first edge and the recess region 164 of the channel 160 can be a first recess region. Although not shown in FIG. 1C, the midplane 150 can have a second edge (e.g., an opposite edge, and adjacent edge) disposed in a second recess region of the channel 160.

The shape of the cross-section of the first side portion 135 shown in FIG. 1C can be referred to as a C-shape or as a U-shape. In other words, the top wall 161, the bottom wall 163, and the side wall 162 can collectively define a curved cross-sectional profile or a c-shape cross-sectional profile. The cross-section of the first side portion 135 is oriented so that the portion 165 of the channel 160 is aligned along an axis that is parallel to (e.g., substantially parallel to) a plane A7 along which the midplane 150 is aligned. In other words, the first side portion 136 is oriented so an opening defined by the portion 165 of the channel 160 is facing sideways (or laterally) relative to the midplane 150 rather than vertically. In this implementation, the cross-section of the first side portion 135 is symmetrical about a horizontal line or axis through the side wall 162.

In this implementation, the channel 160 has a relatively constant depth along or around the base frame 130. A depth A9 of the portion 165 the channel 160 as shown in FIG. 1C. In this implementation, the depth A9 is aligned along a line substantially aligned along or parallel to the plane A7 (along which the midplane 150 is aligned). As an example, a portion of the channel 160 associated with the second side portion 138 can have a depth that is the same as (or substantially the same as) a depth of a portion of the channel 160 associated with the second distal portion 137 and/or a depth of a portion of the channel 160 associated with the proximal portion 134.

In some implementations, the first side portion 135 can have a different shape than that shown in FIG. 1C. In some implementations, the first side portion 135 can have one or more curved shapes, a triangular shape, more walls than shown in FIG. 1C, less walls than shown in FIG. 1C, and/or so forth. In some implementations, the cross-section of the first side portion 135 can be asymmetrical about a horizontal line or axis through the side wall 162.

In this implementation, a length A6 (e.g., a width, a distance, a dimension) of the first side portion 135 is defined so that a length of the top wall 161 and a length of the bottom wall 163 are approximately the same or equal. Accordingly, an edge of the top wall 161 and an edge of the bottom wall 163 can be aligned along a single plane (or line) that is orthogonal to the plane A7 along which the midplane 150 is aligned. In some implementations, the length of the top wall 161 can be different than a length of the bottom wall 163.

In some implementations, the second side portion 138, the proximal portion 134, the first distal portion 136, and/or the second distal portion 137 can have a cross-sectional profile that is the same as the cross-sectional profile of the first side portion 135. For example, the proximal portion 134 of the base frame 130 can have a cross-sectional profile that is the same as the cross-sectional profile as the first side portion 135 with the base frame 130.

Referring back to FIG. 1A, in this implementation, the portion 165 of the channel 160 (and the recess region 164) of the first side portion is contiguous or connected to one or more portions of the channel 160 (and associated recess region(s)) of one or more of the other portions (e.g., the proximal portion 134, the first distal portion 136, the second side portion 138, the second distal portion 137) of the base frame 130. In other words, the channel 160 can have a first portion on a first side or portion of the base frame 130 that is coupled to a second portion of the channel 160 on a second side or portion of the base frame 130. In such implementations, the first portion of the channel 160 can be orthogonal to the second portion of the channel 160, and can be coupled at a corner of the base frame 130. In such implementations, a recess region can be continuous along different portions of the channel 160.

For example, a portion of the channel 160 defined by the cross-sectional profile of the proximal portion 134 can be coupled to the portion 165 of the channel 160 defined by the cross-sectional profile of the first side portion 135. Accordingly, a recess region defined by the portion of the channel 160 of the proximal portion 134 can be coupled to the recess region 164 of the portion 165 of the channel 160 of the first side portion 135.

In some implementations, the second side portion 138, the proximal portion 134, the first distal portion 136, and/or the second distal portion 137 can have a cross-sectional profile that is different than the cross-sectional profile of the first side portion 135. For example, the proximal portion 134 can have a cross-sectional profile that is different than the cross-sectional profile of the first side portion 135. In such implementations, the cross-sectional profile of the proximal portion 134 can gradually change (e.g., gradually taper) or abruptly change to the cross-sectional profile the first side portion 135.

Although not shown, in some implementations, portions of a channel defined within various portions of the base frame 130 may be isolated or decoupled. In other words, the base frame 130 can have multiple discontinuous channels. For example, the portion 165 of the channel 160 of the first side portion 135 can be isolated from a separate channel (not shown) of the first distal portion 136 of the base frame 130. In such implementations, the portion 165 of the channel 160 of the first side portion 135 can have a different cross-sectional profile then the channel of the first distal portion 136 of the base frame 130. In other words, in some implementations, different channels can have the same or different cross-sectional profiles.

In this implementation, many portions of the computing device 100 such as a keyboard, a circuit board, a trackpad, input/output (I/O) components, and/or so forth are not shown. However, one or more of these electronic components can be included in, for example, region 102 of the computing device 100. For example, electronic component can be coupled to the midplane 150 can be disposed in or protrude through, for example, an opening (not shown) in the side wall 162 of the first side portion 135. Because the midplane 150 is disposed within the recess region, electronic component coupled to an edge of the midplane 150 can be disposed relatively close to an inner surface of the channel 160 without being cantilevered from (or protruding a relatively great distance from) the midplane 150. More details related to components that can be included in region 102 of the computing device 100 are described in connection with at least FIGS. 39 through 45.

Figure 2C:
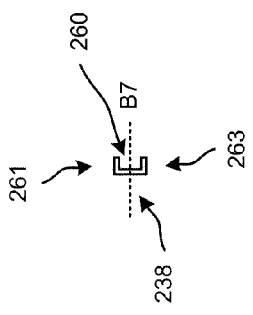

FIGS. 2A through 2D are diagrams that illustrate various views of components included in a base portion of a computing device. Specifically, FIG. 2A is a diagram that illustrates a top view of a base frame 230, and FIG. 2B illustrates a bottom view of the base frame 230.

The base frame 230 includes a proximal portion 234, a first distal portion 236, and a second distal portion 237. The base frame 230 also includes a first side portion 235 coupled between the first distal portion 236 and the proximal portion 234, and a second side portion 238 coupled between the second distal portion 237 and the proximal portion 234.

FIG. 2A illustrates a top wall 261, and FIG. 2B illustrates a bottom wall 263. A side wall 262 is coupled between the top wall 261 and the bottom wall 263. The top wall 261, the side wall 262, and the bottom wall 263 collectively define a channel 260. In this implementation, the top wall 261 includes an opening 266 associated with trackpad (also can be referred to as a touchpad or as a trackpad opening) and palm rest regions 267. Portions of the channel 260 disposed below the palm rest regions 267 are illustrated with dashed lines. In some implementations, a portion of the first side portion 235 of the base frame 230 extending from the palm rest region 267 can be referred to as an extension of the first side portion 235 (or as an extension portion of the base frame 230). Similarly, a portion of the second side portion 238 of the base frame 230 extending from the palm rest region 267 can be referred to as an extension of the second side portion 238 (or as an extension portion of the base frame 230).

Various dimensions of the base frame 230 are illustrated in FIG. 2A. As shown in FIG. 2A, a length B1 of the first distal portion 236 is less than a length B2 of the proximal portion 234 the base frame 230. Similarly, the second distal portion 237 has a length that is less than the length B2 of the proximal portion 234.

Although not shown in FIG. 2A a backbone component (not shown) can be coupled to the first distal portion 236 and/or to the second distal portion 237. In such implementations, the backbone component can have at least a portion disposed within a portion of the channel 260 associated with the first distal portion 236 and/or can have at least a portion disposed within a portion of the channel 260 associated with the second distal portion 237. Because the backbone component can be coupled to the first distal portion 236 and/or to the second distal portion 237, the first distal portion 236 and/or to the second distal portion 237 can be referred to as backbone coupling portions of the base frame 230.

As shown in FIG. 2A, a length B3 of the bottom wall 263 is less than a length B4 of the top wall 261. Accordingly, portions of the channel 260 associated with the palm rest regions 267 and the trackpad region (which includes the opening 266) can each have an asymmetrical cross-sectional profile (along a horizontal plane aligned along the base frame 230). Also, at least a portion of the channel 260 associated with the palm rest region coupled to the first side portion 235 has an asymmetrical profile while the extension portion of the first side portion 235 has a symmetrical cross-sectional profile.

Figure 2D:
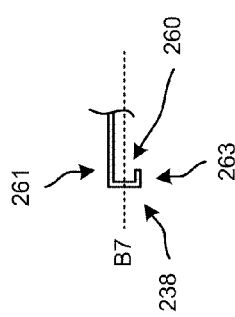

FIG. 2C illustrates the symmetrical cross-sectional profile of the extension portion of the first side portion 235 cut along line B5. As shown in FIG. 2C, the extension portion of the first side portion 235 (and/or a portion of the channel 260 thereof) has a symmetrical cross-sectional profile about a plane B7 (or line). The top wall 261 and the bottom wall 263 have an equal (or substantially equal) length. In contrast, FIG. 2D illustrates the asymmetrical cross-sectional profile of the first side portion 235 associated with the palm rest region 267, which is cut along line B6. As shown in FIG. 2D, the first side portion 235 associated with the palm rest region 236 (and/or a portion of the channel 260 thereof) has an asymmetrical cross-sectional profile about the plane B7 (or line). In this implementation, the top wall 261 and the bottom wall 263 have an unequal (or different) length, thus defining the asymmetrical cross-sectional profile.

FIG. 3A is a diagram that illustrates a midplane 250 disposed within at least a portion of the base frame 230 shown in FIGS. 2A through 2D. In FIG. 3A, the midplane is aligned along a plane that is substantially parallel to a plane along which the base frame 230 is aligned. In this implementation, the palm rest regions 267 and the opening 266 associated with the trackpad cannot be seen because the midplane 250 is disposed within the base frame 230.

FIG. 3B is a diagram that illustrates a cross-sectional view of the midplane 250 and the base frame 230 cut along line D1 shown in FIG. 3A. As shown in FIG. 3B, the midplane 250 has a length D3 that is longer than a length D2 between an inner edge 268 of a portion of (e.g., extension portion of) the top wall 261 associated with the first side portion 235 and an inner edge 269 of a portion of (e.g., extension portion of) the top wall 261 associated with the second side portion 238. The length D3 of the midplane 250 is shorter than a distance D4 between an inner surface 278 of a first portion of the side wall 262 (on one side of the base frame 230) and an inner surface (on opposite side of the base frame 230). Also, the length D3 of the midplane 250 is shorter than a distance between an outer surface 288 of the first portion of the side wall 262 and an outer surface 289 of the second portion of the side wall 262.

FIG. 3C is a diagram that illustrates a cross-sectional view of insertion of at least a portion of the midplane 250 inside of the base frame 230. As shown in FIG. 3C, an edge 251 (or end portion) of the midplane 250 is inserted into a cavity (or recess region) defined by a portion of the channel 260 associated with the second side portion 238 of the base frame 230 along direction D11 (approximately along direction D11). After this operation, the midplane 250 is aligned along a plane DA that is nonparallel to a plane DB along which the base frame 230 is aligned.

After the edge 251 of the midplane 250 has been inserted into the cavity, the midplane 250 can be rotated along direction D8 so that an edge 252 of the midplane 250 (which is opposite the edge 251 of the midplane 250) can be rotated toward a cavity (or recess region) defined by a portion of the channel 260 associated with the first side portion 235 of the base frame 230. Subsequently, after the edge 252 of the midplane 250 is aligned with (e.g., facing, corresponding with) the cavity (and has rotated beyond the inner edge 268 of the top wall 261), the edge 252 of the midplane 250 can be inserted into the cavity defined by the portion of the channel 260 associated with the first side portion 235. In other words, the midplane 250 can be rotated (after the edge 251 of the midplane 250 has been inserted) so that the plane DA along which the midplane 250 is aligned is parallel to (or substantially parallel to) the plane DB along which the base frame 230 is aligned. In some implementations, this process can be referred to as a tilt-in insertion process.

As shown in FIG. 3C, the length D3 of the midplane 250 (which extends between the edge 251 and the edge 252) is less than a length D6 between the inner edge 268 of the first side portion 235 and the inner surface 279 of the second side portion 238 so that the edge 251 of the midplane 250 can be inserted into the base frame 230 and the edge 252 of the midplane 250 can later be rotated into the base frame 230. As shown in FIG. 3D, the midplane 250 can be moved (e.g., shifted, slidably moved) within the base frame 230 along, for example, direction D9 and/or direction D10. In some implementations, the direction D9 and/or the direction D10 can be referred to as a translational direction. In some implementations, the midplane 250 can be moved within the base frame 230 to a desirable location within the base frame 230. In some implementations, the midplane 250 can be moved within the base frame 230 so that at least two edges (e.g., orthogonal edges, opposite edges) of the midplane 250 can be disposed within two or more portions of the channel 260 of the base frame 230.

As illustrated in connection with FIGS. 3C and 3D, the midplane 250 can be moved into the base frame 230 during the tilt-in process so that one edge of the midplane 250 is moved into the channel 260 along a first direction (e.g., direction D11) and another edge of the midplane 250 is moved into the channel 260 along a second direction (e.g., direction D10, direction D9) different than the first direction. In some implementations, the first direction can be orthogonal the second direction. In some implementations, the first direction and/or the second direction to be a combination of directions.

FIG. 4 is a flowchart that illustrates a method of coupling a midplane to a base frame. In some implementations, the method illustrated in the flowchart (which can be referred to as a tilt-in process) can be used to couple the midplane 250 to the base frame 230.

As shown in FIG. 4, a first edge of a midplane is moved in a recess region of a first channel within a base frame of the computing device such that the midplane is aligned, during the inserting the first edge, along a first plane nonparallel to the second plane along which the base frame is aligned (block 400). In some implementations, the recess region can be a cavity. In some implementations, the first channel can be associated with a side portion and/or an extension of a base frame.

After the moving the first edge, the midplane is rotated with respect to the base frame (block 410). In some implementations, the midplane can be rotated until the first plane along which the midplane is aligned is parallel to the second plane along which the base frame is aligned.

A second edge of the midplane is moved in a recess region defined by second channel within the base frame of the computing device (block 420). In some implementations, the moving of the second edge of the midplane into the recess region can include slidably moving the second edge after the rotating has been completed. In some implementations, the moving of the second edge can include moving along two or more different directions. In some implementations, the moving of the second edge can include translating of the midplane.

FIG. 5A is a diagram that illustrates a base frame 530 including a channel 560. FIG. 5A also illustrates a midplane 550 for insertion into the base frame 530. Specifically, the midplane 550 has outer edges for insertion into the channel 560 of the base frame 530. The base frame 530 includes a first extension 535 and a second extension 538.

As shown in FIG. 5A, the midplane 550 includes a first portion 551 having a length F1 that is greater than a length F2 of a second portion 552 of midplane 550. In this implementation, length F2 of the second portion 552 of midplane 550 prevents insertion of the midplane 550 into the channel 560 of the base frame using only the tilt-in process described above. In other words, the midplane 550 includes a protrusion 558 that prevents insertion of midplane 550 into the channel 560 using the tilt-in process described above. In this implementation, a modified tilt-in process that includes moving (e.g., bending) the first extension 535 and/or the second extension 538 can be used during insertion of midplane 550 into the base frame 530.

Figure 5C:
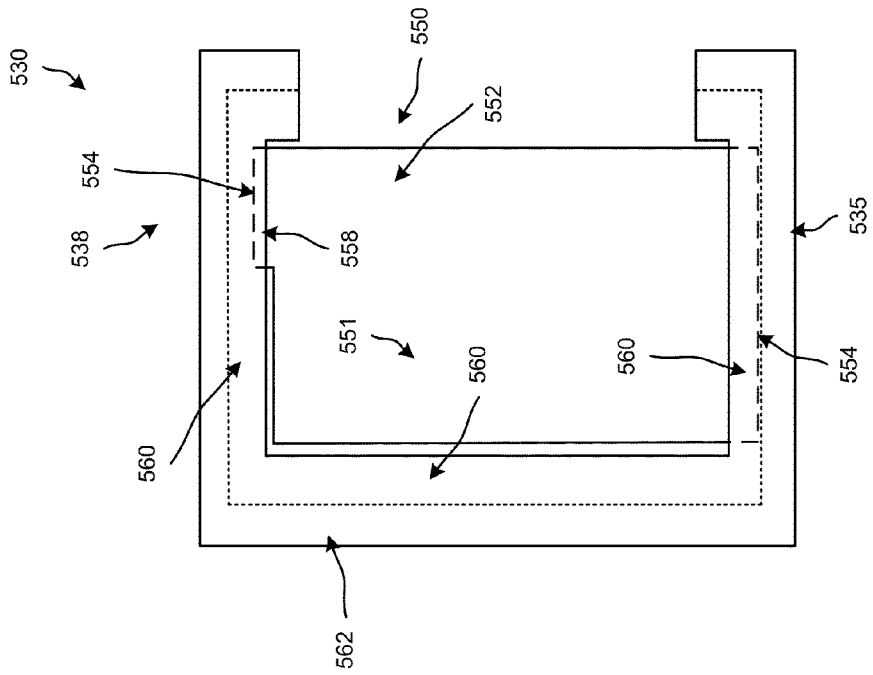
Figure 5B:
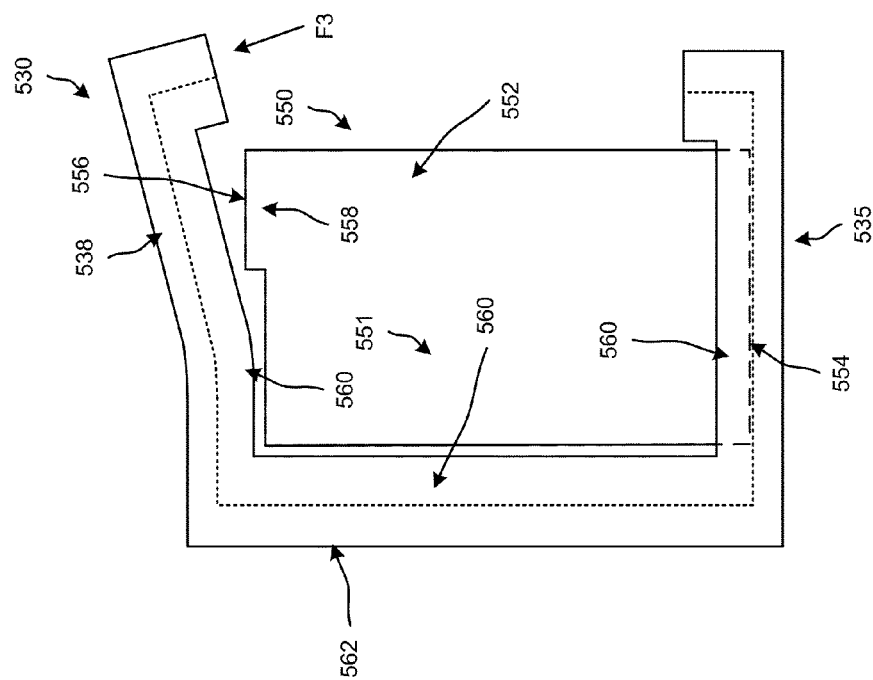

As shown in FIG. 5B, an edge 554 of the midplane 550 can be inserted into a portion of the channel 560 associated with the first extension 535. In some implementations, the edge 554 of midplane 550 can contact and inner surface of the channel 560 when being inserted into the first extension 535. After the edge 554 of the midplane 550 is inserted into the portion of the channel 560 associated with the first extension 535, the second extension 538 (or a portion thereof) can be moved away from the midplane 550 so that an edge 556 of the second portion 552 (or edge 556 of the protrusion 558) of the midplane 550 can be moved into an opening 502 defined by the base frame 530. In some implementations, during this process, the edge 556 of the second portion 552 of the midplane 550 can be rotated into the page.

A force can be applied along, for example, direction F3 to the second extension 538 (or a portion thereof) so that the second extension 538 can be extended such that the edge 556 (of the protrusion 558) can be moved adjacent to a cavity or recess region (not labeled) defined by the channel 560. The second extension 538 can be moved from a first position (or first configuration) shown in FIG. 5A to a second position (or second configuration) shown in FIG. 5B. In some implementations, the second extension 538 can be biased to the first position.

As shown in FIG. 5C, after the edge 556 of the second portion 550 to the midplane 550 is rotated into the page, the second extension 538 can be released (or a force no longer applied) so that the channel 560 of the second extension 538 is moved around the edge 556 of the second portion 552 (or protrusion 558) of midplane 550. In other words, the edge 556 of second portion 552 of midplane 550 can be moved into the channel 560 when the second extension 538 is released and moved back to the first position (or first configuration).

In some implementations, the midplane 550 can include multiple protrusions (such as protrusion 558) or variations in length. In such implementations, the first extension 535, in addition to the second extension 538, can be moved so that the midplane 550 can be moved into the base frame 530. In such implementations, the first extension 535 can be moved before and/or after the second extension 538 is moved.

Figure 5D:
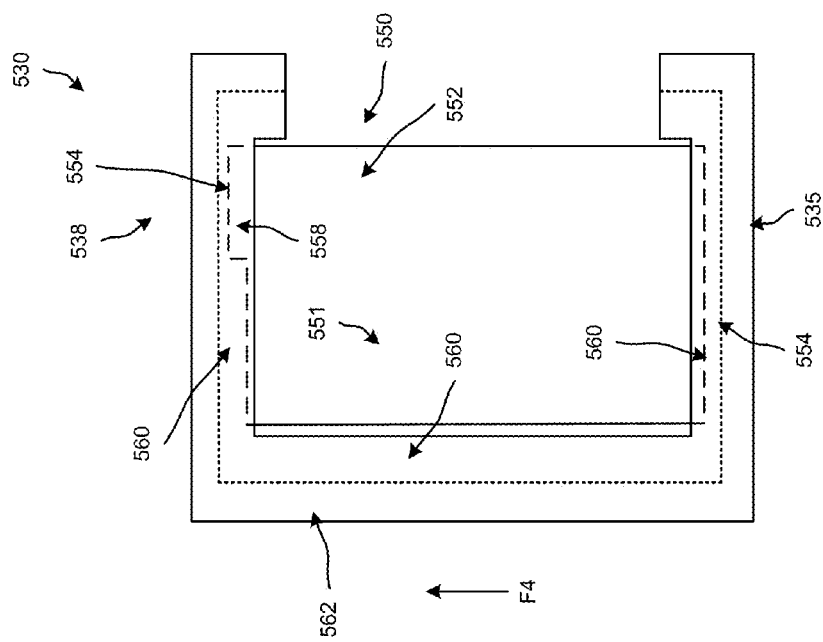

As shown in FIG. 5D, in the simple mentation, the midplane 550 is moved along direction F4 to a final position within the channel 560. In some implementations, the midplane 550 can be moved in a variety of directions nonparallel to direction F4 (including vertical directions) so that the midplane 550 can be placed in a desirable position within the base frame 530.

Figure 6:
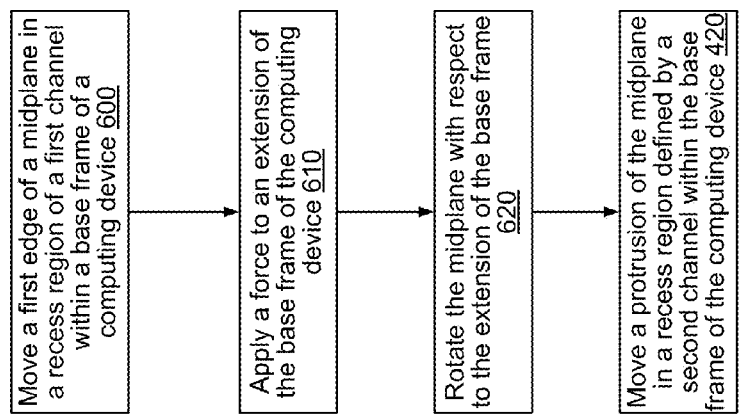
FIG. 6 is a flowchart that illustrates a method of coupling a midplane to a base frame.

FIG. 6 is a flowchart that illustrates a method of coupling a midplane to a base frame. In some implementations, the method illustrated in the flowchart (which can be referred to as a modified tilt-in process) can be used to couple the midplane 550 to the base frame 530.

As shown in FIG. 6, a first edge of a midplane is moved in a recess region of a first channel within a base frame of the computing device (block 600). In some implementations, the recess region can be a cavity. In some implementations, the first channel can be associated with a side portion and/or an extension of the base frame.

After the moving the first edge, a force is applied to an extension of the base frame of the computing device (block 610). The force can be applied to the extension so that a protrusion of the midplane can be inserted into the extension of base frame. In some implementations, the extension can be moved from a first position to a second position. In some implementations, the extension can be biased to the first position.

The midplane is rotated with respect to the extension of the base frame (block 610). In some implementations, the midplane can be rotated until a plane along which the midplane is aligned is parallel to the a plane along which the base frame is aligned.

A protrusion of the midplane is moved in a recess region defined by second channel within the base frame of the computing device (block 630). In some implementations, the protrusion of the midplane can be moved into the recess region when the extension of the base frame is released or when the forces no longer applied to the extension. The moving of the protrusion of the midplane into the recess region can include slidably moving the protrusion after the rotating has been completed. In some implementations, the moving of the protrusion can include moving along two or more different directions. In some implementations, the moving of the protrusion can include translating the midplane.

Figure 7B:
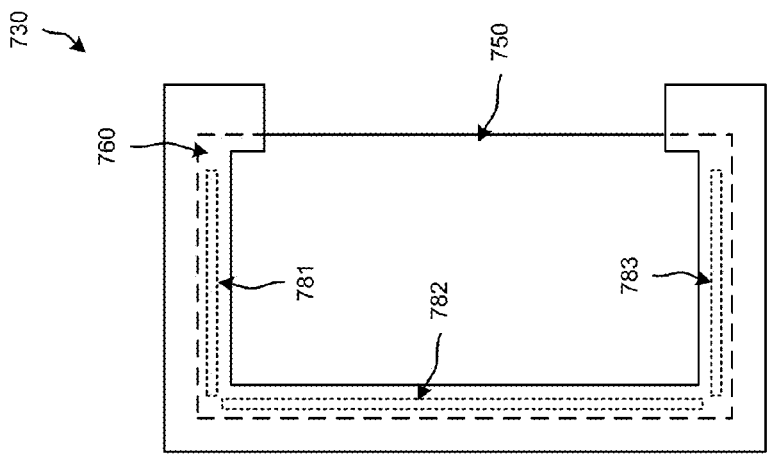
FIG. 7B illustrates the midplane shown in FIG. 7A having portions disposed within a channel of the base frame.
Figure 7A:
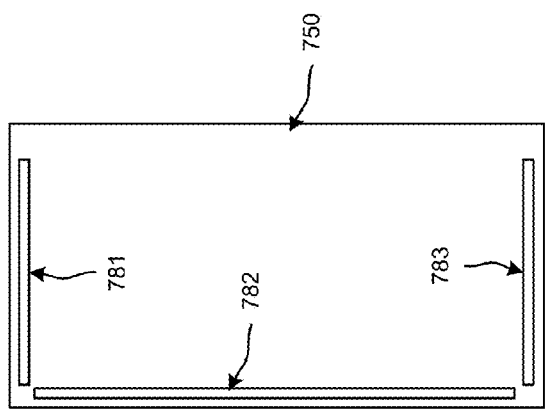
FIG. 7A is a diagram that illustrates thermal bond film portions coupled to a midplane.

FIG. 7A is a diagram that illustrates thermal bond film portions coupled to a midplane 750. Specifically, thermal bond film portions 781, 782, 783 are coupled to the midplane 750. The thermal bond film portions 781 through 783 can be used to bond the midplane 750 to a base frame 730 shown in FIG. 7B. In some implementations, the midplane 752 can include more or less thermal bond film portions than those shown in FIG. 7A. in some implementations, the thermal bond film portions 781 through 783 can have different surface areas, thicknesses, and/or so forth. For example, thermal bond film portion 781 can have a surface area different than thermal bond film portion 782. As another example, thermal bond film portion 781 can have a thickness different than thermal bond film portion 782.

The thermal bond film portions 781 through 783 can be configured melt when a heat is applied, which activates the thermal bond film portions 781 through 783. After the thermal bond film portions 781 through 783 have been activated (and later cooled and set), the thermal bond film portions 781 through 783 can be used to couple the midplane 750 to the base frame 730. In some implementations, one or more of the thermal bond film portion 781 through 783 can have an adhesive that facilitates coupling of the midplane 750 to an inner surface of the channel 760 of the base frame 730 before one or more of the thermal bond film portions 781 through 783 is activated via heating. In some implementations, one or more of the thermal bond portions 781 through 783 can be activated when melted. In some implementations, the melting point of one or more of the thermal bond portions 781 through 783 can be greater than 100° C. (e.g., 110° C., 130° C., 180° C., 250° C.).

FIG. 7B illustrates the midplane 750 having portions disposed within a channel 760 of the base frame 730. As shown in FIG. 7B, thermal bond film portions 781, 782, 783 are illustrated with dashed lines. At least a portion of the midplane 750 and/or or a portion of the base frame 730 can be heated so that one or more of the thermal bond film portions 781, 782, 783 can melt such that the base frame 730 can be coupled to the midplane 750 via thermal bond film portions 781, 782, 783.

In this implementation, heat can be applied so that the thermal bond film portions 781 through 783 cause adhesion in a desirable fashion. For example, heat can be applied to the midplane 750 before heat is applied to the base frame 730, or vice versa. In other words, heat can be applied in a two-stage fashion. In some implementations, heat can be applied to the midplane 750 during a longer time period then heat is applied to the base frame 730, or vice versa. In some implementations, a different temperature of heat can be applied to the midplane 750 than a temperature of heat that is applied to the base frame 730. In some implementations, different surface areas of the midplane 750 and/or surface areas of the base frame 730 can be heated. The differences in application of heat can be due to the midplane 750 and/or the base frame 730 having varying (e.g., non-uniform) thermal conductivities, varying (e.g., non-uniform) thicknesses, varying (e.g., non-uniform) lengths, and so forth. By applying heat to the midplane 750 in a fashion different than heat is applied to the base frame 730, the thermal bond film portions 781, 782, 783 can be used to adhere the midplane 750 to the base frame 730 in a desirable fashion.

Figure 8:
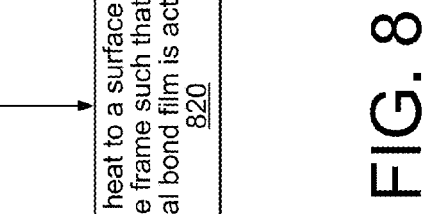
FIG. 8 is a diagram that illustrates a method of heat bonding a midplane to a base frame.

FIG. 8 is a diagram that illustrates a method of heat bonding a midplane to a base frame. In some implementations, the method can be used to couple any of the base frame and midplane configurations described above.

As shown in FIG. 8, a portion of the midplane including a thermal bond film is moved into a channel of a base frame (block 810). The thermal bond film can be disposed between the portion of the midplane and an inner surface of the channel of the base frame. In some implementations, the thermal bond film can include multiple portions of thermal bond film. In some implementations, the portion of the midplane can be moved into the channel using one or more of the tilt-in methods described above. In some implementations, the thermal bond film can include an adhesive (e.g., a temporary adhesive) so that the midplane can be at least temporarily coupled to the inner surface of the channel of the base frame until heat can be applied to activate the thermal bond film.

Heat is applied to a surface of the base frame such that the thermal bond film is activated (block 820). In some implementations, the thermal bond film can be activated when the thermal bond film is melted. In some implementations, heat can be applied in a two-stage process. In some implementations, heat can be applied to the surface of the base frame as well as to a surface of the midplane. In some implementations, heat can be applied to the midplane instead of to the base frame to activate the thermal bond film. More details related to thermal processing are described in connection with at least FIGS. 31A through 38.

Figure 9B:
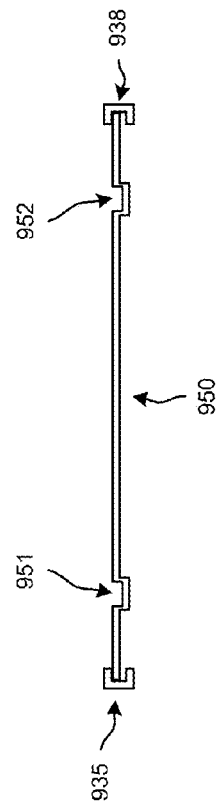
FIG. 9B is a diagram that illustrates a cross-sectional view of the midplane shown in FIG. 9A.
Figure 9C:
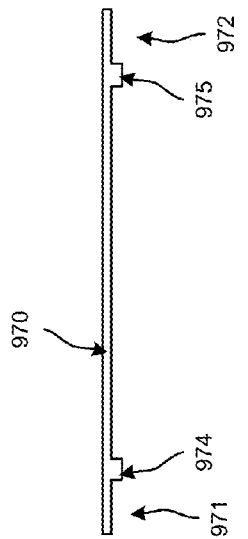
FIG. 9C is a diagram that illustrates a cross-sectional view of the backbone component shown in FIG. 9A.
Figure 9A:
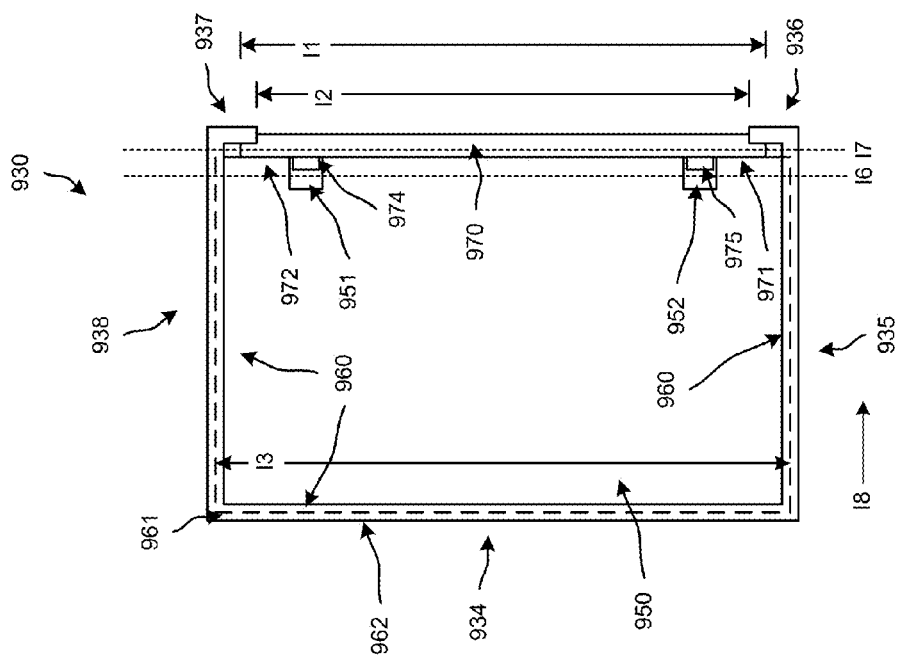
FIG. 9A is a diagram that illustrates a backbone component having at least a portion disposed within a channel of a base frame.

FIG. 9A is a diagram that illustrates a backbone component 970 having at least a portion disposed within a channel 960 of a base frame 930. As shown in FIG. 9A, a midplane 950 also has at least some portions disposed within the channel 960 and base frame 930. At least some edges of the midplane 950 are illustrated with dashed lines.

The backbone component 970 has a first end portion 971 disposed in a first distal portion 936 of the base frame 930, and has a second end portion 972 disposed in a second distal portion 937 of the base frame 930. Specifically, a portion of the first end portion 971 is disposed in a portion of the channel 960 of the first distal portion 936, and a portion of the second end portion 972 is disposed in a portion of the channel 960 of the second distal portion 937.

In some implementations, the backbone component 970 can be coupled to or in contact with an inner surface of one or more portions of the channel 960. In some implementations, one or more portions of the backbone component 970 can be coupled to the base frame 930 using one or more coupling mechanisms such as a screw, a rivet, and/or so forth. In some implementations, the backbone component 970 can have one or more portions pressfit into the channel 960 of the base frame 930.

The first distal portion 936 and the second distal portion 937 are opposite a proximal portion 934 of the base frame 930. The base frame 930 has a first side portion 935 disposed between the first distal portion 936 and the proximal portion 934, and has a second side portion 938 disposed between the second distal portion 937 and the proximal portion 934.

As shown in FIG. 9A, the backbone component 970 can be in contact with at least a portion of the midplane 950. In some implementations, the backbone component 970 can be coupled to (e.g., fixedly coupled to) the midplane 950 using one or more coupling mechanisms such as a screw, a rivet, a weld, and/or so forth. Although not shown in FIG. 9A, in some implementations, a gap can be disposed between the backbone component 970 and the midplane 950. In some implementations, the backbone component 970 can be coupled to the midplane 950 so that the backbone component 970 is not otherwise fixedly coupled to the base frame 930 using a coupling mechanism such as a screw, a rivet, a weld, and/or so forth.

As shown in FIG. 9A, a length I1 (or distance) of the backbone component 970 is greater than a length I2 (or distance) between an end of the first distal portion 936 and an end of the second distal portion 937. The length I1 of the backbone component 970 can be greater than or equal to a length (not shown) between an inner surface of a portion of the channel 960 associated with the first side portion 935 and an inner surface of a portion of the channel 960 associated with the second side portion 938. The length I1 of the backbone component 970 is less than a length I3 of the midplane 950. In some implementations, the length I1 of the backbone component 970 can be greater than or equal to the length I3 of the midplane 950.

Although not shown, in some implementations, at least a portion of the first end portion 971 of the backbone component 970 can be disposed within the channel 960 of the first side portion 935. Also, at least a portion of the second end portion 972 of the backbone component 970 can be disposed within the channel 960 of the second side portion 938. In such implementations, the length I1 of the backbone component 970 can be longer than shown in FIG. 9A.

As shown in FIG. 9A, the midplane 950 includes recesses 951, 952. In some implementations, the recesses 951, 952 can be referred to as slots. The recesses 951, 952 of the midplane 950 can be used to facilitate coupling of the midplane 950 to the base frame 930 and/or the midplane 950.

FIG. 9B is a diagram that illustrates a cross-sectional view of the midplane 950 along line I6 shown in FIG. 9A. FIG. 9B illustrates the recesses 951, 952 of the midplane 950. At least a portion of the midplane 950 is disposed within the channel 960 of the first side portion 935, and at least a portion of the midplane 950 is disposed within the channel 960 of the second side portion 938.

FIG. 9C is a diagram that illustrates a cross-sectional view of the backbone component 970 along line I7 shown in FIG. 9A. FIG. 9C illustrates protrusions 974, 975 that correspond with (and can engage with) the recesses 951, 952 of the midplane 950. The protrusions 974, 975 (also shown in FIGS. 9A, 9D, and 9E) can be inserted into the recesses 951, 952 when the backbone component 970 is being inserted into the base frame 930 (along a direction into FIG. 9A). After the protrusions 974, 975 have been inserted into the recesses 950, 952, the backbone component 970 can be slidably moved (along direction 18 shown in FIG. 9A).

Figure 9D:
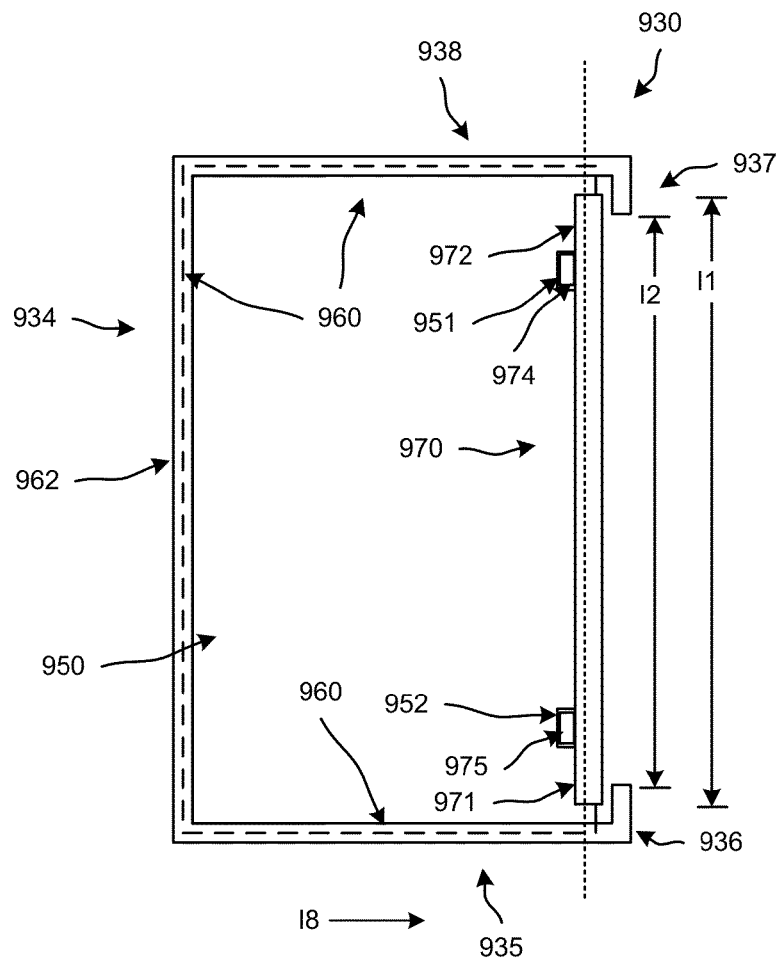
FIG. 9D is a diagram that illustrates the backbone component when protrusions are disposed within the corresponding recesses of the midplane shown in FIG. 9A.

FIG. 9D is a diagram that illustrates the backbone component 970 when the protrusions 974, 975 are disposed within the corresponding recesses 951, 952 of the midplane 950. The backbone component 970 is proximal to the distal portion 936 and the distal portion 937.

Figure 9E:
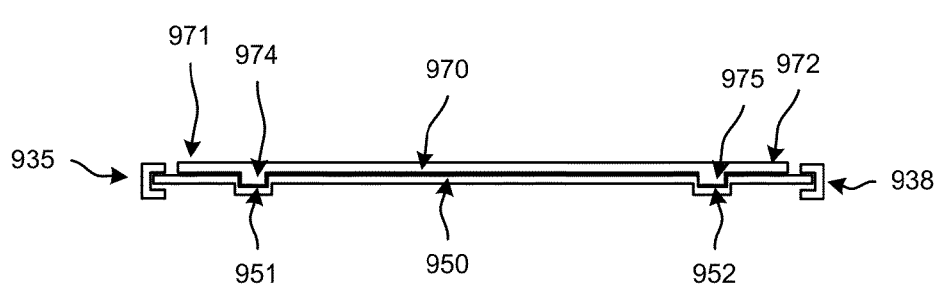
FIG. 9E is a diagram that illustrates a cross-sectional view of the backbone component and the midplane of FIG. 9D.

FIG. 9E is a diagram that illustrates a cross-sectional view of the backbone component 970 and the midplane 950 cut along line I9 of FIG. 9D. As shown in FIG. 9D, the protrusion 974 is disposed in the recess 951, and the protrusion 975 is disposed in the recess 952. In this implementation, a gap is disposed between the first end portion 971 and a surface of the first side portion 935, and a gap is disposed between the second end portion 972 and a surface of the second side portion 938. After being coupled as shown in FIGS. 9D and 9E, the backbone component 970 can be slidably moved with respect to the midplane 950 and the base frame 930 (from a first position to a second position) along direction 18 from the configuration shown in FIGS. 9D and 9E to the configuration shown in FIG. 9A.

Although illustrated as having a protrusion, in some implementations, a backbone component may not include a protrusion. In some implementations, a midplane may also not include a protrusion. In such implementations, the backbone component can be slidably moved along the midplane without having a protrusion that engages a recess of the midplane.

Figure 10D:
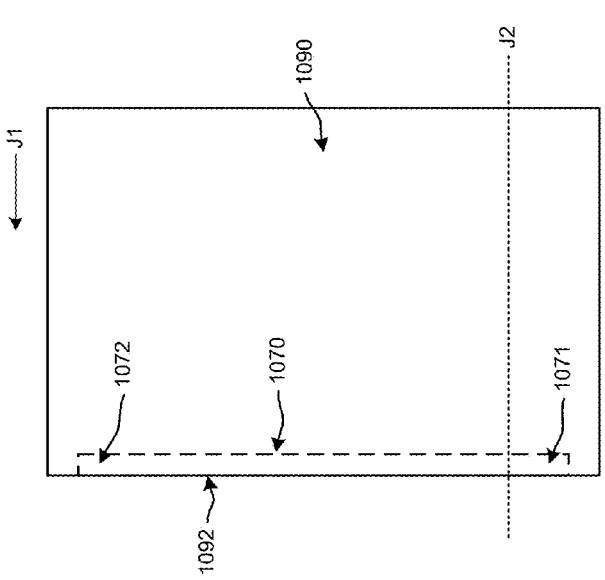

FIGS. 10A through 10E illustrate coupling of a display portion 1090 of a computing device with a base frame 1030 and midplane 1050 via a backbone component 1070. Specifically, FIG. 10A is a diagram that illustrates the display portion 1090 of the computing device coupled to the backbone component 1070. In this implementation, the display portion 1090 is coupled to the backbone component 1070 while the backbone component 1070 is in contact with the midplane 1050 disposed within the base frame 1030. Protrusions (not shown) can be disposed within recesses 1051, 1052 of the midplane 1050. The backbone 1070 is illustrated with a dashed line because it is disposed between the display portion 1090 and the midplane 1050.

The display portion 1090 and the backbone component 1070 can be slidably moved along direction J1 so that the display portion 1090 can be oriented with respect to the base frame 1030 in a desirable fashion. The display portion 1090 and the backbone component 1070 can be coupled in the fashion illustrated in FIG. 10A so that the display portion 1090 can be assembled as part of the computing device. In other words, the display portion 1090 can be assembled as part of the computing device with the base frame 1030 via the backbone component 1070 and the midplane 1050. Said differently, the backbone component 1070 can function as a component via which the display portion 1090 is coupled to the base frame 1030.

In some implementations, the direction J1 can be orthogonal to (e.g., substantially orthogonal to) a lateral direction (illustrated as direction J8 or as direction J9) along which the midplane 1050 is inserted into one or more of the channels of the base frame 1030 (as described in connection with the figures above).

FIG. 10B is a diagram that illustrates a cross-sectional view cut along line J2 of the computing device. As shown in FIG. 10B, the display portion 1090 is aligned along a plane J3 that is substantially parallel to a plane J4 along which the base frame 1030 and midplane 1050 are aligned. Accordingly, the display portion 1090 can be translated along direction J1 with respect to the base frame 1030 when the display portion 1090 is being coupled to the base frame 1030 via the midplane 1050 and the backbone component 1070. In some implementations, the components shown in FIG. 10B can be constructed so that the display portion 1090 may be slidably moved with respect to the base portion 1030 when the plane J3 (along which the display portion 1090 is aligned) is parallel to, or substantially parallel to, the plane J4 (along which the base frame 1030 is aligned).

FIG. 10C is a diagram that illustrates a side view of the display portion 1090 coupled to the backbone component 1070 before being inserted into the midplane 1050 and the base frame 1030. In this diagram, a protrusion 1071 of the backbone component 1070 is shown. In some implementations, the protrusion 1071 can be oriented with respect to the backbone 1070 in a different fashion than shown in FIG. 10C. For example, the protrusion 1071 can be oriented on a different side of the backbone component 1070 than shown in FIG. 10C.

Referring back to FIG. 10A, a gap 1038 (or break in the base frame 1030) is disposed between the first distal portion 1036 and the second distal portion 1037. In other words, the base frame 1030 defines a gap 1038 between the first distal portion 1036 and the second distal portion 1037 so that the channel 1060 is not continuous between the first distal portion 1036 and the second distal portion 1037. The base frame 1030 can have the gap 1038 so that a hinge 1092 (or a portion thereof) associated with the display portion 1090 can be disposed within the gap 1038. In some implementations, the hinge 1092 can have a portion that rotates into or through the gap 1038 when the computing device 100 is being operated by a user. At least a portion of the display portion 1090 can be configured to rotate via an axis away from the base frame 1030 using the hinge 1092. An example of a rotation direction is illustrate as direction J10 in FIG. 10E. An example of a display portion rotated away from a base portion (that includes a base frame) is shown in FIG. 1B.

Figure 10E:
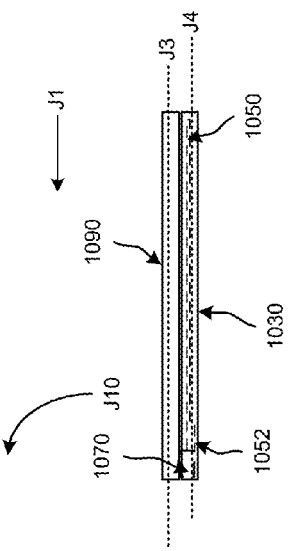

FIG. 10D is a diagram that illustrates a top view of the computing device after the display portion 1090 has been moved along direction J1. The base frame 1030, and components coupled thereto, are not visible in this view because they are being hidden by the display portion 1090. FIG. 10E is a diagram that illustrates a cross-sectional view of the computing device cut along J2 of FIG. 10D. As shown in FIG. 10E, the display portion 1090 is disposed above the base frame 1030.

Figure 11:
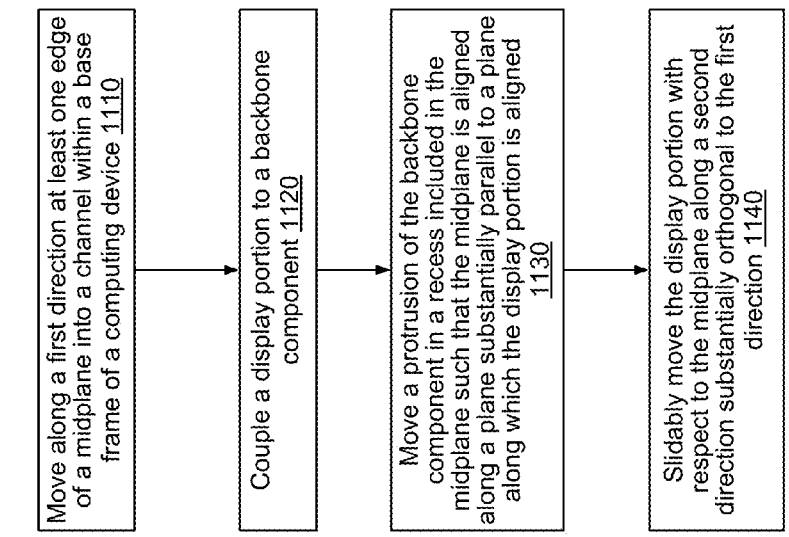
FIG. 11 is a flowchart that illustrates a method for assembling components of a computing device.

FIG. 11 is a flowchart that illustrates a method for assembling components of a computing device. Specifically, the flowchart illustrates a method for assembling a display portion with a base frame via a midplane and a backbone component.

As shown in FIG. 11, at least one edge of a midplane is moved along a first direction into a channel within a base frame of a computing device (block 1110). In some implementations, the movement can be similar to the movement methodologies described above in connection with, for example, FIGS. 3A through 8.

A display portion is coupled to a backbone component (block 1020). In some implementations, the display portion can include a hinge that is coupled to the backbone component. In some implementations, the hinge can be coupled to the backbone component using one or more coupling mechanisms such as a screw, and/or so forth.

A protrusion of the backbone component is moved in a recess included in the midplane such that the midplane is aligned along the plane substantially parallel to a plane along which the display portion is aligned (block 1130). In some implementations, the midplane may not have a protrusion and/or the backbone may not have a recess. In some implementations, the display portion can be coupled to the backbone component after the backbone component has been contacted with the midplane.

The display portion is slidably moved with respect to the midplane along a second direction substantially orthogonal to the first direction (block 1140). In some implementations, the display portion can be coupled to the backbone component after the backbone component has been slidably moved with respect to the midplane. In some implementations, the display portion can be slidably moved until the display portion is in a desirable position with respect to the base frame. In some implementations, the display portion can be slidably moved until the base component is aligned in a desirable position with respect to the midplane so that the base component can be coupled to (e.g., fixedly coupled to) the midplane. In some implementations, the display portion can be slidably moved until the base component is disposed within (or contacts and inner surface of) one or more channels of the base frame.

FIG. 12 is a diagram that illustrates a plate 1290, according to an implementation. The plate 1290, which can be referred to as a bottom plate, as a conductive plate (e.g., a thermal conductive plate), or as a backplate, can be coupled to (or in contact with) a midplane 1250 and to a backbone component 1270, which are coupled to a base frame 1230. For example, the plate 1290 can have a first portion coupled to the midplane 1250 and a second portion coupled to the backbone component 1270. In other words, at least a portion of the plate 1290 can cantilever from the midplane 1250 and can be disposed over at least a portion of the backbone component 1270 as shown in FIG. 12. In some implementations, the plate 1290 can be fixedly coupled to the midplane 1250 and/or to the backbone component 1270 using one or more coupling mechanisms such as a screw, a rivet, a weld, an adhesive, and/or so forth.

In some implementations, the plate 1290 can be coupled to (or in contact with) the midplane 1250 without being coupled to (or in contact with) the backbone component 1270. In some implementations, the plate 1290 can be coupled to (or in contact with) the backbone component 1270 without being coupled to (or in contact with) the midplane 1250.

In some implementations, the plate 1290 can be separated from (e.g., insulated by a gap from) both the midplane 1250 and the backbone component 1270. In such implementations, other components included in the computing device can be disposed between the plate 1290 and the midplane 1250, and/or can be disposed between the plate 1290 and the backbone component 1270. In some implementations, the plate 1290 can be coupled to the midplane 1250 and/or to the backbone component 1270 at a few locations that have a relatively small surface area.

As shown in FIG. 12, the plate 1290 can be disposed outside of one or more channels 1260 of the base frame 1230. The plate 1290 is included in (e.g., is disposed within) at least a portion of an opening 1202 defined by the base frame 1230.

In some implementations, the plate 1290 can function as a heat sink for a computing device including the base frame 1230 and the components thereof. For example, one or more electronic components can be coupled to the midplane 1250. Heat can be transferred via the midplane 1250 to the plate 1290 (or vice versa) through direct coupling of the midplane 1250 to the plate 1290. Similarly, heat from one or more electronic components coupled to the backbone component 1270 can be transferred to the plate 1290 (or vice versa) through direct coupling of the backbone component 1270 to the plate 1290.

A conductive element or material (not shown) can be used to transfer heat (or to facilitate transfer of heat) between the midplane 1250 and the plate 1290 and/or to transfer heat (or to facilitate transfer of heat) between the backbone component 1270 and the plate 1290. Although not shown in FIG. 12, in some implementations, the conductive element or material can include one or more materials such as graphite or another material.

The midplane 1250, the backbone component 1270, and the plate 1290 can each be made of a conductive material, or can include a conductive material. In some implementations, one or more of the midplane 1250, the backbone component 1270, and the plate 1290 can be made of an insulating material, or can include an insulating material. In some implementations, the plate 1290 can be made of a different material than the midplane 1250 and/or the backbone component 1270. For example, the plate 1290 can be made of an aluminum material (or alloy) and the midplane 1250 can be made of a magnesium material (or alloy). As another example, the plate 1290 can be made of an aluminum material (or alloy), and the backbone component 1270 can be made of a magnesium material (or alloy).

As shown in FIG. 12, a surface area of the plate 1290 can be different than a surface area of the midplane 1250. The surface area of the plate 1290 can be smaller than the surface area of the midplane 1250.

Although not shown in FIG. 12, in some implementations, one or more foot pads (not shown) associated with the computing device can be coupled to the plate 1290. In such implementations, heat that is transferred to the plate 1290 can also be transferred to via the foot pads to another structure such as a table on which the computer devices is placed.

FIG. 13 is a diagram that illustrates a side cross-sectional view of a midplane 1350 coupled to a plate 1390. As shown in FIG. 13, a backbone component 1370 is coupled to the midplane 1350. In this implementation, the midplane 1350 is coupled to the plate 1390 via a protrusion 1352 that is part of the midplane 1350. In some implementations, the protrusion 1352 can have a different configuration that shown in FIG. 13. In some implementations, the plate 1390 can have one or more protrusions through which the plate 1390 can be coupled to the midplane 1350.

In this side cross-sectional view, a conductive element 1310 is coupled to the midplane 1350 and coupled to the plate 1390. Conductive element 1310 can be configured to facilitate transfer of heat from the midplane 1350 to the bottom plane 1390, or vice versa.

Also, as shown in this side cross-sectional view of FIG. 13, a footpad 1315 is coupled to the plate 1390. In some implementations, the footpad 1315 can be coupled to the plate 1390 via a casing or housing (not shown) of a computer device.

Figure 14A:
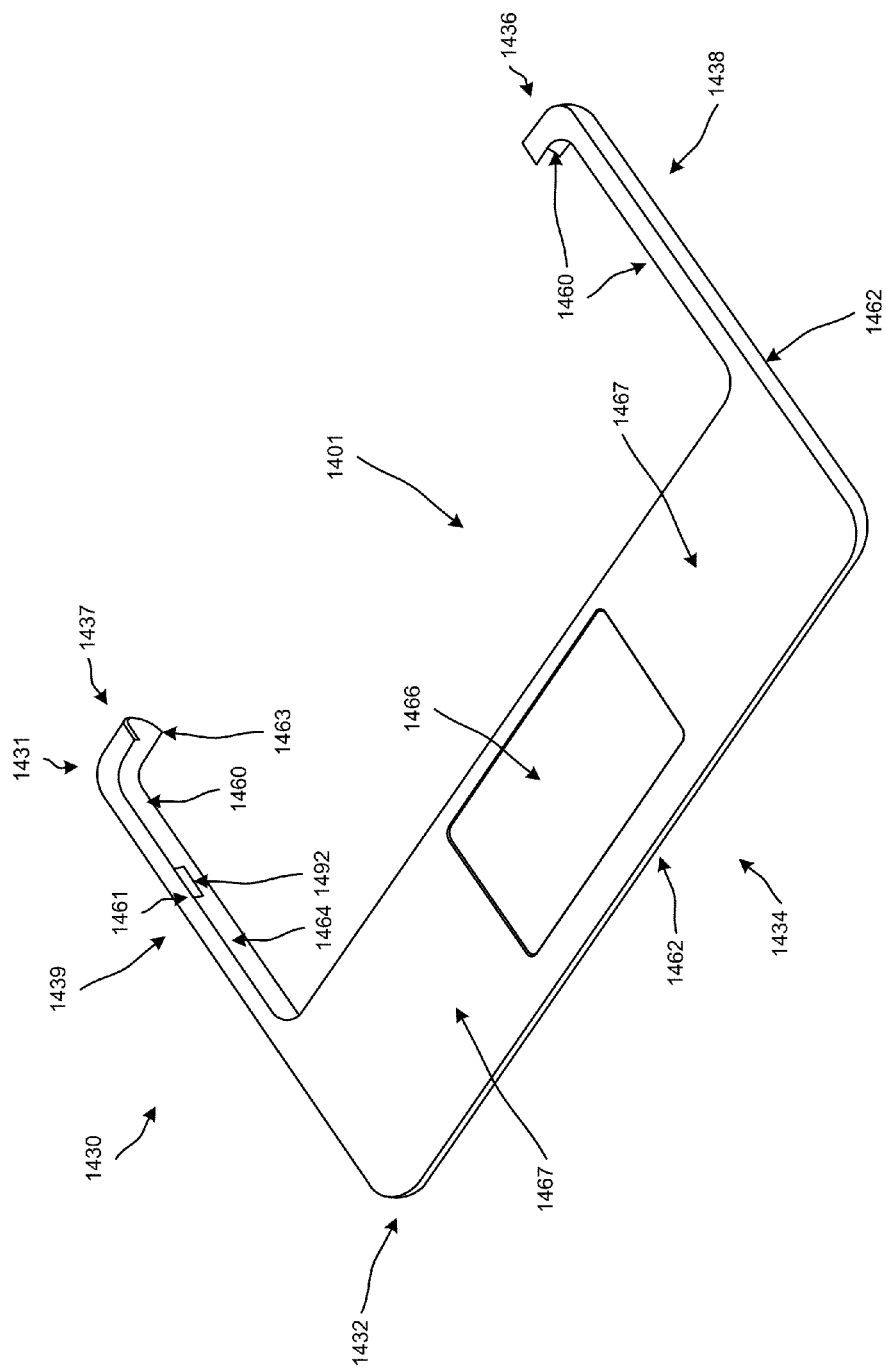
FIG. 14A is a diagram that illustrates a top perspective view of a base frame of a computing device.

FIG. 14A is a diagram that illustrates a top perspective view of a base frame 1430 of a computing device, according to an implementation. The base frame 1430 can be coupled together with, for example, a backbone component (not shown), and a midplane (not shown) as a structure of the computing device.

As shown in FIG. 14A, the base frame 1430 has a channel 1460 that extends along the entirety of a perimeter of the base frame 1430. Specifically, the channel 1460 is defined by a side wall 1462, a top wall 1461 and a bottom wall 1463. An inner surface 1464 of the channel 1460 is illustrated in FIG. 14A.

The channel 1460 is included in a first distal portion 1436 (also can be referred to as a backbone coupling portion) and a second distal portion 1437 (also can be referred to as a backbone coupling portion). The channel 1460 is also included in a proximal portion 1434 of the base frame 1430.

The base frame 1430 also includes a first extension portion 1438 and a second extension portion 1439. A portion of the channel 1460 associated with the first extension portion 1438 is contiguous with a portion of the channel 1460 associated with the first distal portion 1436. Similarly, a portion of the channel 1460 associated with the second extension portion 1437 is contiguous with a portion of the channel 1460 associated with the second extension portion 1439.

In this implementation, the base frame 1430 includes an opening 1466 for, for example, a trackpad or other type of input device. The base frame 1430 also defines an opening 1401 within which a midplane can be inserted. Also, a keyboard or other type of input device can be disposed within the opening 1401. The top wall 1461 of the base frame 1430 has a top surface that includes or defines palm rest regions 1467.

As shown in FIG. 14A, an opening 1492 is included in (e.g., defined by) at least a portion of the base frame 1430. Specifically, the opening 1492 is disposed within at least a portion of the side wall 1462. The opening 1492 can be an opening through which one or more electronic components can be disposed. For example, a USB port, a power port, a signal port, an audio port, a memory port, and/or so forth, can be exposed outside of the base frame 1430 via the opening 1492.

As shown in FIG. 14A, the base frame 1430 can have one or more curved corners such as curved corner 1431. The curved corners can be disposed between two of the sides of the base frame 1430, which can be orthogonal to one another. Specifically, curved corner 1431 is disposed between the second extension portion 1439 and the second distal portion 1437. The second distal portion 1437 is aligned along an axis that is orthogonal to an axis along which the second extension portion 1439 is aligned. In some implementations, one or more corners of the base frame can be sharp or pointed rather than curved.

Figure 14B:
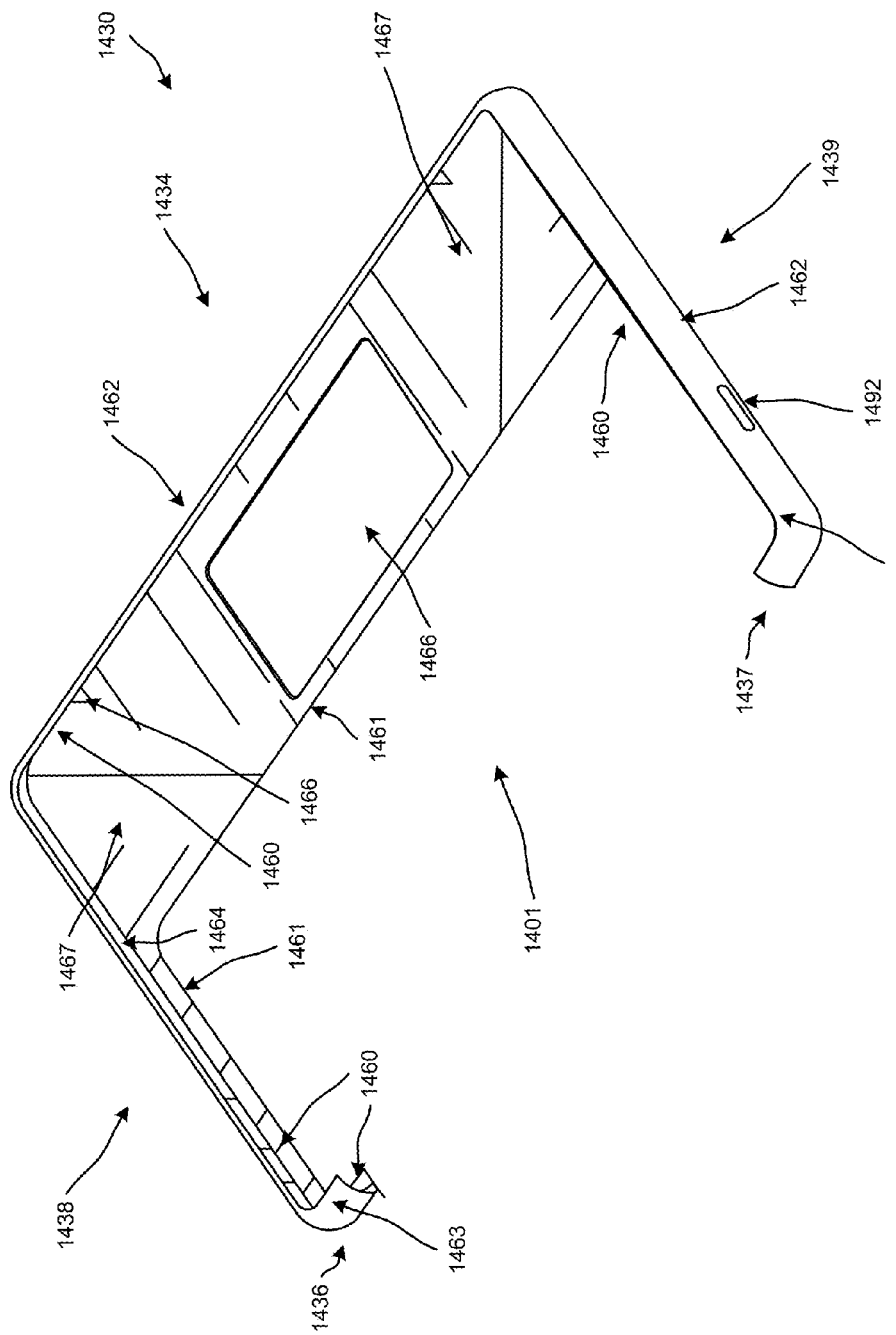
FIG. 14B is a diagram that illustrates a bottom perspective view of the base frame shown in FIG. 14A.

FIG. 14B is a diagram that illustrates a bottom perspective view of the base frame 1430 shown in FIG. 14A, according to an implementation. In this view of the base frame 1430, more of the channel 1460 can be seen than in FIG. 14A.

As shown in FIG. 14B, a support member 1466 is disposed within the channel 1460. The support member 1466 is disposed between or extends between the top wall 1461 and the bottom wall 1463. The support member 1466 can also be in contact with a portion of the side wall 1462. In some implementations, the support member 1466 can be in contact with at least a portion of the inner surface 1464 of the channel 1460. In some implementations, the support member 1466 can segment or divide the channel 1460 into different portions.

FIG. 15A is a diagram that illustrates a perspective top view of a midplane 1550. The midplane 1550 includes an opening 1559 for, for example, an input device such as a trackpad or another input device. The midplane 1550 also includes several recesses 1551 through 1555. Each of the recesses 1551 through 1555 can be configured to receive a protrusion associated with a backbone component (not shown). The midplane 1550 includes a midplane extension 1558 to which one or more portions of a backbone component (e.g., protrusions of a backbone component) can be coupled. The midplane extension 1558 can include one or more openings (e.g., treaded openings) through which one or more coupling mechanisms such as a screw, a rivet, a weld, and/or so forth can be inserted for coupling of a backbone component or another component to the midplane 1550.

A side cross-sectional view of the midplane extension 1558 cut along line K of FIG. 15A is shown in FIG. 15B. As shown in FIG. 15B, the midplane extension 1558 is aligned along a plane that is parallel to (e.g., substantially parallel to) a plane along which the midplane 1550 is aligned.

Figure 16:
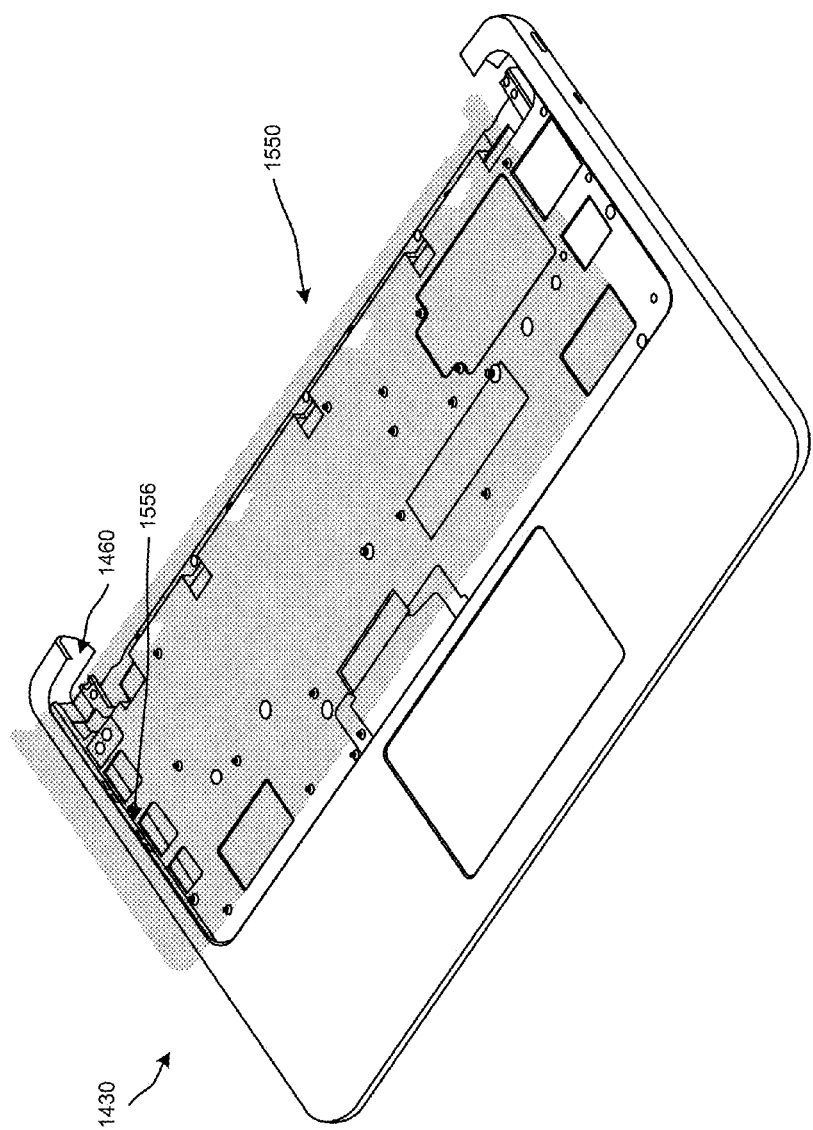
FIG. 16 is a diagram that illustrates the midplane shown in FIGS. 15A and 15B coupled to the base frame shown in FIGS. 14A and 14B.

FIG. 16 is a diagram that illustrates the midplane 1550 shown in FIGS. 15A and 15B coupled to the base frame 1430 shown in FIGS. 14A and 14B. The midplane 1550 can be coupled to the base frame 1430 using any of the methods described above (e.g., tilt-in methods, heat bonding methods). As shown in FIG. 16, at least a portion of the midplane 1550 (e.g., portion 1556) is disposed within at least a portion of the channel 1460 of the base frame 1430.

FIG. 17A is a diagram that illustrates the midplane 1550 shown in FIGS. 15A and 15B coupled to a backbone component 1790. The midplane 1550 is also coupled to the base frame 1430 shown in FIGS. 14A and 14B.

As shown in FIG. 17A, the backbone component 1790 includes a portion 1799 that is at least partially disposed within a portion of the channel 1460 associated with the first distal portion 1436 (or backbone coupling portion) of the base frame 1430. The backbone component 1790 also includes a portion 1798 that is at least partially disposed within a portion of the channel 1460 associated with the second distal portion 1437 (or backbone coupling portion) of the base frame 1430.

The backbone component 1790 also includes protrusions 1791 through 1795. Each of the protrusions 1791 through 1795 corresponds respectively with the recesses 1551 through 1555 of the midplane 1550.

As shown in FIG. 17A, the backbone component 1790 can be moved into (and coupled to) the midplane 1550 by moving the backbone component 1790 along direction L1. The direction L1 can be a vertical direction that is normal to a plane along which the base frame 1430 and the midplane 1550 are aligned. The backbone component 1790 can then be moved along direction L2 to the position shown in FIG. 17A with the portions 1798, 1799 at least partially disposed within the channel 1460. The direction L2 can be orthogonal to (or substantially orthogonal to) direction L1. In some implementations, the direction L2 can be referred to as a distal direction because the direction L2 is along a direction away from the proximal portion 1434 of the base frame 1430. The direction L2 can also be aligned along (or within) a plane along which the base frame 1430 and the midplane 1550 are aligned.

In some implementations, the direction L2 can be different than a direction L7, a direction L8, and/or a direction L9 along which edges of the midplane 1550 are moved into portions of the channel 1460. For example, the direction L2 can be opposite direction L8, which can be a direction along which a proximal edge of the midplane 1550 is inserted into a portion of the channel 1460 associated with the proximal portion 1434 of the base frame 1430. Similarly, the direction L2 can be orthogonal direction L7, which can be a direction along which a side edge of the midplane 1550 is inserted into a portion of the channel 1460 associated with a side of the base frame 1430.

As shown in FIG. 17A, a gap 1797 is disposed between the backbone component 1790 and the midplane 1550. Specifically, the gap 1797 is disposed between the backbone component 1790 and the midplane 1550 when the backbone component 1790 is coupled to the midplane extension 1558 of the midplane 1550.

In this implementation, each of the protrusions 1791 through 1795 includes at least one opening (e.g., an opening there through). For example, protrusion 1794 includes openings 1762 (individually labeled as 1762A and 1762B). The openings (e.g., openings 1762) can be openings through which a coupling mechanism such as a screw, a rivet, a weld, an adhesive, and/or so forth can be inserted (e.g., disposed) so that backbone component 1790 can be coupled to the midplane 1550. Accordingly, one or more of the openings can correspond with openings included in the midplane 1550 (e.g., the midplane extension 1558 of the midplane 1550). In some implementations, one or more protrusions included in a backbone component may not include an opening.

FIG. 17B is a diagram that illustrates a cross-sectional view of a portion of the backbone component 1790 and the midplane 1550 cut along line L3. As shown in FIG. 17B, the protrusion 1794 of the backbone component 1790 is in contact with a top surface of the midplane extension 1558, which is part of the midplane 1550. At least 1762A is aligned with opening 1582 included in the midplane extension 1558. Although not shown in FIG. 17B, in some implementations a coupling mechanism can be used to couple at least a portion of the backbone component 1790 to the midplane 1550 via the opening 1582 and the openings 1762A.

As shown in FIG. 17A, the protrusions 1794 is aligned along an axis L4 that is parallel to a line L5 (or plane) along which the midplane 1550 (or midplane extension 1558) is aligned. In this implementation, each of the protrusions 1791 through 1795 is aligned parallel to the midplane 1550 (and the base frame 1530).

Figure 17C:
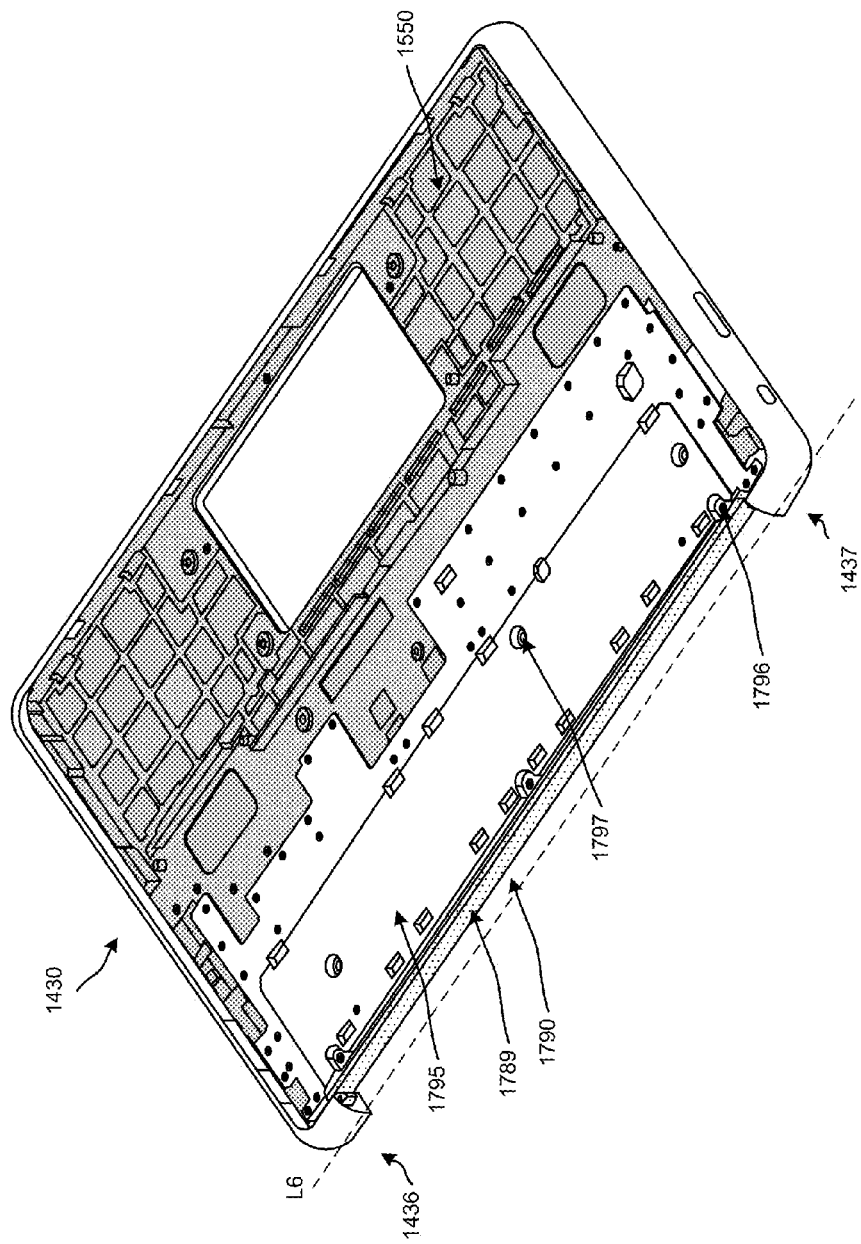
FIG. 17C is a diagram that illustrates a perspective view of a plate coupled to the midplane and to the backbone component shown in FIG. 17A.

FIG. 17C is a diagram that illustrates a perspective view of a plate 1795 coupled to the midplane 1550 and to the backbone component 1790. The plate 1795 can be coupled to the backbone component 1790 via one or more coupling mechanisms (not shown) via one or more openings in the plate 1795 such as opening 1796. Similarly, the plate 1795 can be coupled to the midplane 1550 via one or more coupling mechanisms (not shown) via one or more openings in the plate 1795 such as opening 1797.

As shown in FIG. 17C, a distal surface 1789 of the backbone component 1790 can be recessed relative to a distal surface of the base frame 1430 which is illustrated by the dashed line L6. The distal surface 1789 backbone component 1790 can be recessed so that a hinge associated with a display portion (not shown) can be coupled to the backbone component 1790 and between the distal portions 1436, 1437 of the base frame 1430.

Figure 17D:
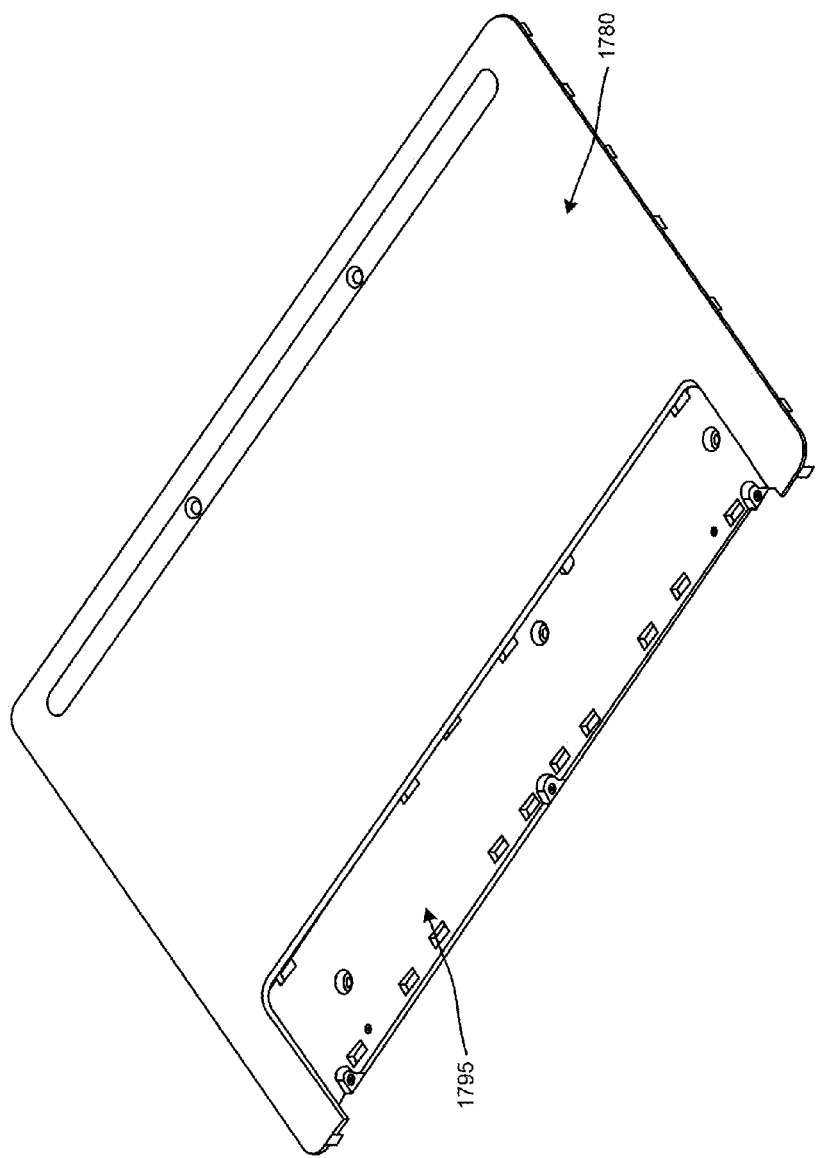
FIG. 17D is a diagram that illustrates a perspective view of a side of a cover coupled to the plate shown in FIG. 17C.

FIG. 17D is a diagram that illustrates a perspective view of a side of a cover 1780 coupled to the plate 1795 shown in FIG. 17C. The cover 1780, which can be referred to as a bottom cover, can define at least a portion or D-case of a housing of a computing device. In some implementations, the cover 1780 can define a cosmetic cover of the housing of the computing device. In some implementations, heat can be transferred from the plate 1795 to the cover 1780. Although not shown, the cover 1780 can be coupled to the assembly shown in FIG. 17C.

Figure 17E:
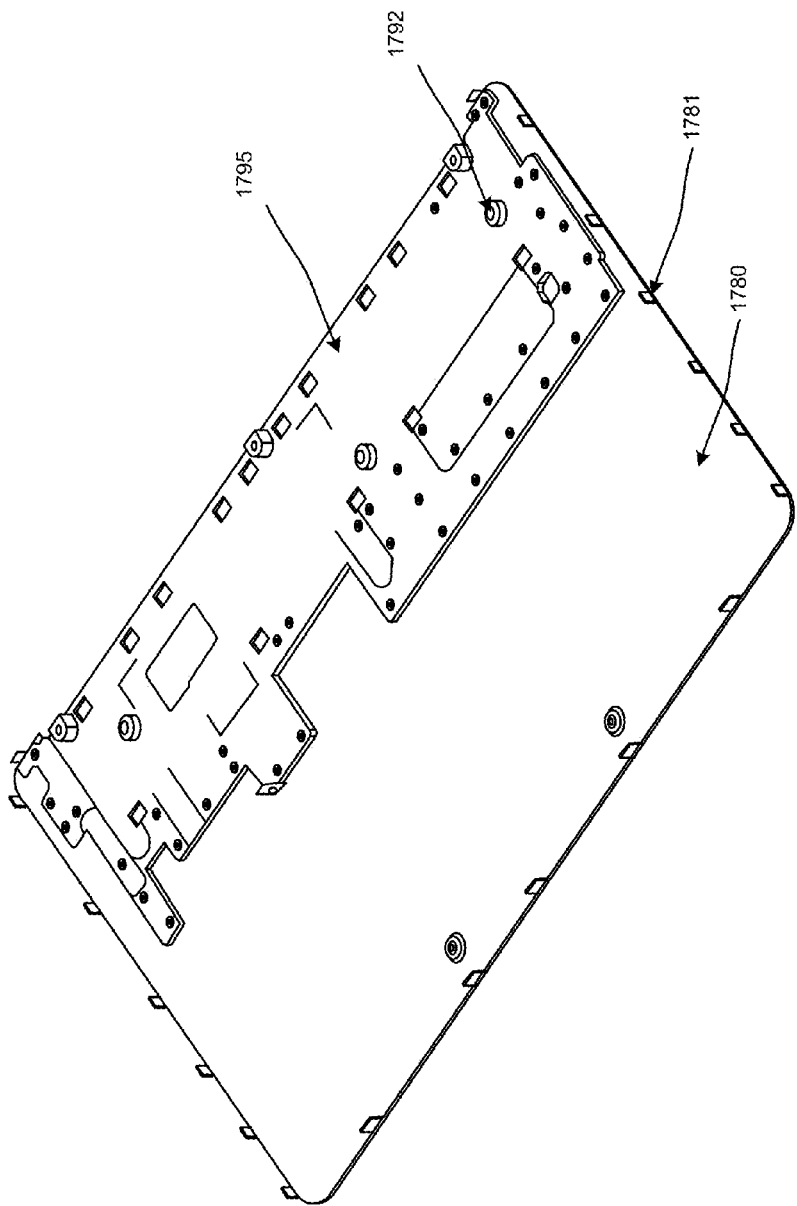
FIG. 17E is a diagram that illustrates a perspective view of an opposite side of the cover and plate shown in FIG. 17D.

FIG. 17E is a diagram that illustrates a perspective view of an opposite side of the cover 1780 and plate 1795 shown in FIG. 17D. The cover 1780 includes tabs or protrusions (e.g., protrusion 1781) that can be used to couple the cover 1780 and the plate 1795 to the assembly shown in FIG. 17C. The plate 1795 also includes protrusions (e.g., a protrusion 1792) that can be used to separate the bulk of the plate 1795 from the midplane 1550. The plate 1795 can be coupled to the midplane 1550 via the protrusions (e.g., the protrusion 1792).

As noted above, details related to a display portion and a bezel of a computing device are described in connection with at least FIGS. 18 through 30 below. The implementations described in connection with FIGS. 18 through 30 can be combined with any of the implementations described in connection with FIGS. 1 through 17E and/or FIGS. 31A through 45.

Figure 18:
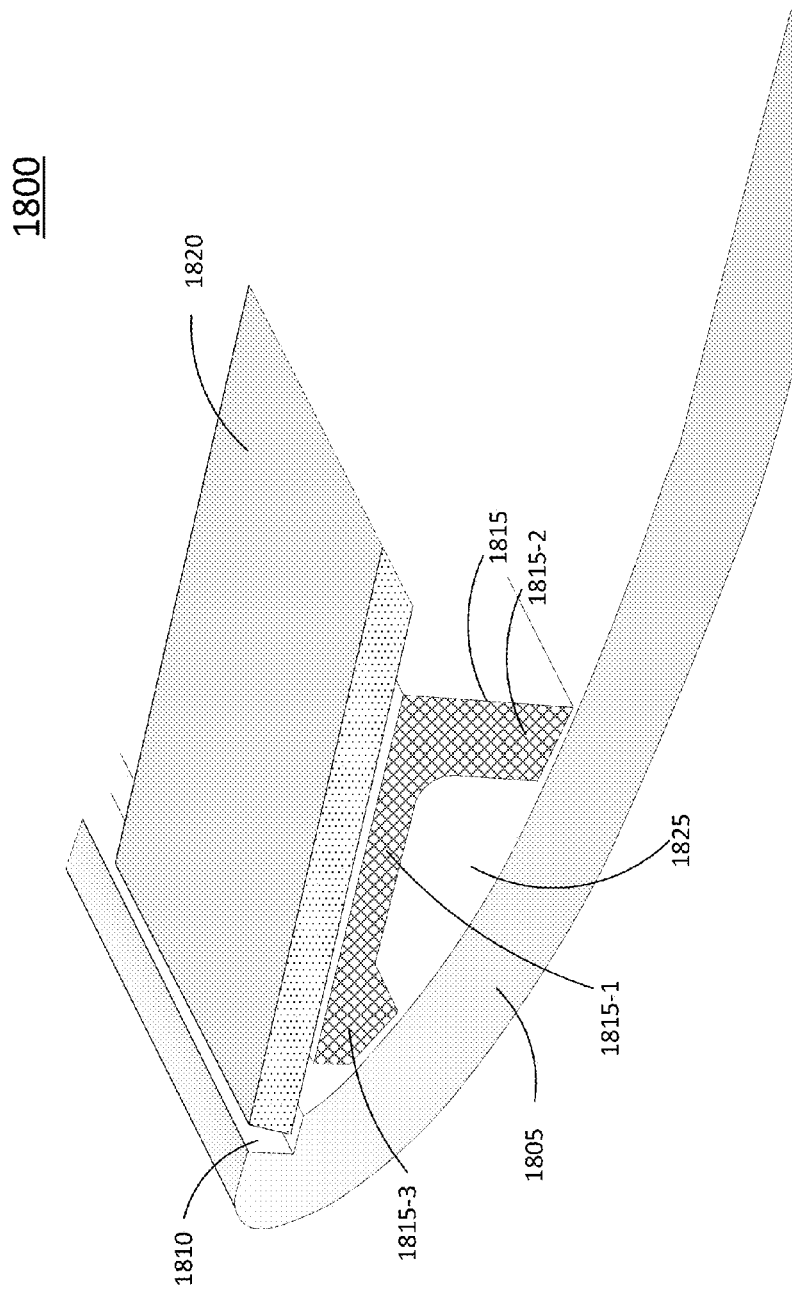
FIG. 18 illustrates a block diagram of a cross-section of a computer display including a bezel.

FIG. 18 illustrates a block diagram of a cross-section of a computer display including a bezel according to at least one example implementation. As shown in FIG. 18, the section of a computer display 1800 includes a display casing 1805, a display casing cut-out 1810, a bezel frame 1815, and a bezel 1820. The bezel frame 1815 may include a first portion 1815-1, a second portion 1815-2 and a third portion 1815-3. The first portion 1815-1, the second portion 1815-2 and the third portion 1815-3 may be configured to define a cavity or gap 1825.

The first portion 1815-1 may be parallel, or substantially parallel to the bezel 1820. The first portion 1815-1 may be in contact with the bezel 1820 and positioned between the display casing 1805 and the bezel 1820. The second portion 1815-2 and the third portion 1815-3 may extend away from the first portion 1815-1 toward the display casing 1805. The second portion 1815-2 and the third portion 1815-3 may be in contact with a surface (e.g., an inner surface) of the display casing 1805. An end of the second portion 1815-2 and/or the third portion 1815-3 may be angled in order to conform with the shape of the display casing 1805. The second portion 1815-2 and the third portion 1815-3 may be a different length. However, if the display casing 1805 (or a portion of the display casing 1805) is straight (or substantially straight), the second portion 1815-2 and the third portion 1815-3 may be a same (or substantially same) length.

The bezel frame 1815 may be configured to support the bezel 1820 as well as define the cavity 1825. The cavity 1825 may be configured to provide a route for passing other components (e.g., wires or cables). The cavity 1825 may be configured to provide an area for fixing other components (e.g., cameras and antennas). The bezel 1820 and/or the bezel frame may be configured to hold or help hold other components (e.g., a display panel) in a fixed position. The bezel 1820 may be configured to present an aesthetically pleasing finish for a computer device including the section of a computer display 1800. Although the cavity 1825 is shown as substantially rectangular, example implementations are not limited thereto. For example, the cavity 1825 may be triangular or circular. As a result, the shape of the first portion 1815-1, the second portion 1815-2 and the third portion 1815-3 may vary accordingly in order to define the desired shape of the cavity 1825.

Figure 19:
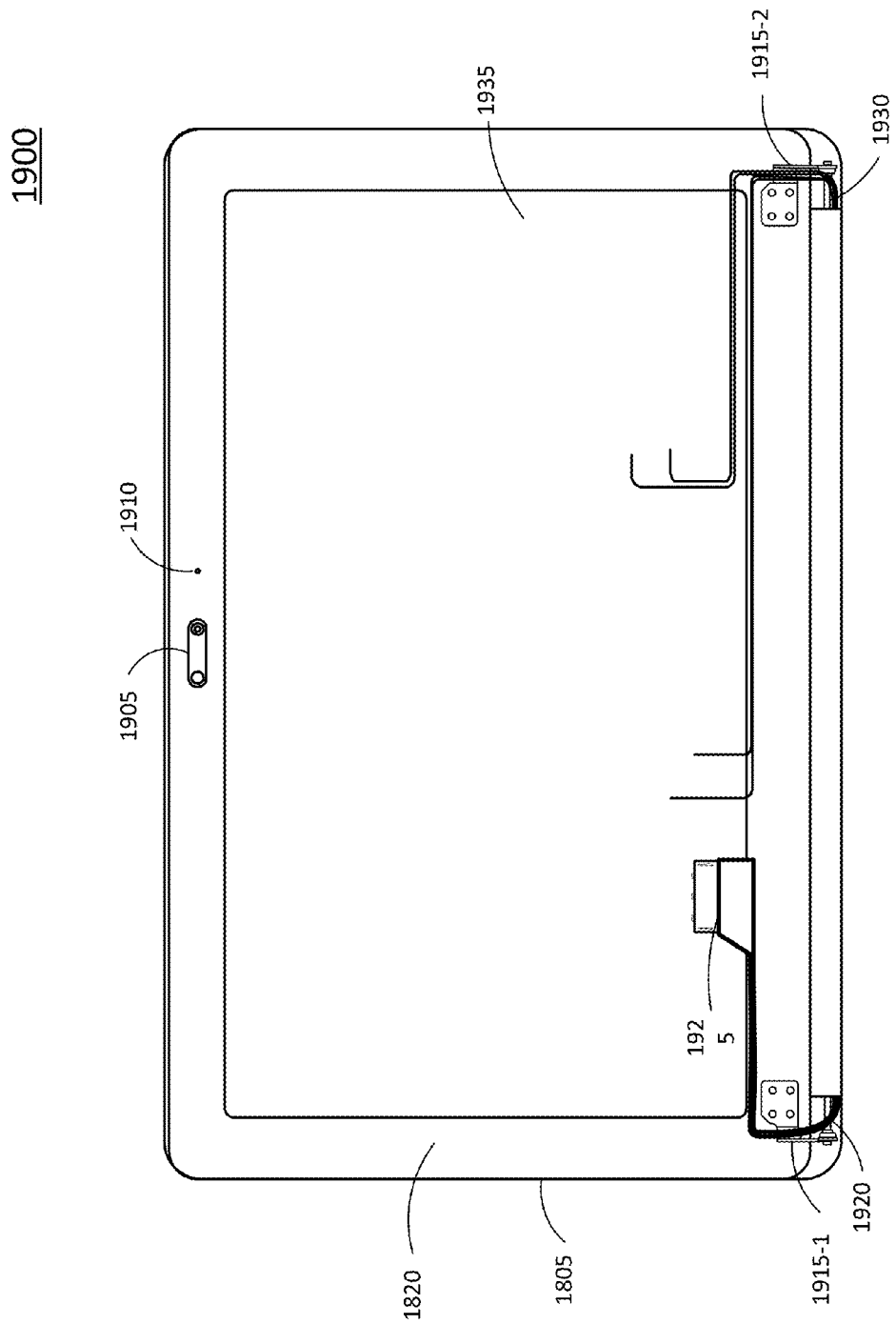
FIGS. 19 through 21 illustrate front views, at different stages of assembly, of a computer display.
Figure 20:
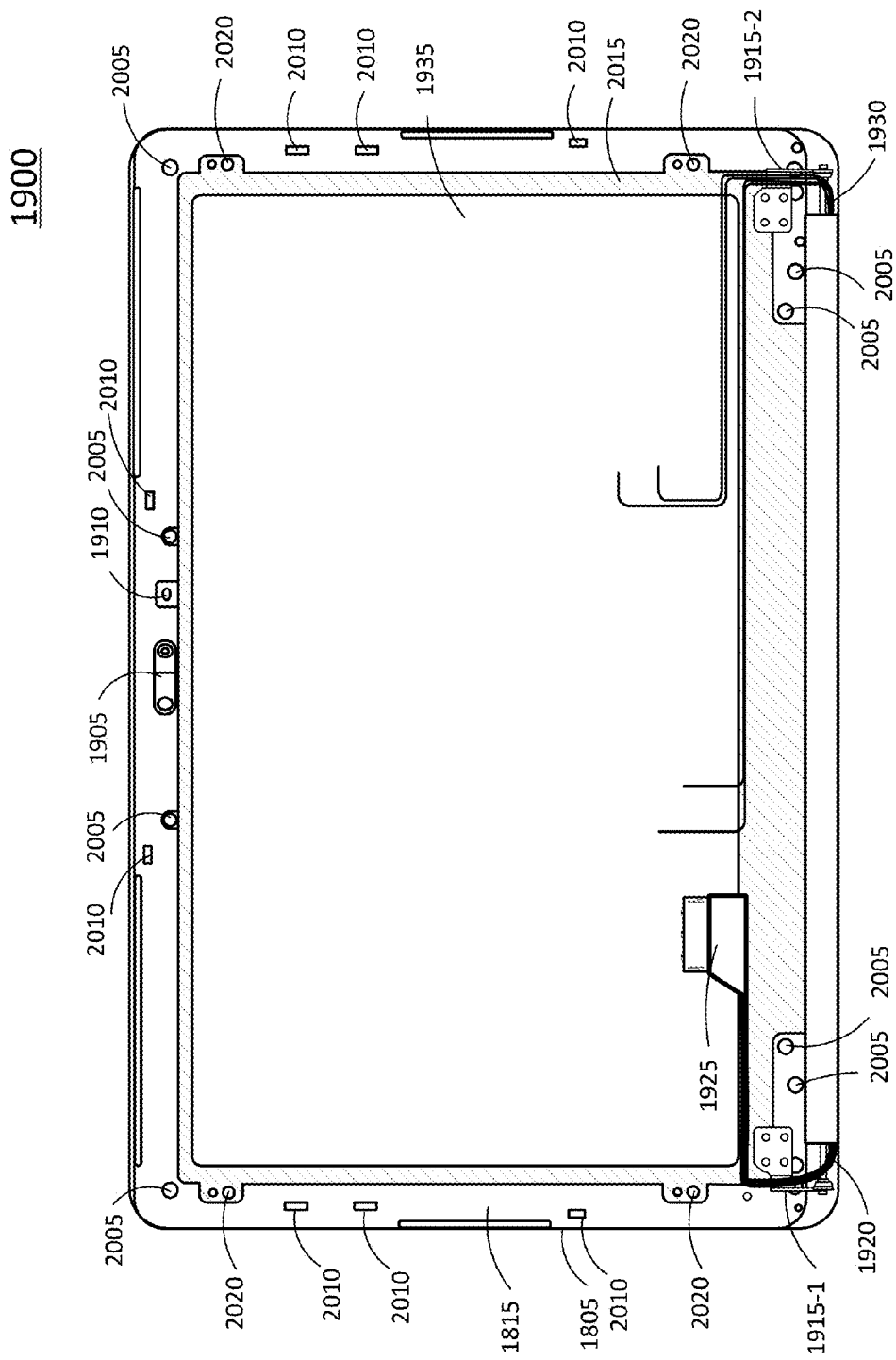
Figure 21:
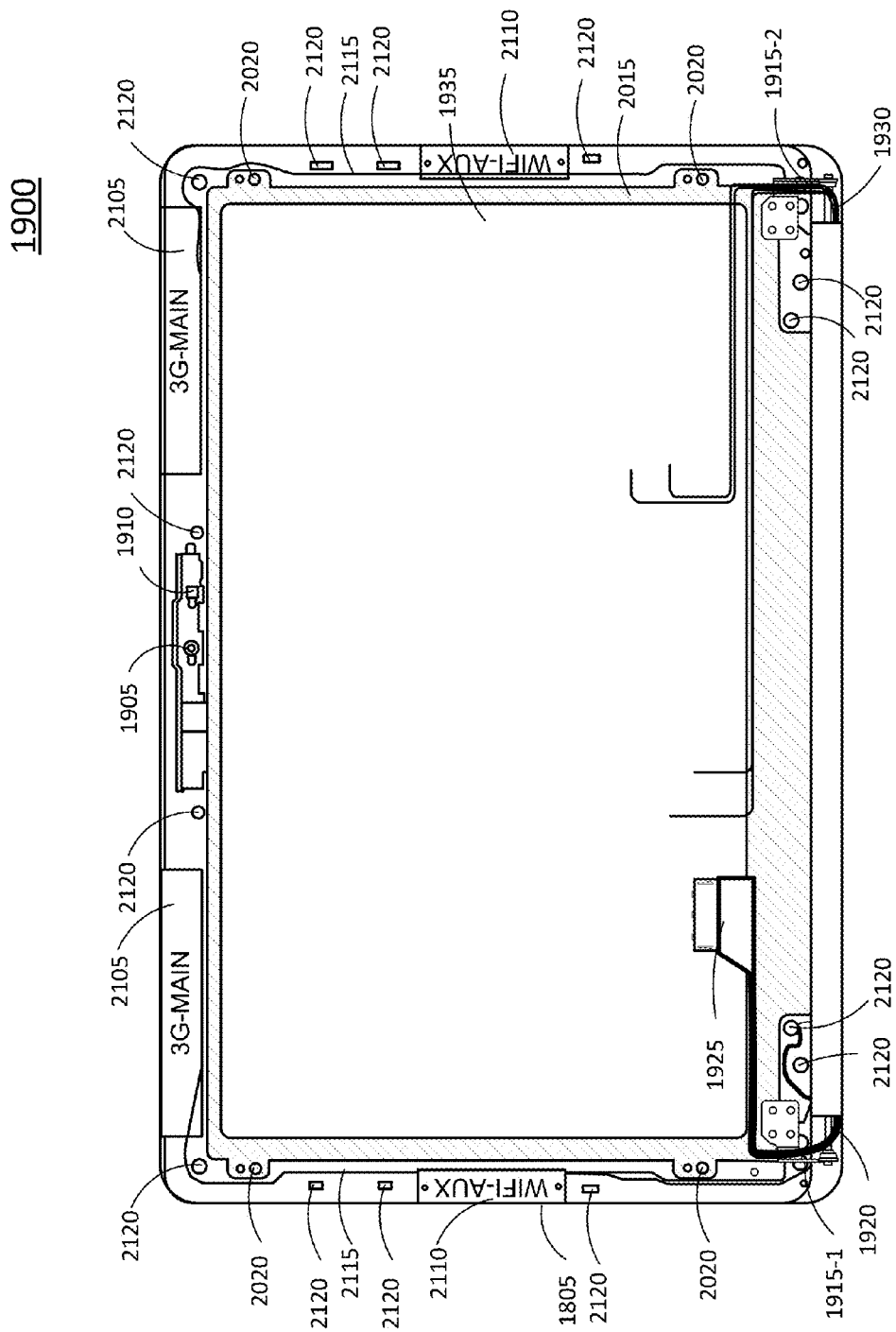

FIGS. 19 through 21 illustrate front views, at different stages of assembly, of a computer display according to at least one example implementation. FIG. 19 illustrates a front view of the computer display in an assembled condition such that the bezel 1820 encloses other elements of the computer display 1900. As shown in FIG. 19, the computer display 1900 may be associated with, for example, a laptop computer. The computer display 1900 may include the display casing 1805 and the bezel 1820. The computer display 1900 may further include a camera 1905, a microphone 1910, hinges 1915-1, 1915-2, a first wire bundle 1920, a connector 1925, a second wire bundle 1930, and a display panel 1935.

In some implementations, the display panel 1935 can be, for example, a touch sensitive display. In some implementations, the display panel 1935 can be, or can include, for example, an electrostatic touch device, a resistive touchscreen device, a surface acoustic wave (SAW) device, a capacitive touchscreen device, a pressure sensitive device, a surface capacitive device, a projected capacitive touch (PCT) device, and/or so forth. If the display panel 1935 is a touch sensitive device, the second wire bundle 1930 may include wires connected to, for example, a pressure sensor in order to communicate touch related signals to a processor associated with the computing device. If the display panel 1935 is a touch sensitive device, the display panel 1935 can function as an input device. For example, the display panel 1935 can be configured to display a virtual keyboard (e.g., emulate a keyboard) that can be used by a user as an input device.

In some implementations, the computer display 1900 is included in a traditional laptop-type device with a traditional laptop-type form factor. In some implementations, the computer display 1900 can be (or can be included in), for example, a wired device and/or a wireless device (e.g., Wi-Fi enabled device) and can be, for example, a computing entity (e.g., a personal computing device), a server device (e.g., a web server), a mobile phone, a personal digital assistant (PDA), a tablet device, e-reader, and/or so forth. The computer display 1900 can be included in a computing device configured to operate based on one or more platforms (e.g., one or more similar or different platforms) that can include one or more types of hardware, software, firmware, operating systems, runtime libraries, and/or so forth.

The camera 1905 may operate to capture images (e.g., still and/or moving images). In some implementations, the images captured by the camera 1905 can be single, static images (such as a photograph) or can be images from a series (or set) of images defining a video (e.g., a progressive scan video, a National Television System Committee (NTSC) video, a Motion Picture Experts Group (MPEG) video). In some implementations, the series of images (which can define (e.g., generate) the video) can be synchronized with, or otherwise associated with, audio (e.g., an audio signal). The sensor may detect, for example, surrounding light intensity in order to help an image processor (not shown) process images captured by the camera 1905. The camera 1905 may include elements hidden under the bezel 1820. For example, the camera 1905 may include elements within the cavity 1825. The microphone 1910 may be configured to capture audio. The microphone 1910 may include elements within the cavity 1825.

The first wire bundle 1920 and the connector 1925 may function together to communicate signals from the computer display 1900 to, for example, a base portion (not shown) of a laptop computer. For example, the first wire bundle 1920 and the connector 1925 may function together to communicate image data as captured by the camera 1905 to the base portion of the laptop computer, the base portion including an image processor. The first wire bundle 1920 may include one or more wires from the second wire bundle 1930. Wires associated with the first wire bundle 1920 and/or the second wire bundle 1930 may be routed under the bezel 1820. For example, the wires associated with the first wire bundle 1920 and/or the second wire bundle 1930 may be routed through the cavity 1825. The base portion of the laptop computer may be attached to the computer display 1900 using hinges 1915-1, 1915-2.

FIG. 20 illustrates a front view of the computer display 1900 without the bezel 1820. As shown in FIG. 20, the computer display 1900 further includes bezel frame fasteners 2005, bezel guides 2010, a display panel frame 2015, and display panel fasteners 2020. The bezel frame fasteners 2005 may be configured to fasten the bezel frame 1815 to the display casing. In addition, the bezel frame fasteners 2005 may be configured to help fasten other elements (e.g., camera 1905) in a desired position. For example, the bezel frame fasteners 2005 may be one or more of a screw, a rivet, a pin and/or a clip.

The bezel guides 2010 may be configured to help position the bezel 1820 in a desired position. In addition, the bezel guides 2010 may be configured to help fix the bezel 1820 in a desired position. The bezel guides 2010 may be slots, holes, dimples and/or cut-outs in the bezel frame 1815 that may extend partially into and/or completely through the bezel frame 1815 Alternatively, or in addition to, the bezel guides 2010 may be protrusions, projections and/or nodules extending out of the bezel frame 1815. The bezel guides 2010 may be any combination of slots, holes, dimples and/or cut-outs in the bezel frame 1815 and protrusions, projections and/or nodules extending out of the bezel frame 1815.

The display panel frame 2015 may be configured to frame or wrap the elements of the display panel 1935. The display panel frame 2015 may include holes through which the display panel fasteners 2020 fasten the display panel to the display casing. The display panel fasteners 2020 may be one or more of a screw, a rivet, a pin and/or a clip. The display panel frame 2015 may be above, below, and/or on the same plane as the bezel frame 1815.

FIG. 21 illustrates a front view of the computer display 1900 without the bezel 1820 and without the bezel frame 1815. As shown in FIG. 21, the computer display 1900 further includes one or more broadband antennas 2105, one or more local area network (LAN) antennas 2110, one or more routed wires 2115, and bezel frame fastener receptacles 2120.

The one or more broadband antennas 2105 may be configured to transmit and/or receive 3G (third generation) and 4G (fourth generation) and the like signals. For example, the one or more broadband antennas 2105 may provide for wireless communications under various modes or protocols, such as LTE, GSM, SMS, EMS, or MMS messaging, PCS, CDMA, TDMA, PDC, WCDMA, CDMA2000, and/or GPRS, among others. The one or more broadband antennas 2105 may be, for example, a printed circuit board antenna. The one or more local area network (LAN) antennas 2110 may be configured to transmit and/or receive short range communications signals. The short-range communications may provide for wireless communications under various modes or protocols, such as NFC, Bluetooth and/or Wi-Fi, amongst others. The one or more local area network (LAN) antennas 2110 may be, for example, a printed circuit board antenna.

The one or more routed wires 2115 may communicate signals from other components (e.g., camera 1905) in the computer display 1900 to a processor (not shown) via the connector 1925. The one or more routed wires 2115 may be routed under the bezel 1820. For example, the wires associated with the first wire bundle 1920 and/or the second wire bundle 1930 may be routed through the cavity 1825. The bezel frame fastener receptacles 2120 may be configured to receive the bezel frame fasteners 2005 in order to help fix the bezel frame 1815 to the display casing. The bezel frame fastener receptacles 2120 may include internal threads, an external and/or internal lip, internal grooves and the like in order to help fix the bezel frame fasteners 2005 in a desired position.

Figure 22:
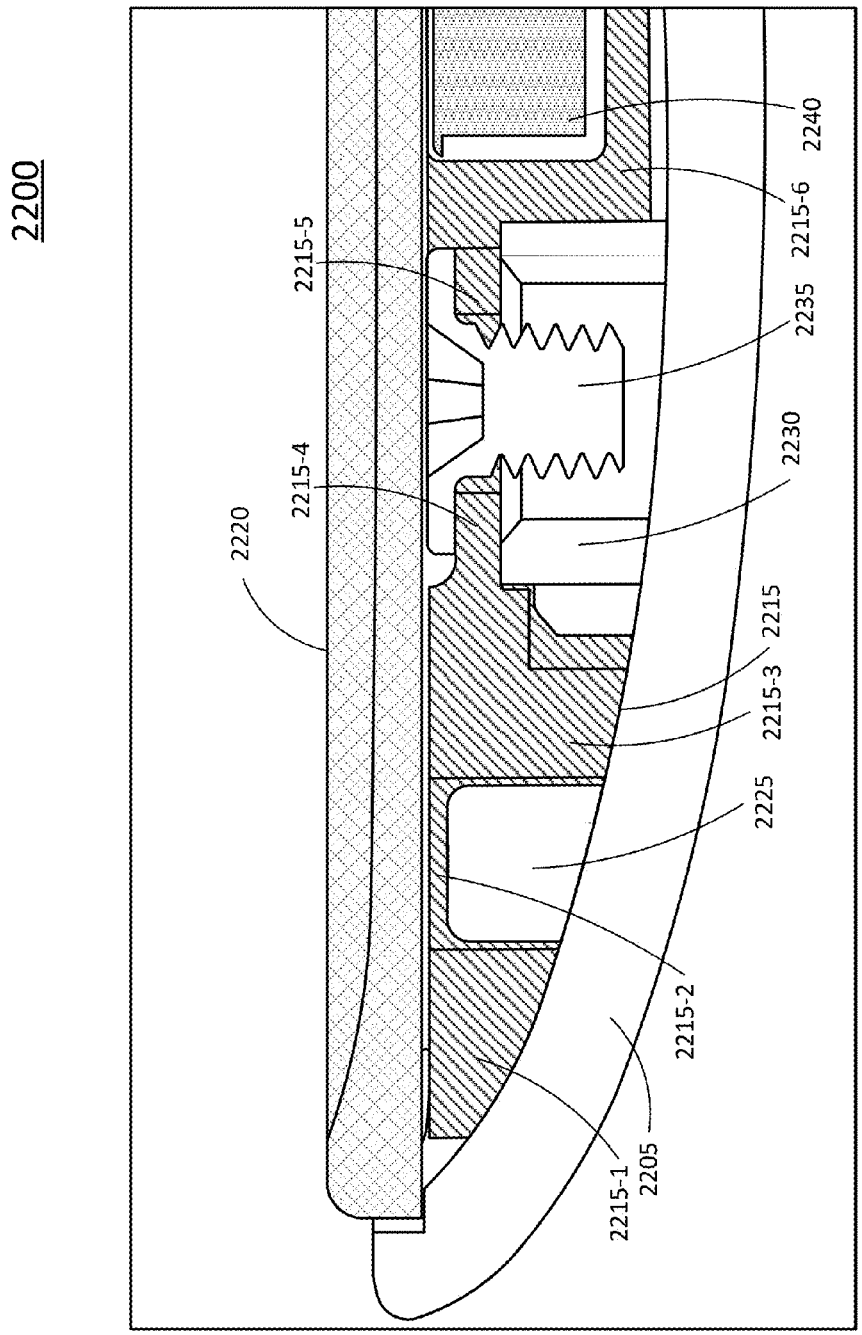
FIG. 22 illustrates another block diagram of a cross-section of a computer display including a bezel.

FIG. 22 illustrates another block diagram of a cross-section of a computer display including a bezel according to at least one example implementation. As shown in FIG. 22, the section of a computer display 2200 includes a display casing 2205, a bezel frame 2215, a bezel 2220, a bezel frame fastener receptacle 2230, a bezel frame fastener 2235, and a portion of a display panel frame 2240. The bezel frame 2215 may include a first portion 2215-1, a second portion 2215-2 and a third portion 2215-3. The first portion 2215-1, the second portion 2215-2 and the third portion 2215-3 may be configured to define a cavity 2225. The second portion 2215-2 may be parallel, or substantially parallel to the bezel 2220. The second portion 2215-2 may be in contact with the bezel 2220 and positioned between the display casing 2205 and the bezel 2220. The first portion 2215-1 and the third portion 2215-3 may extend away from the second portion 2215-2 toward the display casing 2205. The first portion 2215-1 and the third portion 2215-3 may be in contact with a surface of the display casing 2205. An end of the first portion 2215-1 and/or the third portion 2215-3 may be angled in order to conform to the shape of the display casing 2205. The first portion 2215-1 and the third portion 2215-3 may be a different length. However, if the display casing 2205 (or a portion of the display casing 2205) is straight (or substantially straight), the first portion 2215-1 and the third portion 2215-3 may be a same (or substantially same) length.

Although the cavity 2225 is shown as substantially rectangular, example implementations are not limited thereto. For example, the cavity 2225 may be triangular, circular or some other shape. As a result, the shape of the first portion 2215-1, the second portion 2215-2 and the third portion 2215-3 may vary accordingly in order to define the desired shape of the cavity 2225.

The bezel frame 2215 may include a fourth portion 2215-4 and a fifth portion 2215-5. The fourth portion 2215-4 and the fifth portion 2215-5 may define a retaining portion that together with the bezel frame fastener receptacle 2230 and bezel frame fastener 2235 fix the bezel frame 2215 in a desired position. The fourth portion 2215-4 and the fifth portion 2215-5 the bezel frame fastener receptacle 2230 and bezel frame fastener 2235 are shown as including mechanical threads to hold the bezel frame 2215 in a position with regard to the display casing 2205. Although FIG. 22 shows the bezel frame fastener 2235 as the mechanism retaining the bezel frame 2215 and bezel frame fastener receptacle 2230 together, example implementations are not limited thereto. For example, the fourth portion 2215-4 and the fifth portion 2215-5 may include a press fit configured to be pushed into the bezel frame fastener receptacle 2230 resulting in retention of the bezel frame 2215 with bezel frame fastener receptacle 2230.

The bezel frame 2215 may include a sixth portion 2215-6 configured to help position and help fix the display panel frame 2240 in a desired position. For example, the sixth portion 2215-6 is shown as having an L-shape. The display panel frame may be placed in a position which is contact with the sixth portion 2215-6 as shown in FIG. 22. When the bezel 2220 is affixed to the bezel frame 2215, the bezel frame 2215 then prevents the display panel frame 2240 from changing its position. Therefore, maintaining the display panel frame 2240 in the desired position. Further, the sixth portion 2215-6 may be C-shaped. In other words, the sixth portion 2215-6 may include an additional portion (not shown) extending from the sixth portion 2215-6 and between the bezel 2220 and the display panel frame 2240. This additional portion (not shown) may be in contact with the display panel frame 2240 and/or the bezel 2220. Therefore, with the additional portion (not shown), the sixth portion 2215-6 may fix the display panel frame 2240 in the desired position without the bezel 2220 being in place.

The bezel frame 2215 may be configured to support the bezel 2220 as well as define the cavity 2225. The bezel frame 2215 may be configured to support the bezel 2220 by including portions (e.g., the first portion 2215-1 and 2215-3) in contact with both the display casing 2205 and the bezel 2220. For example, if a force is applied to the bezel 2220 on the opposite side of the bezel frame 2215 in the direction (or substantially in the direction) of the bezel frame 2215, the bezel frame 2215 may support the bezel 2220 such that the bezel 2220 does not collapse into a cavity between an edge of the display panel and an edge of the display casing 2205. The cavity 2225 may be configured to provide a route for passing other components (e.g., cables or wires). The cavity 2225 may be configured to provide an area for fixing other components (e.g., cameras and antennas).

The bezel frame fastener receptacle 2230 may be fixed to the display casing 2205. For example, the bezel frame fastener receptacle 2230 may be formed as part of the display casing 2205. In other words, the bezel frame fastener receptacle 2230 and the display casing 2205 may be a molded (e.g., injection molded) plastic structure. The bezel frame fastener 2235 may be screwed (as shown), pressed and/or riveted, amongst other fastening mechanisms into the bezel frame fastener receptacle 2230 in order to help fix the bezel frame 2215 into a desired position.

Figure 23:
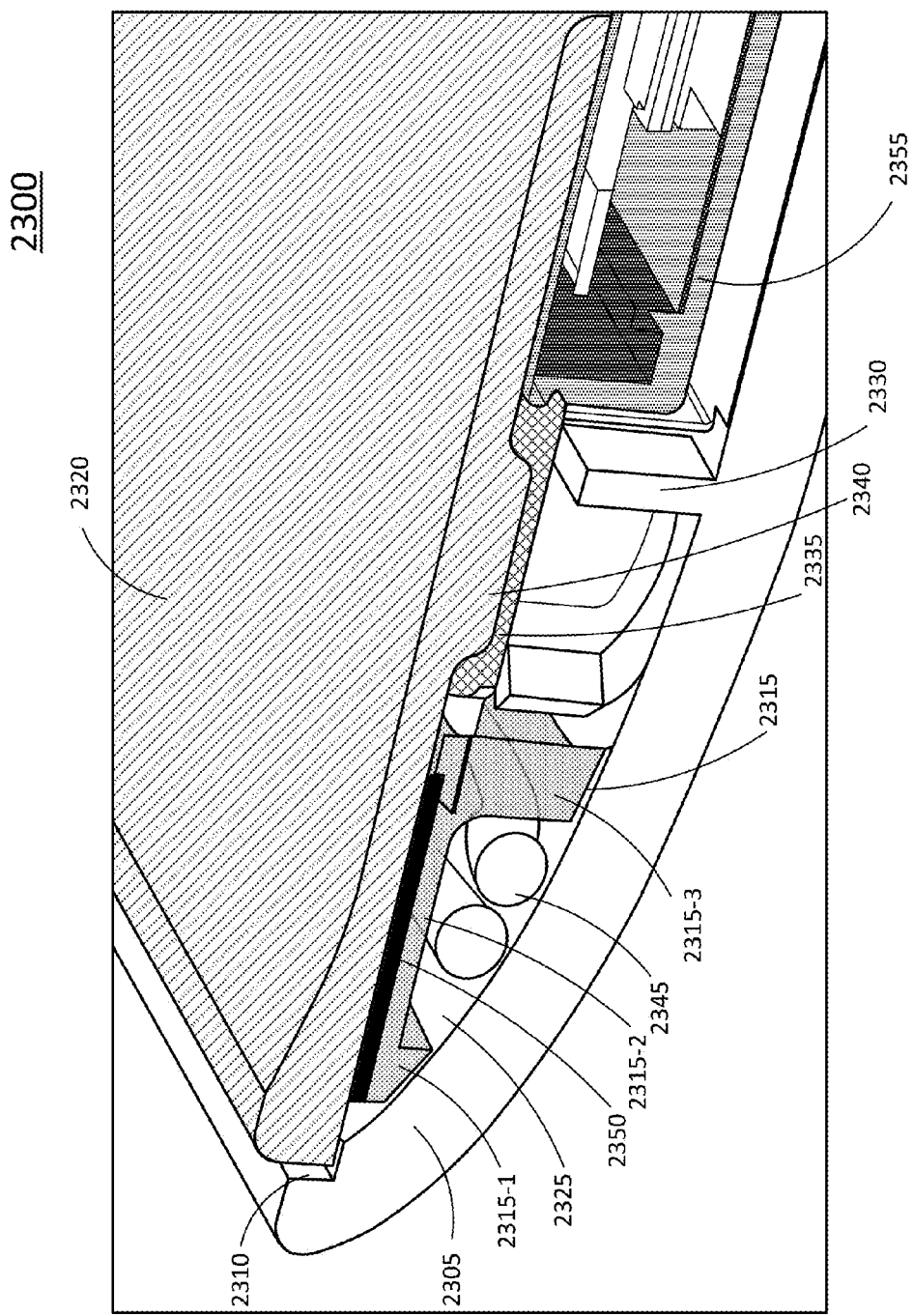
FIG. 23 illustrates still another block diagram of a cross-section of a computer display including a bezel.

FIG. 23 illustrates still another block diagram of a section of a computer display including a bezel according to at least one example implementation. As shown in FIG. 23, the section of a computer display 2300 includes a display casing 2305, a display casing cut-out 2310, a bezel frame 2315, a bezel 2320, a receptacle 2330, a guide 2335, a protrusion 2340, cable(s) 2345, an adhesive 2350, and a display panel frame 2355. The bezel frame 2315 may include a first portion 2315-1, a second portion 2315-2 and a third portion 2315-3. The first portion 2315-1, the second portion 2315-2 and the third portion 2315-3 may be configured to define a cavity 2325 through which cable(s) 2345 may be routed.

The second portion 2315-2 may be parallel, or substantially parallel to the bezel 2320. The second portion 2315-2 may be in contact with the bezel 2320 and positioned between the display casing 2305 and the bezel 2320. The first portion 2315-1 and the third portion 2315-3 may extend away from the second portion 2315-2 toward the display casing 2305. The first portion 2315-1 and the third portion 2315-3 may be in contact with a surface of the display casing 2305. An end of the first portion 2315-1 and/or the third portion 2315-3 may be angled in order to conform to the shape of the display casing 2305. The first portion 2315-1 and the third portion 2315-3 may be a different length. However, if the display casing 2305 (or a portion of the display casing 2305) is straight (or substantially straight), the first portion 2315-1 and the third portion 2315-3 may be a same (or substantially same) length.

Although the cavity 2325 is shown as substantially rectangular, example implementations are not limited thereto. For example, the cavity 2325 may be triangular, circular or some other shape. As a result, the shape of the first portion 2315-1, the second portion 2315-2 and the third portion 2315-3 may vary accordingly in order to define the desired shape of the cavity 2325.

The bezel frame 2315 may be configured to support the bezel 2320 as well as define the cavity 2325. The bezel frame 2315 may be configured to support the bezel 2320 by including portions (e.g., the first portion 2315-1 and 2315-3) in contact with both the display casing 2305 and the bezel 2320. The display casing cut-out 2310, together with the bezel frame 2315, may help support and help position the bezel 2320. The bezel 2320 may be affixed to the bezel frame 2315 using an adhesive 2350 (e.g., glue and/or adhesive tape).

The cavity 2325 may be configured to provide a route for passing other components (e.g., cable(s) 2345). For example, in an assembly process for the computer display 2300 the cable(s) 2345 may be loosely placed against a surface of the display casing 2305. The bezel frame 2315 may be positioned such that the cable(s) 2345 are between the first portion 2315-1 and 2315-3 and the bezel frame 2315 is then placed in contact with the display casing 2305 resulting in forming the cavity 2325. The bezel frame 2315 may be fixed in place as discussed above with regard to FIG. 22. As a result, the cavity 2325 may be used to define a path through which the cable(s) 2345 may be routed within the computer display 2300. Further, by routing the cable(s) 2345 in cavity 2325, the cable(s) 2345 may be protected from damage during the remainder of the assembly process for the computer display 2300.

The bezel 2320 may include at least one protrusion 2340. For example, the protrusion 2340 may be formed as part of the bezel 2320. In other words, the bezel 2320 and the protrusion 2340 may be a molded (e.g., injection molded) plastic structure. The protrusion 2340 may fit into the guide 2335 in order to help position the bezel 2320 in a desired position. Although not shown, the protrusion 2340 and the guide 2335 may snap together in order to help fix the bezel 2320 in the desired position. The guide 2335 may be a structural element of a bezel frame fastener (e.g., bezel frame fastener 2235 described above). Therefore, the guide 2335 together with the receptacle 2330 and the protrusion may function together in order to help fix the bezel 2320 into a desired position. Other elements and structures may also help fix the bezel 2320 into a desired position. For example, adhesive 2350 may help fix the bezel 2320 into a desired position.

Figure 24:
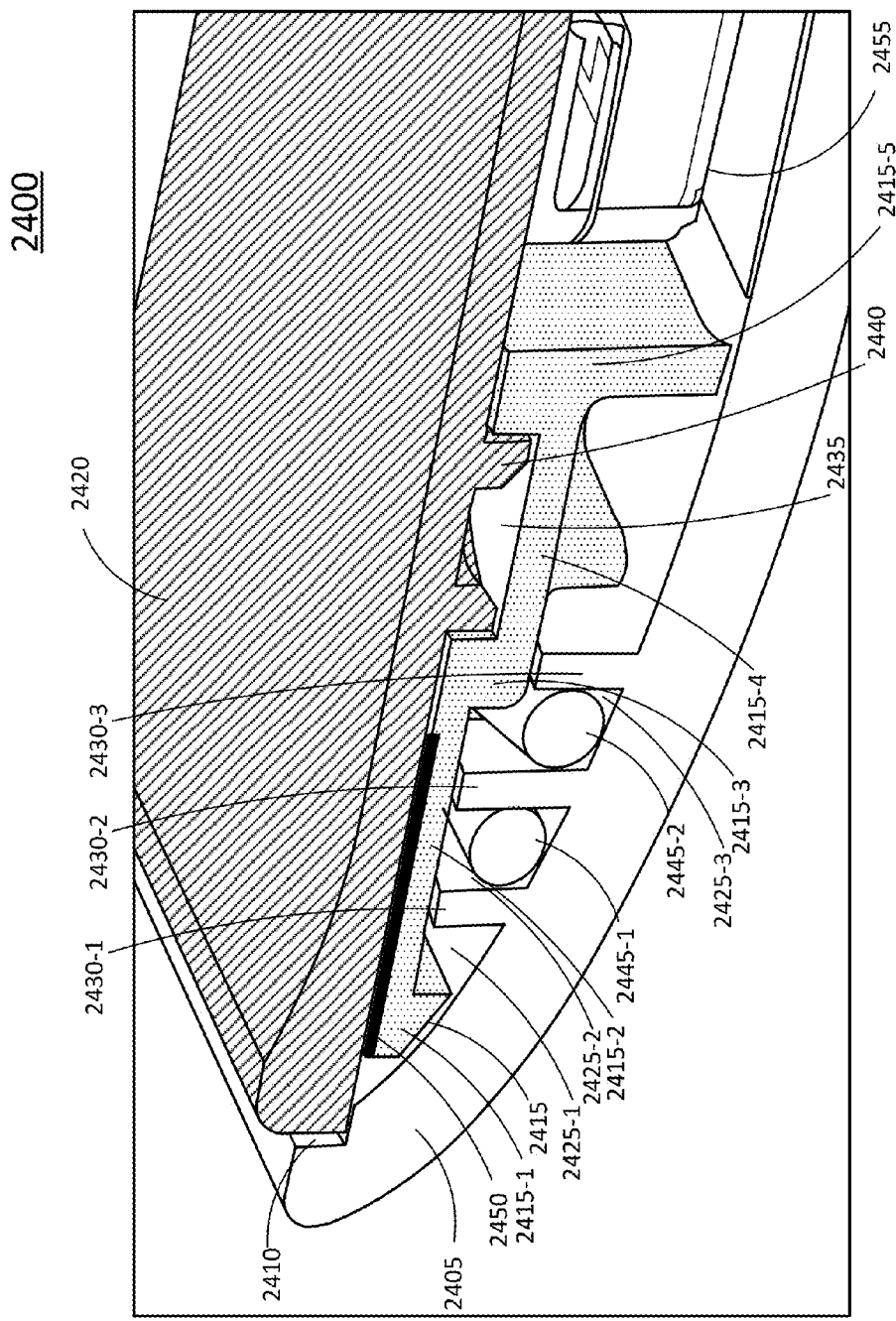
FIG. 24 illustrates yet another block diagram of a cross-section of a computer display including a bezel.

FIG. 24 illustrates yet another block diagram of a section of a computer display including a bezel according to at least one example implementation. As shown in FIG. 24, the section of a computer display 2400 includes a display casing 2405, a top case section 2410, a bezel frame 2415, a bezel 2420, and a display panel frame 2455. The display casing 2405 includes one or more stanchions 2430-1 to 2430-3. The bezel frame 2415 may include a first portion 2415-1, a second portion 2415-2 and a third portion 2415-3. The second portion 2415-2 may be parallel, or substantially parallel to the bezel 2420. The second portion 2415-2 may be positioned between the display casing 2405 and the bezel 2420. The first portion 2415-1 and the third portion 2415-3 may extend away from the second portion 2415-2 toward the display casing 2405. The first portion 2415-1 and the third portion 2415-3 may be in contact with a surface of the display casing 2405. An end of the first portion 2415-1 and/or the third portion 2415-3 may be angled in order to conform to the shape of the display casing 2405.

The first portion 2415-1, the second portion 2415-2 and the third portion 2415-3 may define a cavity having a first volume. The first portion 2415-1, the second portion 2415-2, the third portion 2415-3, and one or more stanchions 2430-1 to 2430-3 may be configured to define one or more cavities 2425-1 to 2425-3 each having a volume less than the first volume. The one or more cavities 2425-1 to 2425-3 may be oriented or positioned within the cavity defined by the first portion 2415-1, the second portion 2415-2 and the third portion 2415-3. The one or more cavities 2425-1 to 2425-3 may define paths through which cable(s) 2440-1 and 2440-2 may be routed. The bezel frame 2415 may further include a fourth portion 2415-4, a fifth portion 2415-5. The bezel 2420 may include a protrusion 2440. The third portion 2415-3, the fourth portion 2415-4, and the fifth portion 2415-5 may define a receptacle 2435 in which the protrusion may be inserted.

The bezel frame 2415 may be configured to support the bezel 2420 as well as help define the cavities 2425-1 to 2425-3. The bezel frame 2415 may be configured to support the bezel 2420 by including portions (e.g., the first portion 2415-1 and 2415-7) in contact with both the display casing 2405 and/or the stanchions 2430-1 to 2430-3 and the bezel 2420. The display casing cut-out 2410, together with the bezel frame 2415, may help support and help position the bezel 2420. The bezel 2420 may be fixed to the bezel frame 2415 using an adhesive 2450 (e.g., glue and/or adhesive tape).

The cavities 2425-1 to 2425-3 may be configured to provide a route for passing other components (e.g., cable(s) 2445-1 and 2445-2). For example, in an assembly process for the computer display 2400 the cables 2445-1 and 2445-2 may be placed against a surface of the display casing 2405 in the cavity 2425-1 and 2425-2. The bezel frame 2415 may be positioned on the one or more stanchions 2430-1 to 2430-3. The bezel frame 2415 may be fixed in place as discussed above with regard to FIG. 22. As a result, the cavity 2425-1 and 2425-2 may be used to define a path through which the cables 2445-1 and 2445-2 may be routed within the computer display 2400. Further, by routing the cables 2445-1 and 2445-2 in cavity 2425-1 and 2425-2 and positioning the bezel frame as described, the cables 2445-1 and 2445-2 may be protected from damage during the remainder of the assembly process for the computer display 2400.

The stanchions 2430-1 to 2430-3 may extend away from the display casing 2405 toward the second portion 2415-2 (if the bezel frame is installed). The stanchions 2430-1 to 2430-3 may be parallel or substantially parallel to one or more of the first portion 2415-1, the third portion 2415-3 and the fifth portion 2415-5. The stanchions 2430-1 to 2430-3 may be perpendicular to or substantially perpendicular to one or more of the second portion 2415-2 and the fourth portion 2415-5. However, the stanchions 2430-1 to 2430-3 may be at an angle such that the cavities 2425-1 to 2425-3 are some other shape (e.g., a triangular shape) than shown in FIG. 24. The stanchions 2430-1 to 2430-3 may be formed as part of the display casing 2405. In other words, the display casing 2405 and the stanchions 2430-1 to 2430-3 may be a molded (e.g., injection molded) plastic structure. The cavities 2425-1 to 2425-3 between the stanchions 2430-1 to 2430-3 may guide the cable (s) 2445-1 and 2445-2 in order to help position the cable(s) 2445-1 and 2445-2 in a desired position.

The bezel 2420 may include at least one protrusion 2440. For example, the protrusion 2440 may be formed as part of the bezel 2420. In other words, the bezel 2420 and the protrusion 2440 may be a molded (e.g., injection molded) plastic structure. The protrusion 2440 may fit into the receptacle 2435 in order to help position the bezel 2420 in a desired position. Although not shown, the protrusion 2440 and the receptacle 2435 may snap together in order to help fix the bezel 2420 in the desired position.

Figure 25:
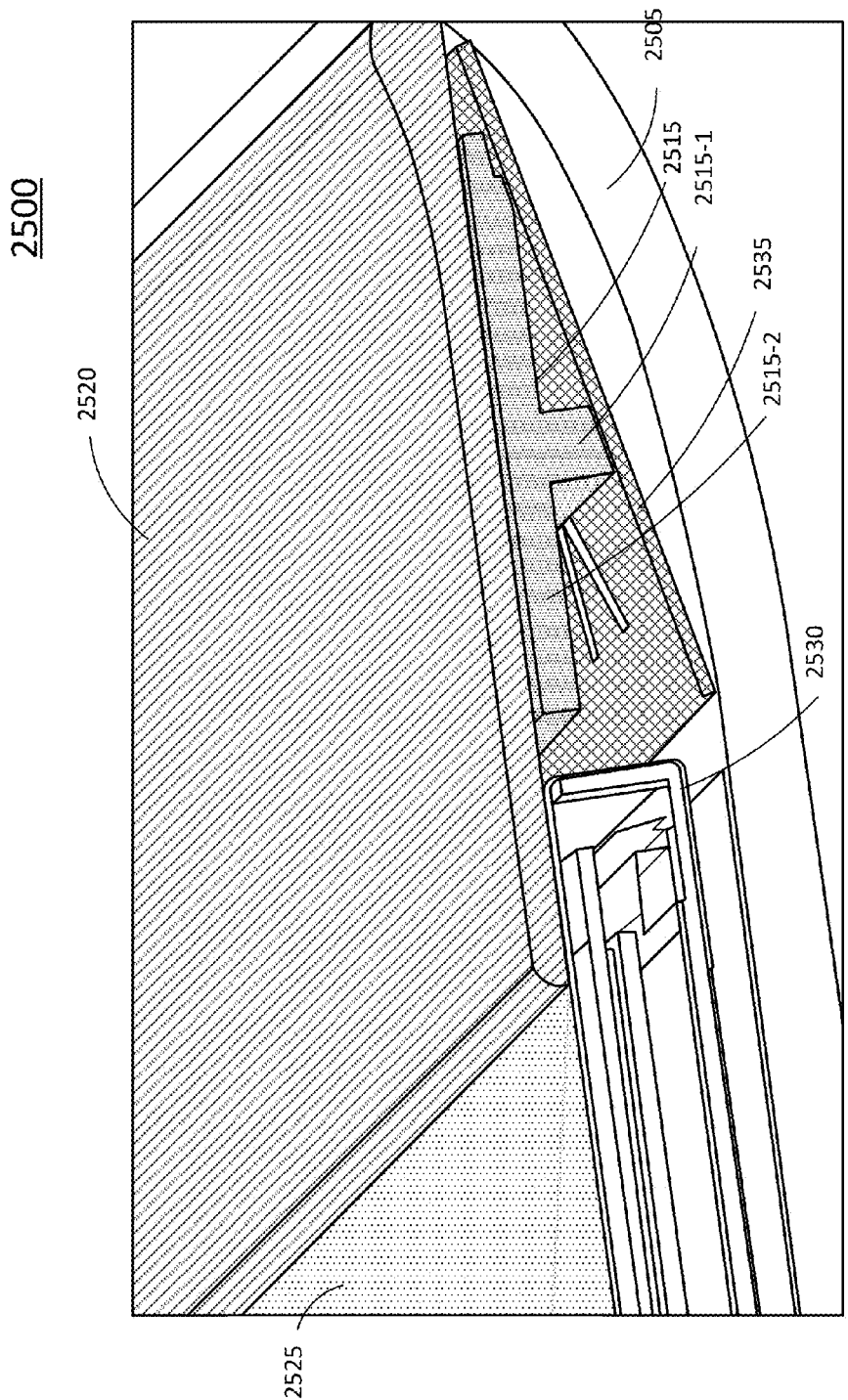
FIG. 25 illustrates another block diagram of a cross-section of a computer display including a bezel.

FIG. 25 illustrates another block diagram of a section of a computer display including a bezel according to at least one example implementation. As shown in FIG. 25, the section of a computer display 2500 includes a display casing 2505, a bezel frame 2515, a bezel 2520, a display panel 2525, a display panel frame 2530, and an antenna 2535. The bezel frame 2515 may include a first portion 2515-1 and a second portion 2515-2. The second portion 2515-2 may be parallel, or substantially parallel to the bezel 2520. The second portion 2515-2 may be positioned between the display casing 2505 and the bezel 2520. The antenna 2535 may be positioned between the display casing 2505 and the second portion 2515-2. The first portion 2515-1 may extend away from the second portion 2515-2 toward the antenna 2535 and the display casing 705. The first portion 2515-1 may be in contact with a surface of the antenna 2535. An end of the first portion 2515-1 may be angled in order to conform to an angle of the antenna 2535.

The first portion 2515-1 and the second portion 2515-2 may support the bezel 2520 and help fix the antenna 2535 in a desired position. For example, the antenna 2535 may be placed at an angle with a gap between the display casing 2505 and on side of the antenna 2535. The bezel frame 2515 may be positioned such that the first portion 2515-1 and one end of the second portion 2515-2 is in contact with the antenna 2535 as shown. The bezel frame 2515 may be fixed in place as discussed above with regard to FIG. 22. The result is that the antenna 2535 may be wedged into place such that the antenna 2535 is fixed in a desired position.

The bezel frame 2515 may be configured to support the bezel 2520 by including portions (e.g., the first portion 2515-1 and 2515-2) in contact with the bezel 2520 and the antenna 2535 which is in contact with the display casing 2505. The antenna 2535 may be a printed circuit board (PCB) antenna. The antenna may be sufficiently structured (e.g., rigid) to provide the aforementioned support. Alternatively, the antenna 2535 may be a flexible PCB that, when placed in contact with the display casing 2505, takes on the shape of the display casing 2505. In such a configuration, the display casing 2505 provides structural support for the first portion 2515-1 when the first portion 2515-1 is in contact with the antenna 2535.

FIG. 25 shows the first portion 2515-1 somewhat centered on the second portion 2515-2. However, example implementations are not limited thereto. For example, the first portion 2515-1 may be positioned toward an end (e.g., an end closest to the display panel frame 2530). Further, the first portion 2515-1 and the second portion 2515-2 may be combined into a substantially single portion in a wedge like shape.

Alternatively, the bezel frame 2515 may only help fix the antenna 2535 in the desired position. In other words, the bezel frame 2515 (in the area of the computer display 2500 including the antenna 2535) may not be configured to support the bezel 2520 to the extent that other portions of a bezel frame, in contact with both the bezel 2520 and display casing 2505, may be configured to support the bezel 2520. Even in this alternative implementation, a bezel frame (as a whole) according to example implementations is configured to support the bezel 2520.

Figure 26:
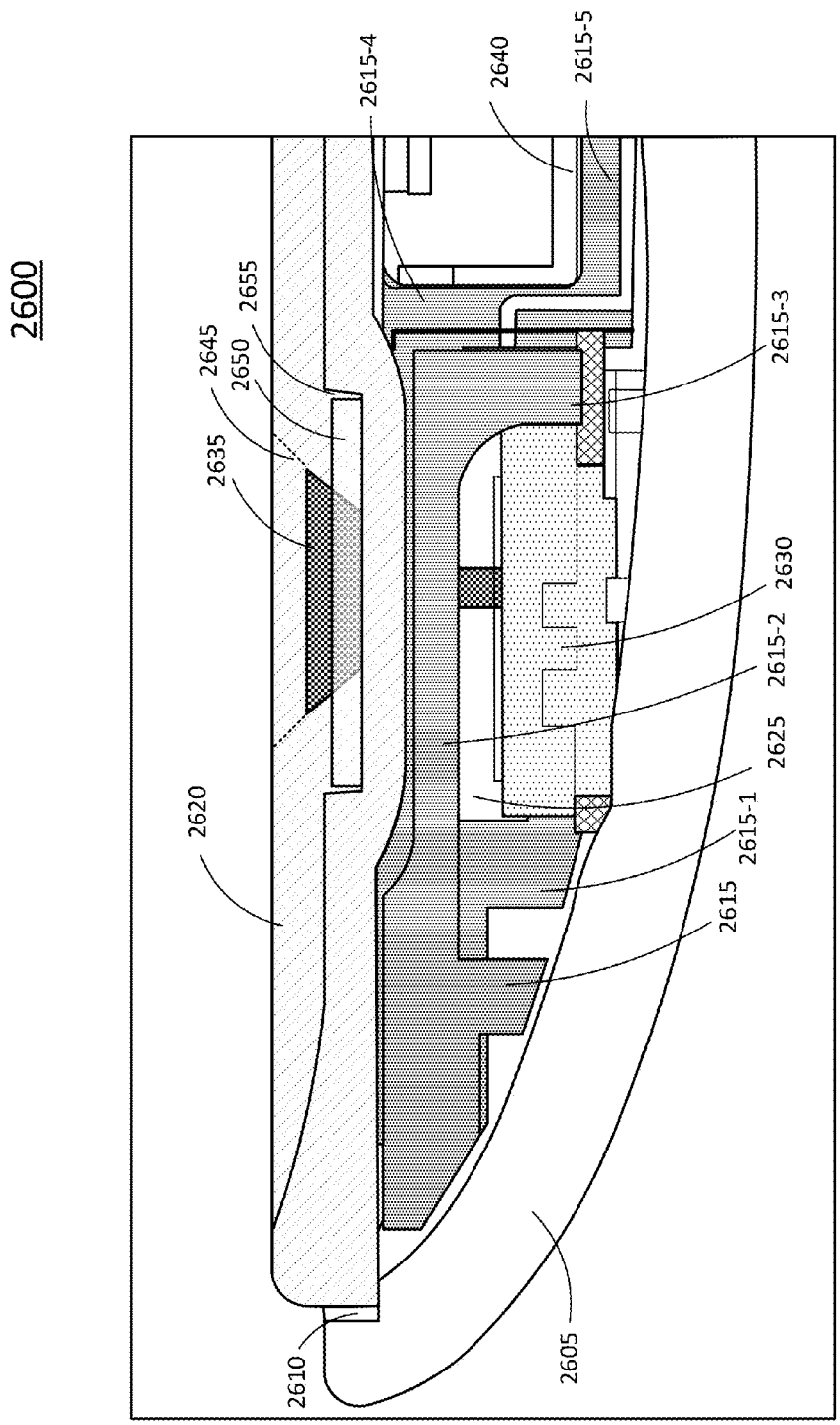
FIG. 26 illustrates still another block diagram of a cross-section of a computer display including a bezel.

FIG. 26 illustrates still another block diagram of a section of a computer display including a bezel according to at least one example implementation. As shown in FIG. 26, the section of a computer display 2600 includes a display casing 2605, a display casing cut-out 2610, a bezel frame 2615, a bezel 2620, a camera module 2630, a camera lens 2635, and a display panel frame 2640. The bezel frame 2615 may include a first portion 2615-1, a second portion 2615-2 and a third portion 2615-3. The first portion 2615-1, the second portion 2615-2 and the third portion 2615-3 may be configured to define a cavity 2625 configured to help fix the camera module 2630 in a desired position.

The bezel frame 2615 may include a fourth portion 2615-4 and a fifth portion 2615-5 configured to help position and help fix the display panel frame 2640 in a desired position. For example, the fourth portion 2615-4 and the fifth portion 2615-5 are shown together as having an L-shape. The display panel frame may be placed in a position which is contact with the fourth portion 2615-4 and the fifth portion 2615-5 as shown in FIG. 26. When the bezel 2620 is affixed to the bezel frame 2615, the bezel frame 2615 then prevents the display panel frame 2640 from changing its position. Therefore, maintaining the display panel frame 2640 in the desired position. Further, the fourth portion 2615-4 and the fifth portion 2615-5 together may be C-shaped. In other words, the fourth portion 2615-4 may include an additional portion (not shown) extending from the fourth portion 2615-4 and between the bezel 2620 and the display panel frame 2640. This additional portion (not shown) may be in contact with the display panel frame 2640 and/or the bezel 2620. Therefore, with the additional portion (not shown), the fourth portion 2615-4 and the fifth portion 2615-5 together may fix the display panel frame 2640 in the desired position without the bezel 2620 being in place.

The bezel frame 2615 may be configured to support the bezel 2620 as well as help fix the camera module 2630 in a desired position. The bezel frame may help fix the camera module 2630 in a desired position by having one or more of the first portion 2615-1 and the third portion 2615-3 in contact with or partially in contact with the camera module. As a result, the bezel frame 2615 may apply a force on the camera module 2630 directed toward the display casing 2605 to fix, or help fix, the camera module 2630 in the desired position. Alternatively, or in addition to, a cavity defined by the first portion 2615-1 and the third portion 2615-3 (as shown on the left and right of the camera module 2630) and by the second portion 2615-2 and the display casing 2605 (as shown on the top and bottom of the camera module 2630) may be sized based on the size of the camera module 2630. The camera module 2630 may then be placed in the cavity and the bezel frame 2615 may be fixed in place as discussed above with regard to FIG. 22, resulting in the camera module 2630 being fixed in the desired position.

The bezel frame 2615 may be configured to support the bezel 2620 by including portions (e.g., the first portion 2615-1 and 2615-2) in contact with the bezel 2620 and the display casing 2605. The display casing cut-out 2610, together with the bezel frame 2615, may help support and help position the bezel 2620. For example, the display casing cut-out 2610 may support one end of the bezel 2620 in the display casing 2605. Further, the second portion 2615-2 may be parallel, or substantially parallel to the bezel 2620. The second portion 2615-2 may be in contact with the bezel 2620 and positioned between the display casing 2605 and the bezel 2620. The first portion 2615-1 and the third portion 2615-3 may extend away from the second portion 2615-2 toward the display casing 2605. The first portion 2615-1 and the third portion 2615-3 may be in contact with a surface of the display casing 2605 (or alternatively, a portion of the camera module 2630, which is in turn in contact with the display casing 2605). An end of the first portion 2615-1 and/or the third portion 2615-3 may be angled in order to conform with the shape of the display casing 2605. The first portion 2615-1 and the third portion 2615-3 may be a different length. However, if the display casing 2605 (or a portion of the display casing 2605) is straight (or substantially straight), the first portion 2615-1 and the third portion 2615-3 may be a same (or substantially same) length.

The bezel 2620 may include a cut-out 2645 defining a position through which the camera lens 2635 may be positioned. The camera lens 2635 may be fixed in place with a fixing structure 2650. The fixing structure 2650 may be, for example, a press fit held in place by a cavity 2655 formed in the bezel 2620.

Figure 27:
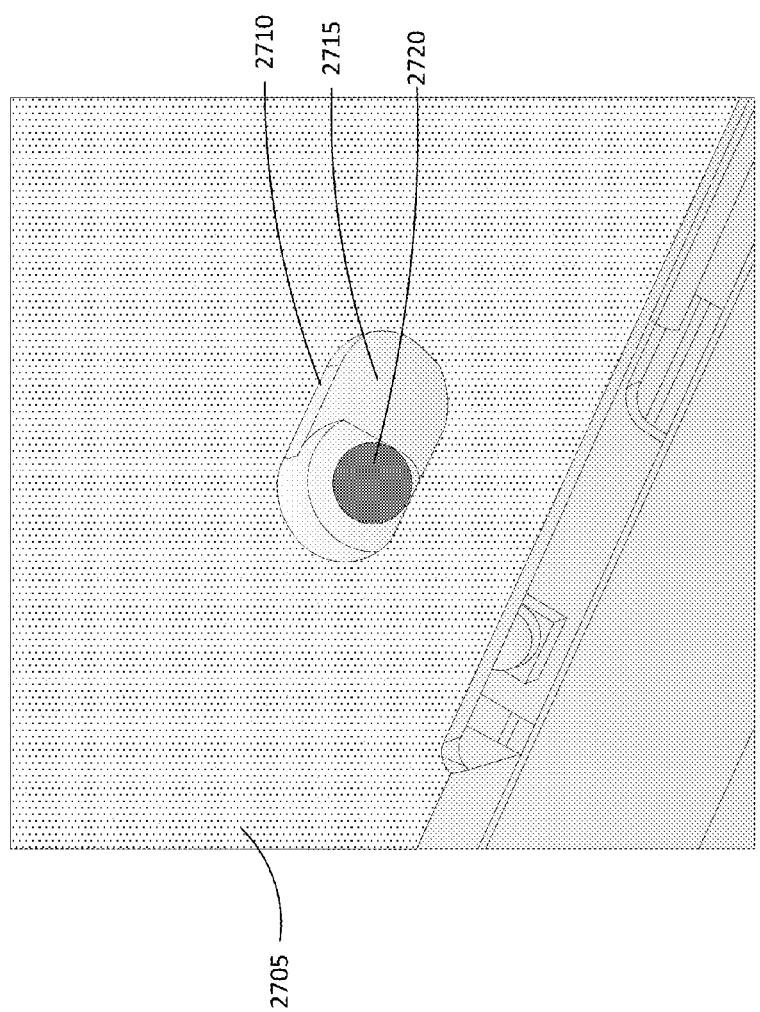
FIG. 27 illustrates view of a computer display including a bezel with a microphone.

FIG. 27 illustrates view of a computer display including a bezel with a microphone according to at least one example implementation. As shown in FIG. 27, a section of a bezel 2705 includes an inlayed cutout 2710. The inlayed cutout 2710 may be configured to sound port into the microphone (e.g., microphone 1910). For example, the inlayed cutout may include a pocket 2715 and a hole 2720 in the section of the bezel 2705. The hole 2720 may lead to an input for the microphone (e.g., microphone 1910). The hole 2720 may be offset from the pocket 2750 so a user is prevented from poking through the hole 2720 and damaging the microphone.

Figure 28:
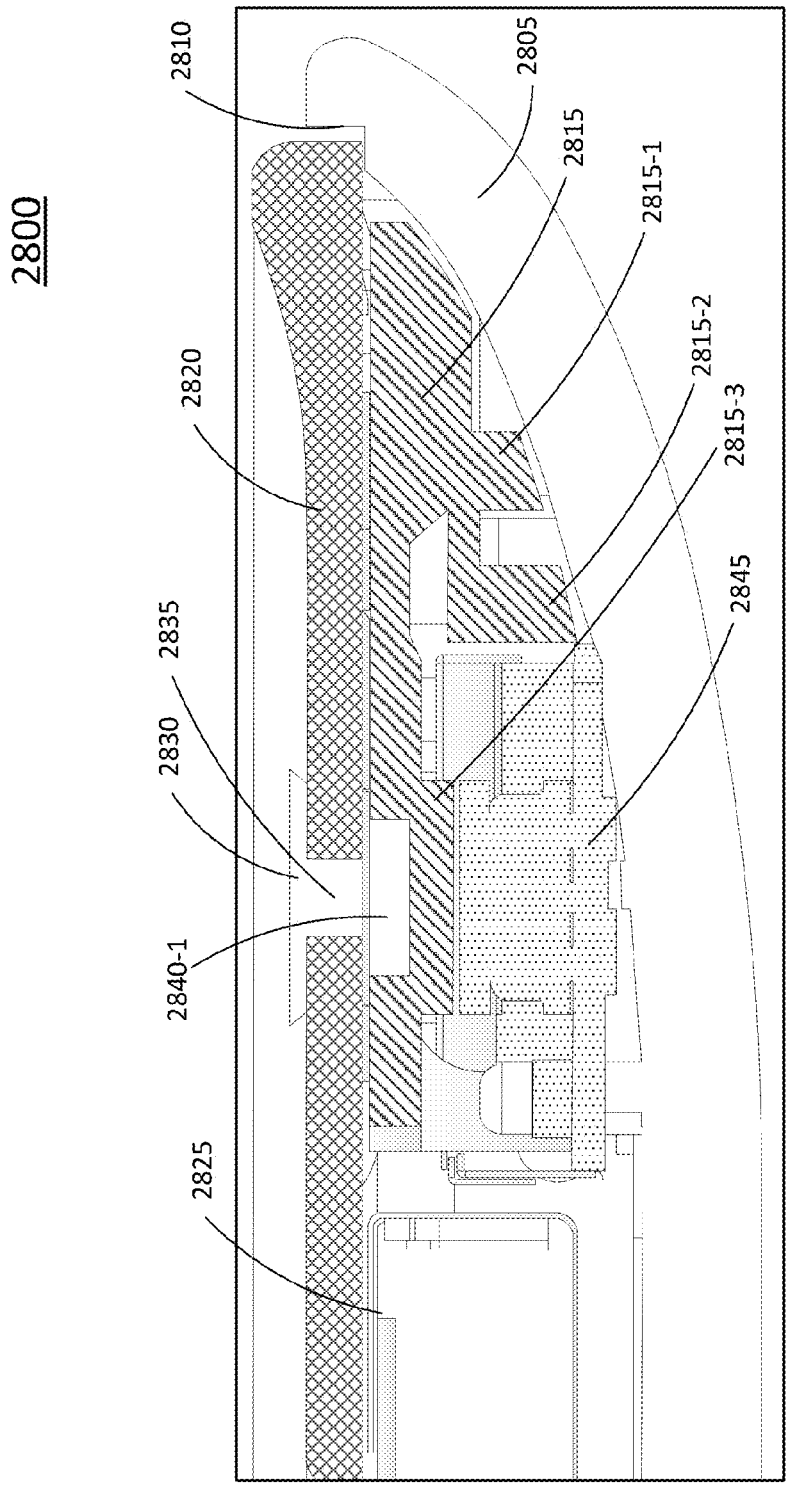
FIG. 28 illustrates block diagram of a cross-section of a computer display including a bezel with a microphone.

FIG. 28 illustrates block diagram of a cross-section of a computer display including a bezel with a microphone according to at least one example implementation. As shown in FIG. 28, the section of a computer display 2800 includes a display casing 2805, a display casing cut-out 2810, a bezel frame 2815, a bezel 2820, a display panel frame 2825, an inlayed cutout 2830, a hole 2835, a pocket 2840-1, and a microphone module 2845. The bezel frame 2815 may include a first portion 2815-1, a second portion 2815-2 and a third portion 2815-3. The first portion 2815-1 and the second portion 2815-2 and the third portion 2815-3 may be configured to define a cavity configured to help fix the microphone module 2845 in a desired position.

Figure 29:
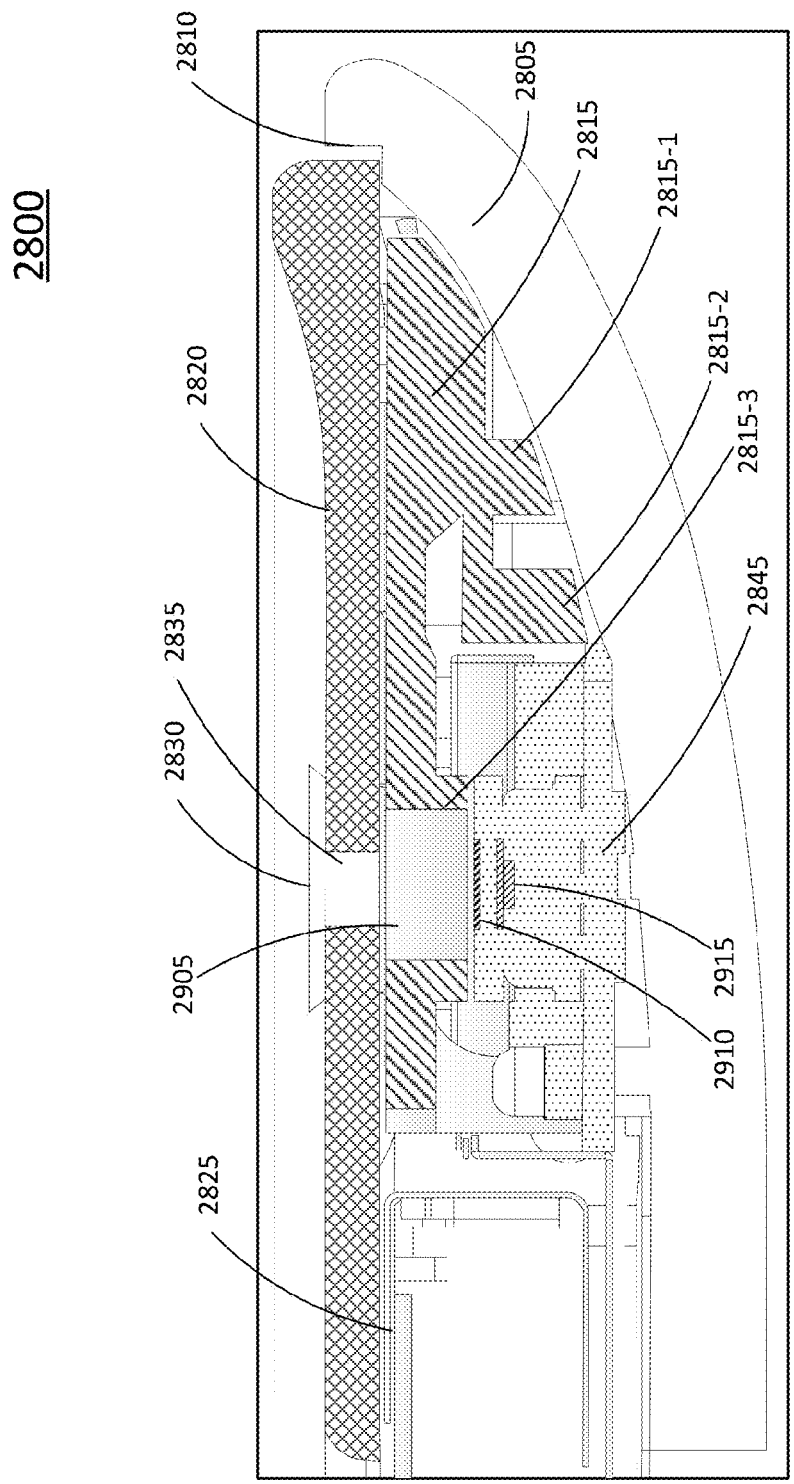
FIG. 29 illustrates another block diagram of a cross-section of a computer display including a bezel with a microphone.

FIG. 29 illustrates another block diagram of the cross-section of the computer display including a bezel with a microphone shown in FIG. 28 according to at least one example implementation. As shown in FIG. 29, the section of a computer display 2800 further includes a hole 2905, a first input element of a microphone module 2910 and a second element of a microphone module 2915. In some implementations, the first input element of a microphone module 2910 and the second element of a microphone module 2915 are combined into a single input element. The hole 2835, the pocket 2845 (cut from the bezel frame 2815) and the hole 2905 (cut through the bezel frame 2815) may be offset so a user is prevented from poking through the hole 2835 and damaging the microphone module 2845. The hole 2835, the pocket 2840 and the hole 2905 may define a sound port into the microphone module 2845 from an external area of the computer display.

The bezel frames (e.g., bezel frames 2215, 2315, 2415, 2515 and/or 2615) discussed above with regard to FIGS. 22-29, may be portions of a single bezel frame. In other words, the bezel frames may be formed as a solitary structure with portions configured with cavities configured to route cables or wires, portions configured to support and/or position other device (e.g., antenna(s), microphones, and/or camera(s)). The bezel may be formed of a metal (e.g., aluminum) or plastic (e.g., molded plastic). The bezel may be positioned around one or more sides of a computer display. For example, there may be a separate bezel for each side (e.g., top, bottom, left and right) of the computer display. For example, there may be a bezel for two connecting sides (e.g., top and left and/or bottom and right) of the computer display. For example, there may be a bezel for three connecting sides (e.g., top, right and left) of the computer display.

Figure 30:
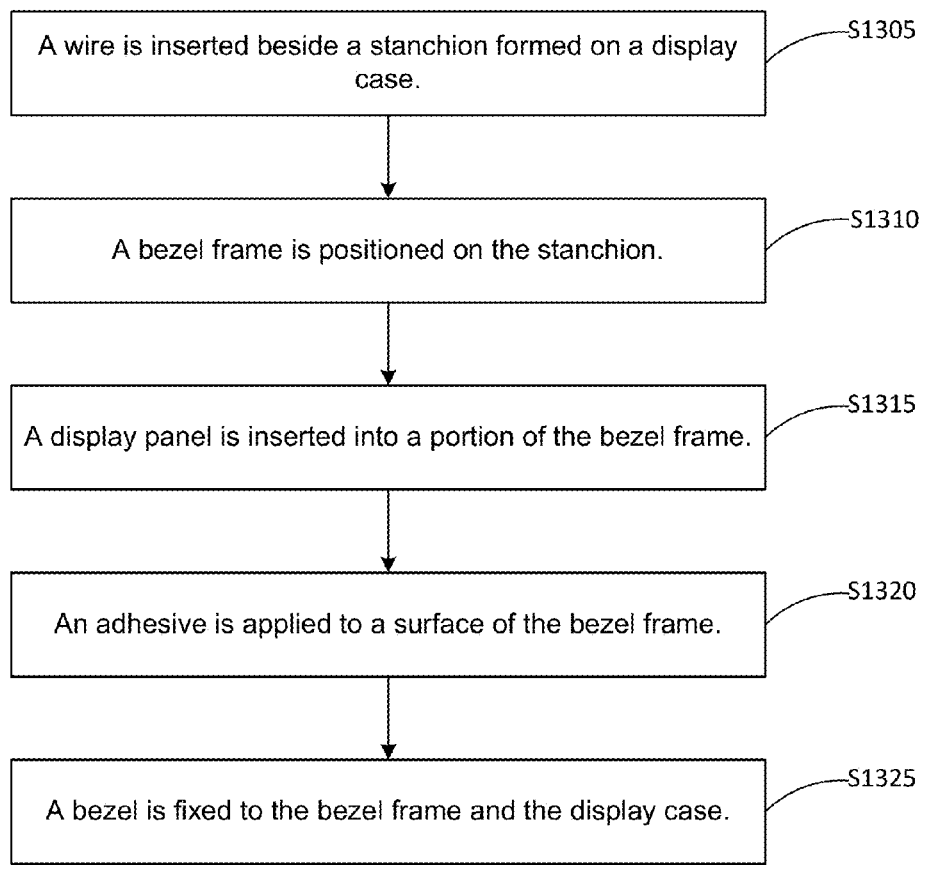
FIG. 30 illustrates a method of assembling a computer display.

FIG. 30 illustrates a method of assembling a computer display according to at least one example implementation. As shown in FIG. 30, in step S1305 a wire is inserted beside a stanchion formed on a display case. For example, as shown in FIG. 24, a wire (e.g., cable 2445-2) may be inserted beside stanchion 2430-3.

In step S1310 a bezel frame is positioned on the stanchion. For example, as shown in FIG. 24, bezel frame 2415 is fixed on stanchion(s) 2430-1, 2430-2 and/or 2430-3. Further, as shown in FIG. 22, bezel frame 2215 is fixed in position using bezel frame fastener 2235 and bezel frame fastener receptacle 2230. For example, bezel frame fastener 2235 may be screwed (as shown), pressed and/or riveted, amongst other fastening mechanisms into the bezel frame fastener receptacle 2230 in order to help fix the bezel frame 2215 into a desired position.

In step S1315 a display panel is inserted into a portion of the bezel frame. For example, as shown in FIGS. 29 and 22, the display panel (e.g., display panel 235) may include a display panel frame 2240 which may be inserted into a portion (e.g., bezel frame portion 2215-6) of the bezel frame 2215.

In step S1320 an adhesive is applied to a surface of the bezel frame. For example, as shown in FIG. 24, an adhesive 2450 may be inserted between the bezel 2420 and the bezel frame 2415. The adhesive 2450 may help fix the bezel 2420 to the bezel frame 2415.

In step S1325 a bezel is affixed to the bezel frame and the display case. For example, as shown in FIG. 24, the bezel 2420 is fixed to the bezel frame 2415 using the adhesive 2450. Alternatively, or in addition to, the bezel 2420 may be fixed to the bezel frame 2415 using the protrusion 2440 together with the receptacle 2435.

As noted above, details related to thermal processing are described in connection with at least FIGS. 31A through 38 below. The implementations described in connection with FIGS. 31A through 38 can be combined with any of the implementations described in connection with FIGS. 1 through 30 and/or FIGS. 39 through 45.

Thermoplastic adhesives films (e.g., thermal bonding films) may be used to join enclosure parts ("substrates") made of diverse materials (e.g., plastic, metals, etc.). To make a bond between two substrates, a thermoplastic adhesive in the form of a thermal bonding film may be disposed between opposing surfaces of the two substrates. The thermoplastic adhesive film may be a few mils (e.g., 4 mils) thick. Then, the bond between the two substrates may be made by applying heat and pressure using a heated static press or similar equipment. Alternatively, the thermoplastic adhesive can be first tacked or lightly bonded to one of the substrates using low heat. The second substrate may then be placed on the exposed adhesive surface and the bond between the first substrate and the second substrate made by applying heat and pressure using the heated static press or similar equipment.

Figures 31A, 31B:
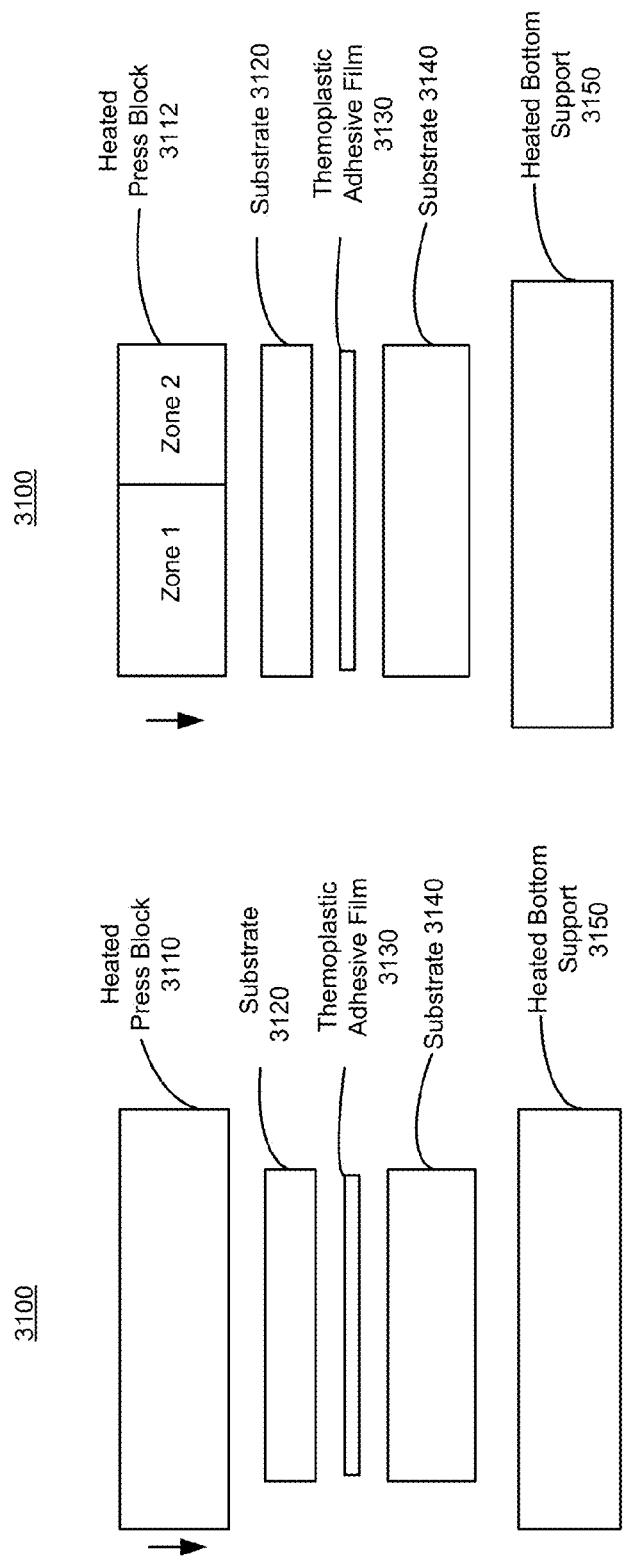
FIG. 31A is a schematic illustration of the use of a thermal press to thermally bond two substrates together.
FIG. 31B is a schematic illustration of an example modification of the thermal press of FIG. 31A for applying spatially varying amounts of heat to a glued assembly of parts.

FIG. 31A shows schematically, in exploded view, a use of a thermal press 3100 to thermally bond two substrates (e.g., substrates 3120 and 3140) together. First, a thermoplastic adhesive film 3130 is disposed between opposing surfaces of substrates 3120 and 3140 to form a glued assembly of the substrates. The glued assembly of substrates 3120 and 3140 may then be placed on a heated support block 3150 in thermal press 3100. Next, a heated press block 3110, which may be heated to a temperature $T_1$, is applied under pressure to the glued assembly of substrates 3120 and 3140. The heat and pressure of heated press block 3110 may soften thermoplastic adhesive film 3130 so that it adheres to and bonds substrates 3120 and 3140 together. The heat and pressure applied, and the dwell time of heated pressure block 3110 for effective bonding may depend upon the type and thickness of the substrates being bonded together in addition to depending on the flow properties of the thermoplastic adhesive film.

A softening temperature range of the thermoplastic adhesive film for effective bonding may be narrow, (e.g., in a range of a few degrees centigrade). For certain applications (e.g., a laptop computer enclosure assembly) substrates 3120 and 3140 may have structural non-uniformities and non-uniform thermal mass distributions across a lateral extent of the glued assembly of the substrates. These non-uniformities may make it difficult to achieve uniform softening temperatures in the narrow range for effective bonding across the lateral extent of the glued assembly of the substrates by application of heated press block 3110 heated to temperature $T_1$.

A method for thermally bonding parts of an electronic device enclosure involves applying spatially varying amounts of heat to a glued assembly of the parts across a lateral extent of the assembly, in accordance with the principles of the disclosure herein.

The method described herein may be used to bond parts that have structural non-uniformities and which present non-uniform thermal mass distributions across a lateral extent of a glued assembly of the parts. Application of the spatially varying amounts heat may compensate for the structural non-uniformities and the non-uniform thermal mass distributions to achieve a more uniform softening temperature of the thermoplastic adhesive across the lateral extent of the glued assembly of the parts.

FIG. 31B shows an example modification of thermal press 3100 for applying spatially varying amounts of heat to a glued assembly of the parts. As shown in the figure, thermal press 3100 may include a thermal press block 3112, which has two spatially different heated zones—zone 1 heated to a temperature $T_1$ and zone 2 heated to a different temperature $T_2$. Using such a thermal press block 3112, it may be possible to heat a first spatial portion of the glued assembly of substrates 3120 and 3140 to temperature $T_1$ and a second spatial portion of the glued assembly of substrates 3120 and 3140 to a different temperature $T_2$ in thermal press 3100.

For purposes of illustration, the disclosed method for thermally bonding parts of an electronic device enclosure by applying spatially varying amounts of heat to a glued assembly of the parts is described below with reference to FIGS. 32 through 35C using specific parts of a laptop computer enclosure as an example. However, it will be understood that the method is not limited to the specific parts of the laptop computer enclosure, but can be used to bond other laptop computer or electronic device enclosure parts.

Figure 32:
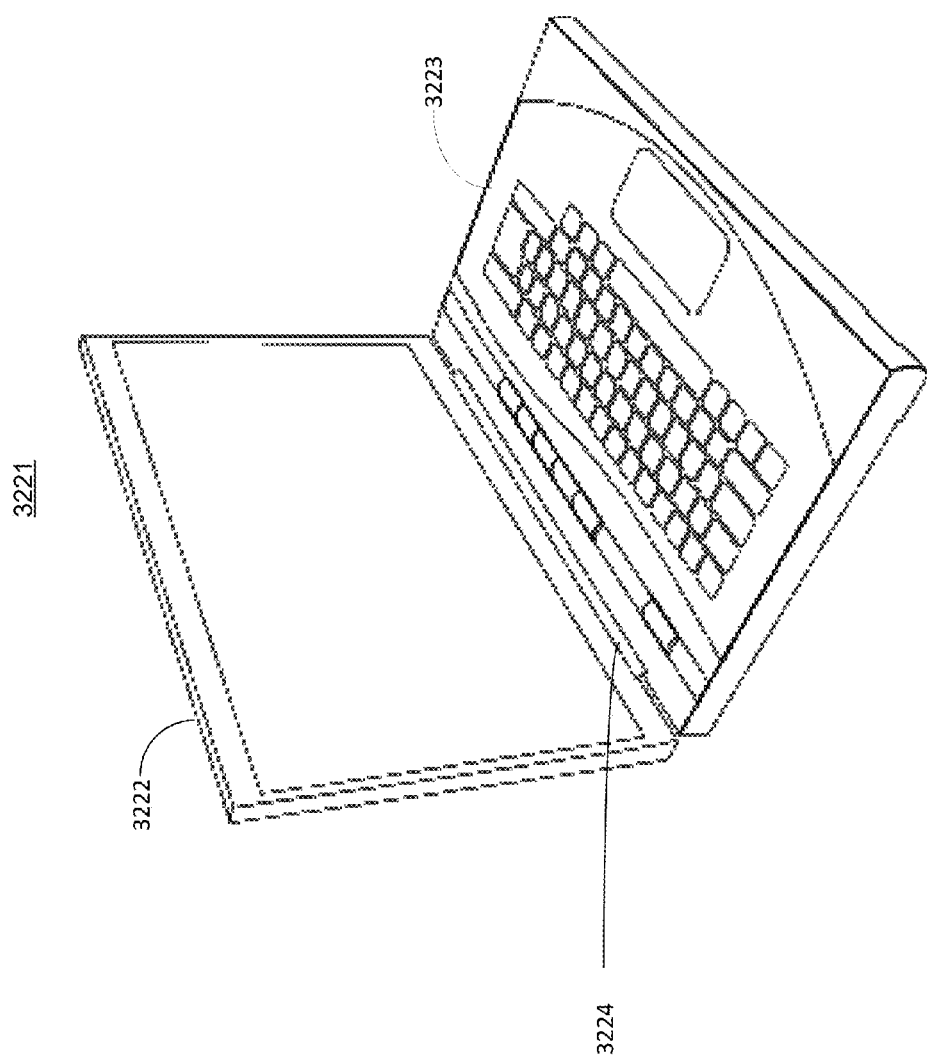
FIG. 32 is an illustration of an example laptop computer.

FIG. 32 shows an example laptop computer 3221. The laptop computer, which may have a clamshell form factor, may be formed from two housings—a "display" or top housing 3222, and a "keyboard" or bottom housing 3223. Top housing 3222 may, for example, include a display, a touch screen, a cover glass, etc. Bottom housing 3223 may, for example, include circuit boards including electrical components, a keyboard, a track pad, etc. The top housing, which may be pivotally connected by a hinge assembly 3224 to the bottom housing, may serve as a lid for the latter in a closed position of the laptop computer.

Figure 33A:
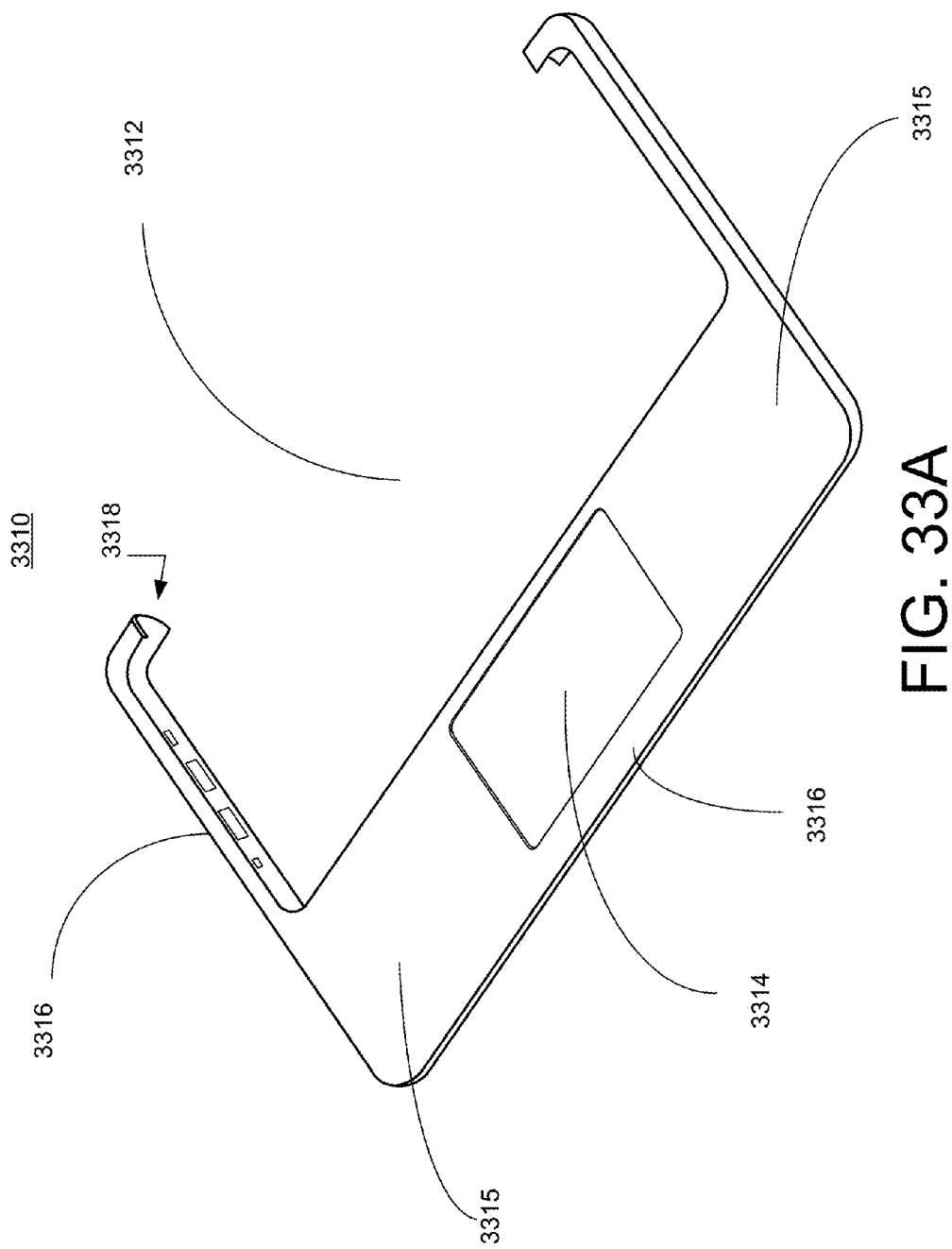
FIGS. 33A through 33C are illustrations of example parts of a bottom housing of a laptop computer that can be thermally bonded together by applying spatially varying amounts of heat in a thermal press.
Figure 33B:
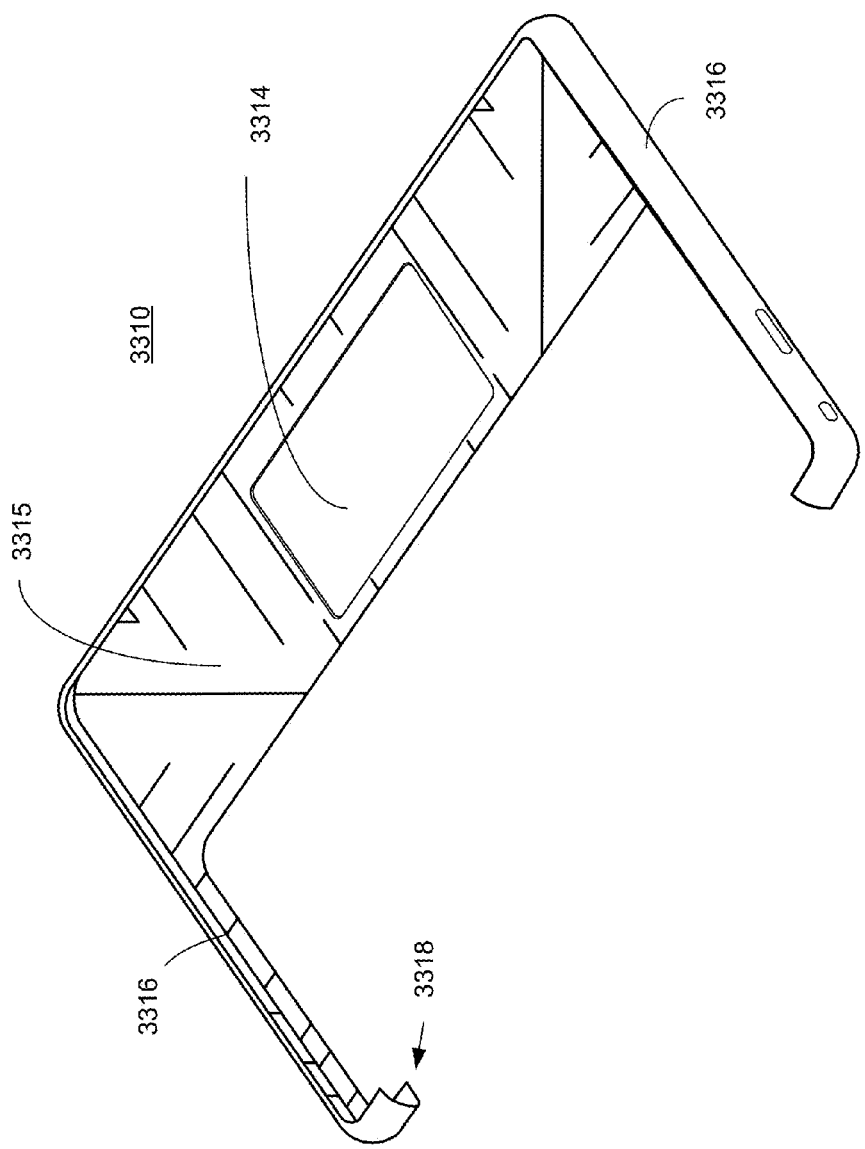
Figure 33C:
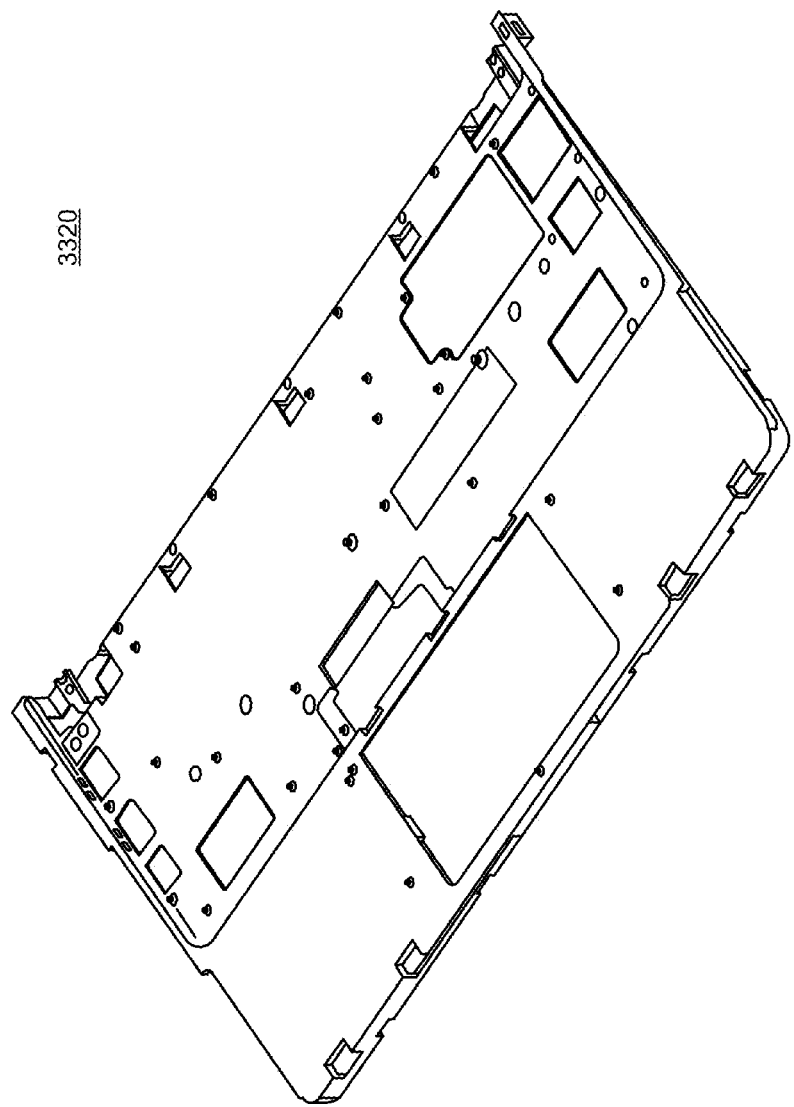

FIGS. 33A through 33C show example parts (e.g., a base frame or cover 3310 and midplane plate 3320) of a bottom housing (e.g., bottom housing 3223) of a laptop computer that may be thermally bonded together by applying spatially varying amounts of heat in a thermal press, in accordance with the principles of the disclosure herein. It will be noted that FIGS. 33A and 33B show a face-up view and a face-down view of base frame or cover 3310, respectively, and FIG. 33B shows a face-up view of midplane plate 3320.

With reference to FIGS. 33A and 33B, example base frame or cover 3310 may be a cosmetic cover portion of bottom housing 3223. Cover 3310 may be made of plastic materials, for example, polycarbonate, polyvinyl chloride (PVC), acrylonitrile butadiene styrene (ABS), metal-filled PVC/ABS or blends thereof. In an example implementation, cover 3310 may have walls that are nominally about 1.4 mm thick. Cover 3310 may include cutouts 3312 and 3314 for a keyboard and a track pad of the laptop computer, respectively. Cover 3310 may include relatively solid or continuous areas 3315 next to track pad cutout 3314, which may serve as palm rest areas for a user of the laptop computer. Further, cover 3310 may have a rim 3316 with an inwardly facing undercut 3318, which may form a generally C-shaped slot or channel to hold or support edges of laptop computer components (e.g., midplane plate 3320) enclosed in bottom housing 3223.

With reference to FIG. 33C, example midplane plate 3320, which may be made of metal or a metal alloy, may be designed as a base or foundation to structurally support various electronic components (e.g., keyboard switches, circuit boards, track pad, etc.) and associated wiring (not shown) enclosed in bottom housing 3223. Midplane plate 3320 may, for example, have a non-uniform topography and include several cutouts to accommodate the various electronic components and associated wiring, etc. The various electronic components may, for example, be mounted on midplane 3320 with mechanical means such as screws, bolts, or fasteners (not shown). In an example implementation, midplane plate 3320 may be made of aluminum, magnesium or a magnesium-aluminum alloy. Midplane plate 3320 may have a nominal thickness of about 1.4 mm, but may have large variations in thickness across its lateral extent.

Figure 34A:
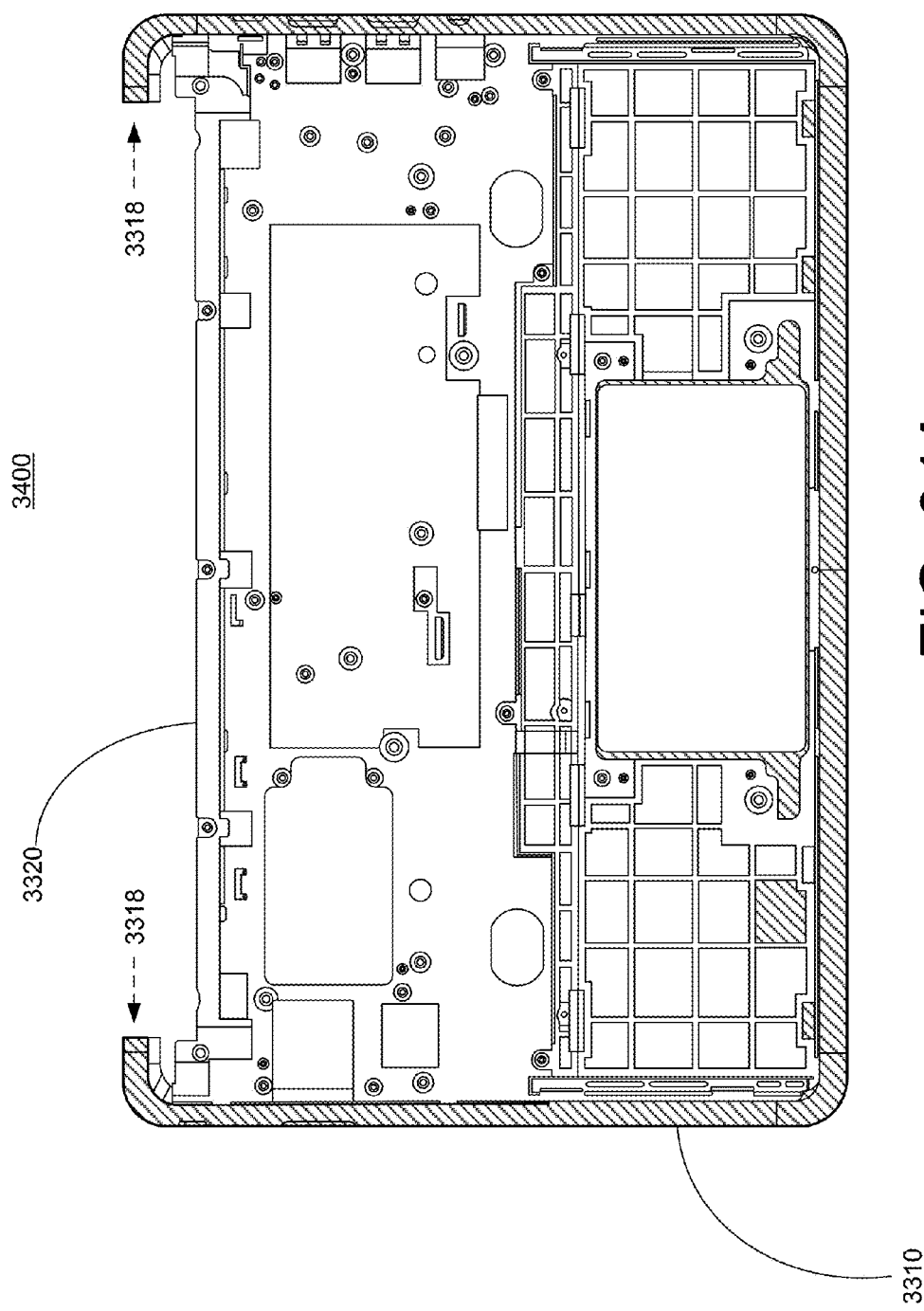

FIGS. 34A and 34B are illustrations of an example assembly 3400 of base frame or cover 3310 and midplane plate 3320, in accordance with the principles of the disclosure herein. It is noted that FIGS. 34A and 34B show views of assembly 3400 with cover 3310 and midplane plate 3320 face-down and face-up, respectively.

While assembling bottom housing 3223, midplane plate 3320 may be tilted and slid into cover 3310 so that edges of midplane plate 3320 rest in undercut 3318 to form assembly 3400 (FIG. 34A). In an example implementation, assembly 3400 may have lateral dimensions of about 300 mm by 200 mm and a thickness of about 5-10 mm.

With renewed reference to the process for thermal bonding of cover 3310 and midplane plate 3320, it will be understood that a thermoplastic adhesive film (e.g., film 3130) may be applied over contact or bonding areas of the latter before it is slid into cover 3310 to form assembly 3400. FIG. 34B, which shows a face-down view of assembly 3400, illustrates bonding areas (e.g., bonding areas 1, 2 and 3) between midplane plate 3320 and cover 3310. To bond midplane plate 3320 to cover 3310, a heated press block of a thermal press may be directly applied to exposed areas of midplane plate 3320 through an open face of cover 3310 to heat and press assembly 3400. However, bonding areas (e.g., bonding areas 2 and 3) in the undercut rim 3316 of cover 3310 may not be amenable to direct contact with the heated block and may be heated only by lateral thermal conduction through midplane plate 3320. Further, thickness variations, cutouts and other structural non-uniformities in midplane plate 3320 may result in non-uniform thermal mass distributions across assembly 3400. The non-uniform thermal mass distributions may make it difficult to achieve uniform softening temperatures across the bonding areas of assembly 3400 when using a heated block such as heated press block 3110 of thermal press 3100, which is heated to a single temperature $T_1$.

Figure 35A:
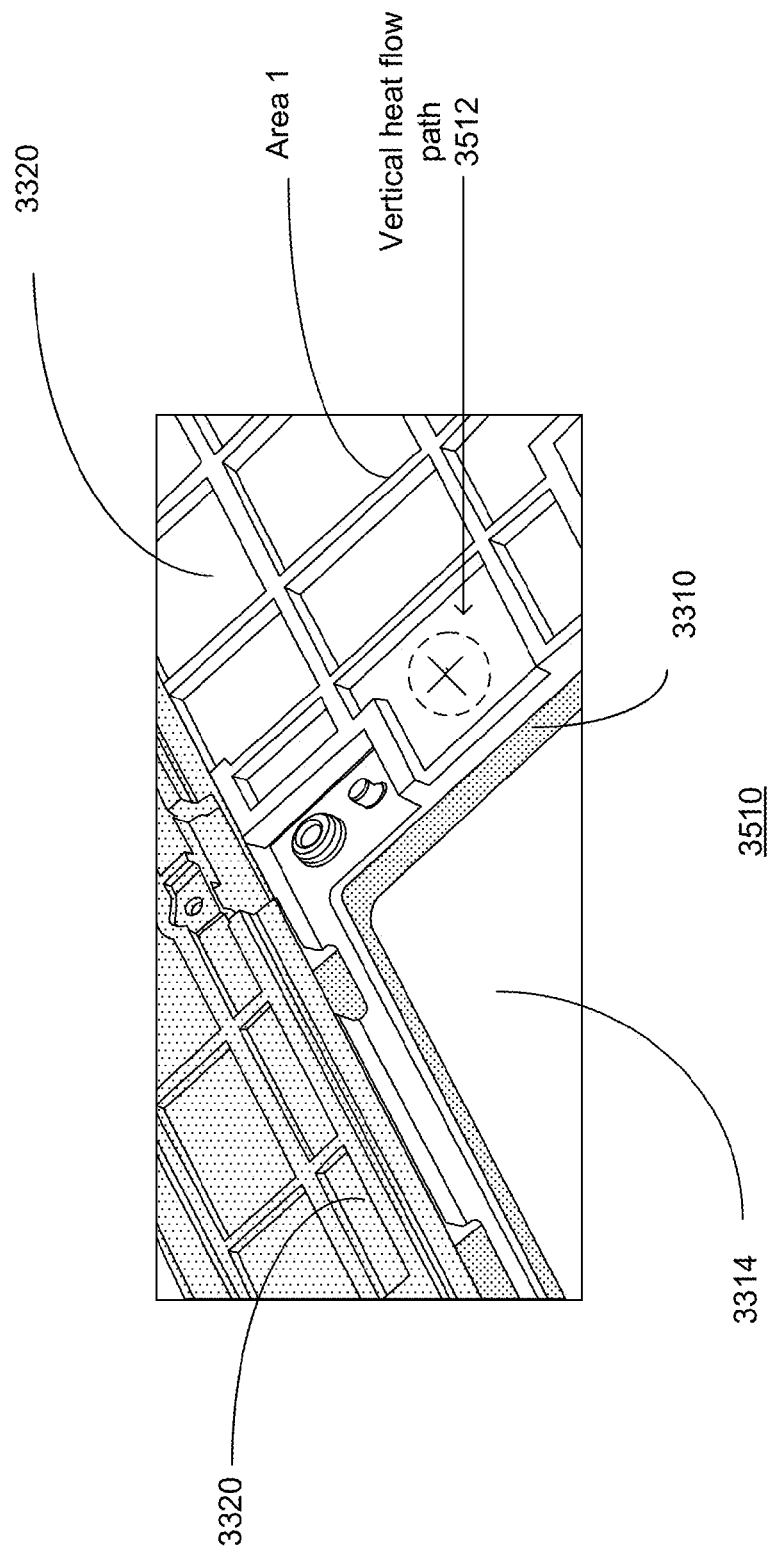
FIGS. 35A through 35C are pictorial illustrations of the different mechanical and geometric characteristics of the bonding areas of the assembly illustrated in FIGS. 34A and 34B.
Figure 35B:
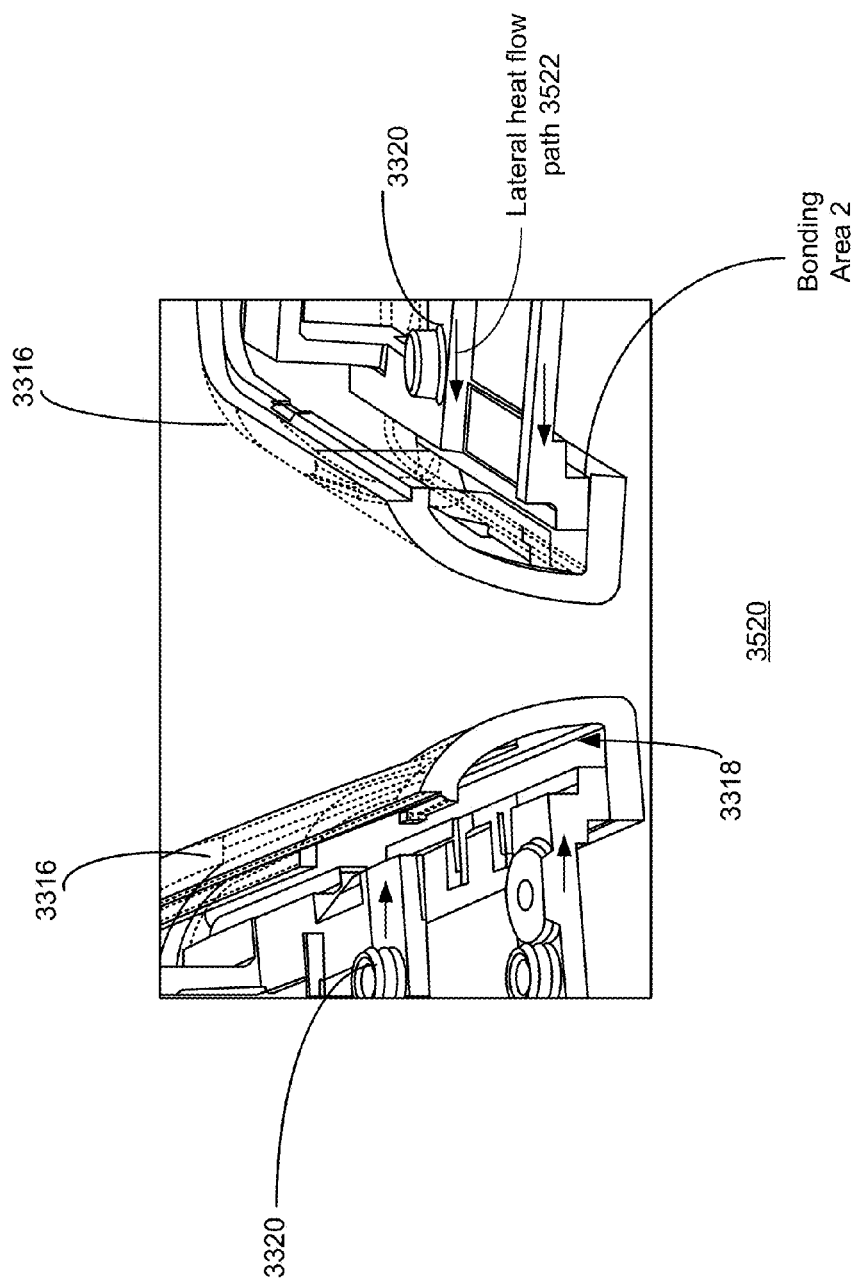
Figure 35C:
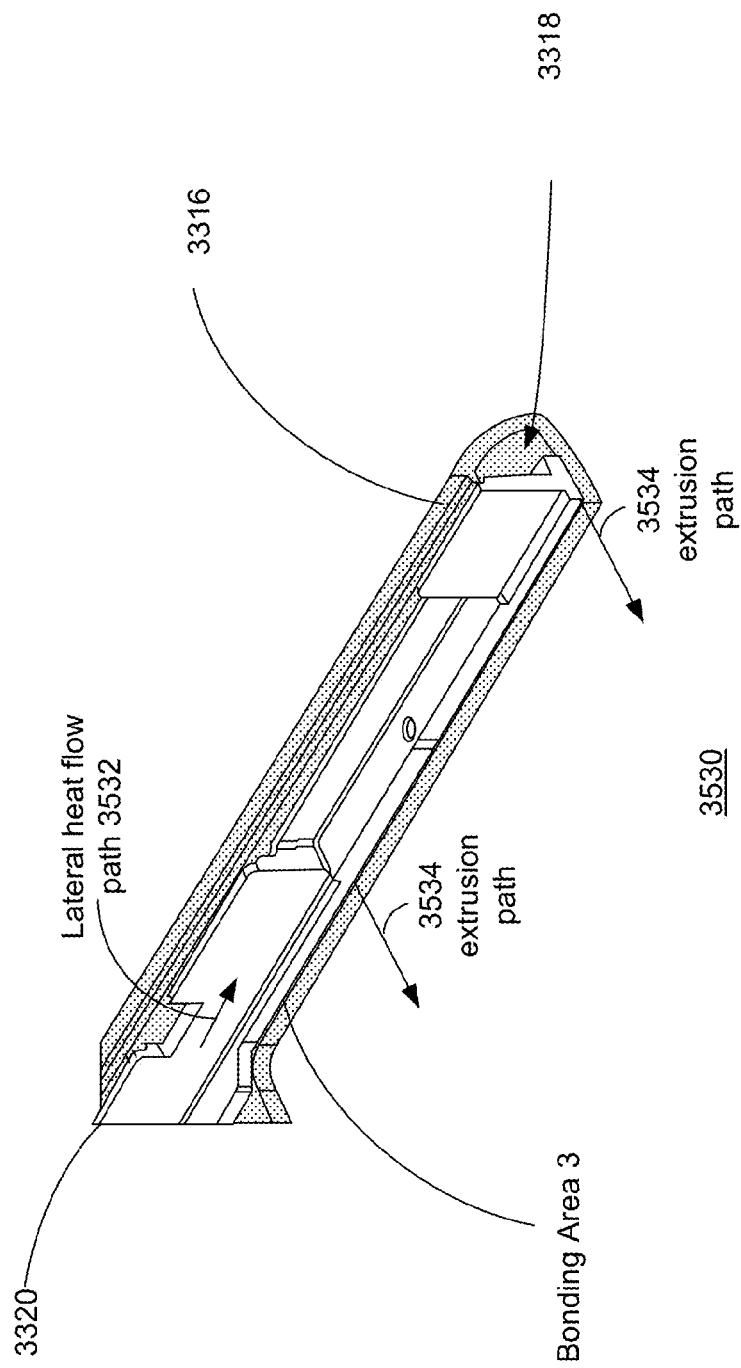

With reference to FIG. 34B, bonding areas 1, 2 and 3 may have different thermal characteristics with respect to heat flow from a heated press block (e.g., heated press block 3110 or 3112) via thermal pathways through midplane plate 3320. The different thermal characteristics of bonding areas 1-3 may be a result of the different mechanical and geometric characteristics of midplane plate 3320 in the vicinity of the bonding areas. FIGS. 35A through 35C pictorially depict the different mechanical and geometric characteristics of bonding areas 1-3 in regions 3510-3530 shown in FIG. 34B, respectively.

Bonding area 1 in region 3510 (FIG. 35A), which may be accessible to a vertically moving heated press block, may have vertical heat flow paths 3512 through midplane plate 3320 that may have a relatively uniform thickness across bonding area 1. In contrast to bonding area 1, bonding area 2 in region 3520 (FIG. 35B) and bonding area 3 in region 3530 (FIG. 35C), which may be in undercut region 3318 of rim 3316, may not be accessible to a vertically moving heated press block. Heat flow paths 3522 to bonding area 2 in area 3520 and heat flow paths 3532 bonding area 3 in area 3530 may extend laterally through midplane plate 3320. Further, as shown in FIGS. 35B and 35C, there may be large local variations in the thickness of midplane plate 3320 in the vicinity of bonding areas 2 and 3, which may make lateral heat flows to bonding areas 2 and 3 non-uniform. Bonding area 3 may also present a risk of squeeze out or extrusion of the softened thermoplastic adhesive along path 3534 into track pad cutout 3314.

By using multi-zone heating elements in a heated press block of the thermal press, different portions of assembly 3400 can be heated to different temperatures, in accordance with the principles of the disclosure herein. Heating different portions of assembly 3400 to different temperatures may compensate for the non-uniform thermal mass distributions and achieve relatively uniform adhesive softening temperatures across the bonding areas of assembly 3400 including bonding areas (e.g., bonding areas 2 and 3) next to cutouts or in the undercut rim of cover 3310.

In an example thermal bonding process, assembly 3400 may be heat and pressure treated in a thermal press having a heated bottom nest and a heated pressing nest or block similar to thermal press 3100 shown in FIG. 31B. Assembly 3400 may be placed in the heated bottom nest, which may be heated to about 50° C. This degree of heating may assist in tacking or lightly bonding the thermoplastic adhesive between cover 3310 and midplane plate 3320 in assembly 3400. Then, the heated pressing nest or block (e.g., heated press block 3112) may be vertically applied to midplane plate 3320 through the open face of cover 3310 in assembly 3400 with a force of about 90 kgf for a dwell time of about 20 seconds. Heating elements in heated pressing nest may be arranged so that there are two heated zones (e.g., zone 1 and zone 2) of the heated pressing nest. Zone 1 corresponding to a front portion of the heated pressing nest may contact a front portion 3410 of assembly 3400 (FIG. 34B) above bonding area 1 and adjoining track pad area 3314. Zone 2 corresponding to a rear portion of the heated pressing nest may contact a rear portion 3420 of assembly 3400 (FIG. 34B) corresponding to keyboard cutout 3312 in cover 3310 next to bonding area 2. To apply spatially varying amounts of heat to assembly 3400, zone 1 may be heated to about 190° C., while zone 2 may be heated to about 240° C. The lower temperature (190° C.) applied to front portion 3410 of assembly 3400 may allow sufficient heat to be conducted through vertical thermal pathways 3512 across midplane plate 3320 to bonding area 1 to properly soften the thermoplastic adhesive there for effective bonding. The higher temperature applied to rear portion 3420 of assembly 3400 may allow sufficient heat to be conducted through lateral thermal pathways 3522 in midplane plate 3320 to bonding area 2 (FIG. 35B) to properly soften the thermoplastic adhesive there for effective bonding. Assembly 3400 may then be cooled to about room temperature under a cooling nest for about 20 seconds with a force of about 85 kgf.

Figure 38:
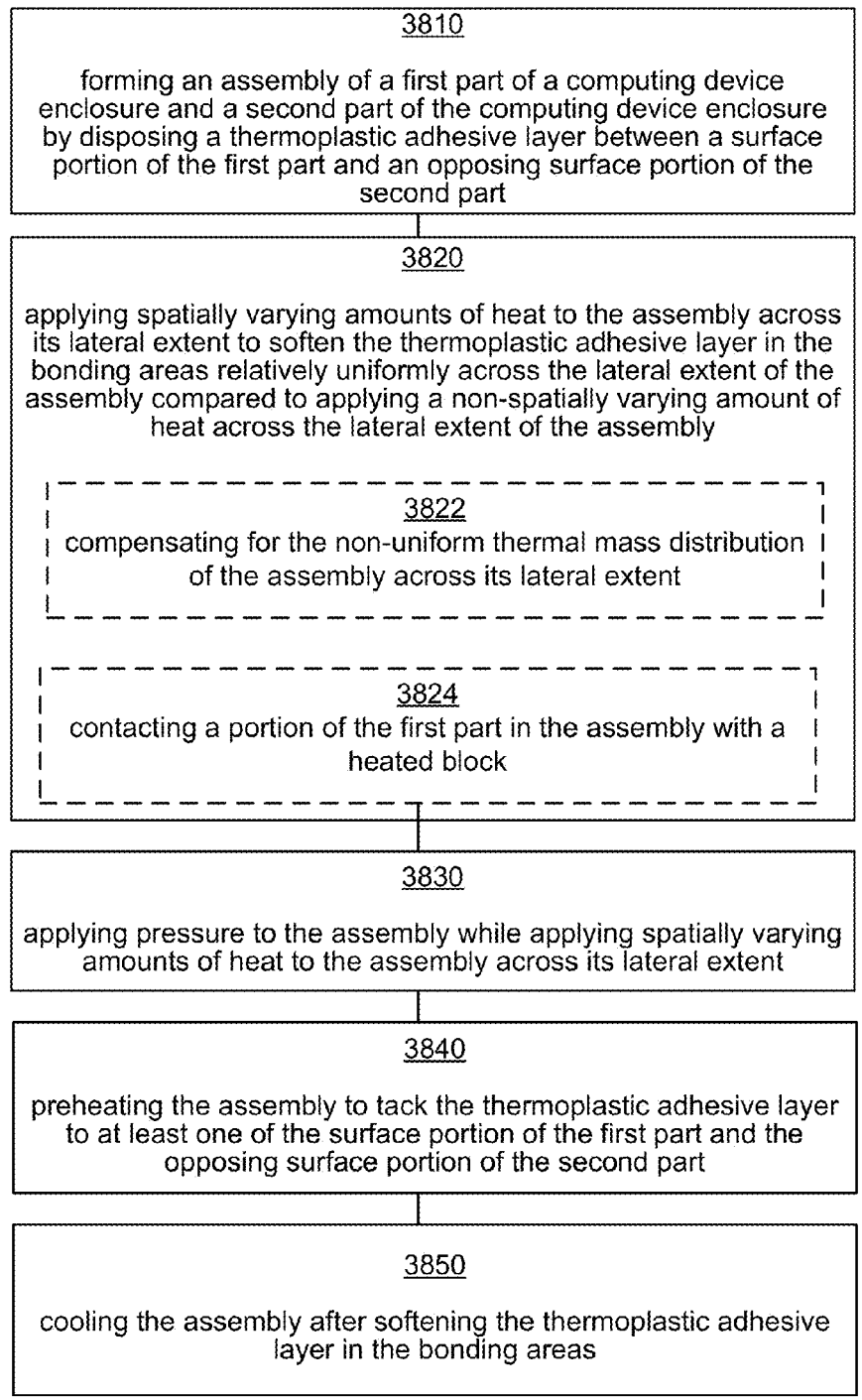

FIGS. 36 through 38 respectively show example methods 3600, 3700 and 3800 for thermally bonding together parts of a computing device enclosure, in accordance with the principles of the disclosure herein. The parts bonded together may, for example, include a base frame or cover and a midplane plate. The base frame or cover may be made of plastic material (e.g., polyvinyl carbonate, acrylonitrile butadiene styrene, or a blend thereof). The midplane plate may be made of a metal or metal alloy (e.g., aluminum, magnesium or an aluminum-magnesium alloy).

With reference to FIG. 36, method 3600 includes inserting the midplane plate having a thermoplastic adhesive layer into the base frame of the computing device enclosure (3610), contacting the thermoplastic adhesive layer of the midplane plate to an inner surface of the base frame of the computing device enclosure (3620), and applying, to the midplane plate, a heat press block having a first portion and a second portion (3630).

Method 3600 further includes heating the first portion of the heat press block to a first temperature and heating the second portion of the heat press block to a second temperature higher than the first temperature (3640). The first temperature may, for example, be about 190° C. The second temperature may, for example, be about 240° C. In method 3600, the first portion heated to the first temperature may be in contact with a front portion of the midplane plate adjoining a track pad area of the computing device enclosure, while the second portion heated to the second temperature may be in contact with a rear portion of the midplane plate adjoining a key board area of the computing device enclosure.

Method 3600 may further include placing the base frame in a bottom nest that is heated to about 50° C. while applying the heat press block to the midplane plate.

With reference to FIG. 37, method 3700 includes gluing or coupling a surface portion of a midplane plate and a surface portion of a base frame of a laptop enclosure together using an intervening thermoplastic adhesive layer (3710), and applying a first amount of heat to a front portion and a second amount of heat to a rear portion of the midplane plate to soften the intervening thermoplastic adhesive layer (3720). Applying a first amount of heat to a front portion and a second amount of heat to a rear portion of the midplane plate 3720 may include applying a heat press block to the midplane plate, the heat press block having a first portion heated to a first temperature and a second portion heated to a second temperature in contact with the midplane plate (3730).

With reference to FIG. 38, method 3800 includes forming an assembly of a first part of a computing device enclosure and a second part of the computing device enclosure by disposing a thermoplastic adhesive layer between a surface portion of the first part and an opposing surface portion of the second part (3810). The surface portion of the first part and the opposing surface portion of the second part may define one or more bonding areas of the first part and the second part across a lateral extent of the assembly. The assembly may have a non-uniform thermal mass distribution across its lateral extent. Method 3800 further includes applying spatially varying amounts of heat to the assembly across its lateral extent to soften the thermoplastic adhesive layer in the bonding areas relatively uniformly across the lateral extent of the assembly compared to applying a non-spatially varying amount of heat across the lateral extent of the assembly (3820).

Applying spatially varying amounts of heat to the assembly across its lateral extent 3820 may include compensating for the non-uniform thermal mass distribution of the assembly across its lateral extent (3822). Further, applying spatially varying amounts of heat to the assembly across its lateral extent 3820 may include contacting a portion of the first part in the assembly with a heated block (3824). The heated block may have multiple zones in contact with the portion of the first part, each heated to a different temperature. In an example implementation, the heated block has two zones in contact with the portion of the first part, each heated to a different temperature.

In method 3800, at least one of the bonding areas may be in a region of the assembly that is not amenable to direct contact by the heated block and which may be heated by lateral thermal conduction from the portion of the first part contacted by the heated block. Conversely, at least one of the bonding areas may be in a region of the assembly that is amenable to direct contact by the heated block and which may be heated by vertical thermal conduction through the portion of the first part contacted by the heated block.

Method 3800 may further include applying pressure to the assembly while applying spatially varying amounts of heat to the assembly across its lateral extent (3830), preheating the assembly to tack the thermoplastic adhesive layer to at least one of the surface portion of the first part and the opposing surface portion of the second part (3840), and cooling the assembly after softening the thermoplastic adhesive layer in the bonding areas (3850).

As described herein in at least FIGS. 39 through 45, a keyboard support member may be coupled to a base assembly of a computing device, thereby securing a keyboard assembly to the base assembly. For example, the base assembly may define an opening within the base assembly, and the keyboard assembly may be placed within the opening of the base assembly. As further described with reference to the figures, the structure of the base assembly may permit the keyboard assembly to be inserted from the top from the perspective of a user looking down on the computing device.

The keyboard support member may include an outer circumference portion defining a support member bezel, and an interior portion having a lattice structure defining a plurality of opening that are configured to fit around the keys of the keyboard assembly. The keyboard support member may be coupled to the base assembly by heat staking, interference fit, or fasteners (e.g., threaded fasteners), thereby securely enclosing the keyboard assembly to the base assembly. In other words, the keyboard support member may be coupled to the base assembly with the keyboard assembly located between the keyboard support member and the base assembly. This structure permits easy removal of the keyboard assembly, as well as the interchangeability of various kinds of keyboard support members, which may have different materials (e.g., plastic, wood, metal, etc.) or colors around the support member bezel and/or lattice structure.

In one implementation, the keyboard support member may be coupled to the base assembly using screw bosses. For example, screw bosses (e.g., plastic bosses) may be located on the keyboard support member, and threaded fasteners (e.g., screws) can be directed threaded into the keyboard support member. The screw bosses may extend from the keyboard support member bezel area and/or the lattice structure area. Further, the keyboard support member may include threaded metal inserts that can be molded or inserted into the material of the keyboard support member. Then, the screws can be fastened directly into the threaded metal inserts (e.g., brass threaded inserts molded into plastic bosses).

Further, the keyboard support member may be produced using a double shot method of molding the keyboard support member. For example, in a first shot, the keyboard support member may be molded into its lattice structure, and then in a subsequent shot, the support member bezel of the keyboard support member may be further molded to define its shape. In one implementation, the support member bezel may include a different color than the interior lattices. The implementations described in connection with FIGS. 39 through 45 can be combined with any of the implementations described in connection with FIGS. 1 *through* 38.

Figure 39:
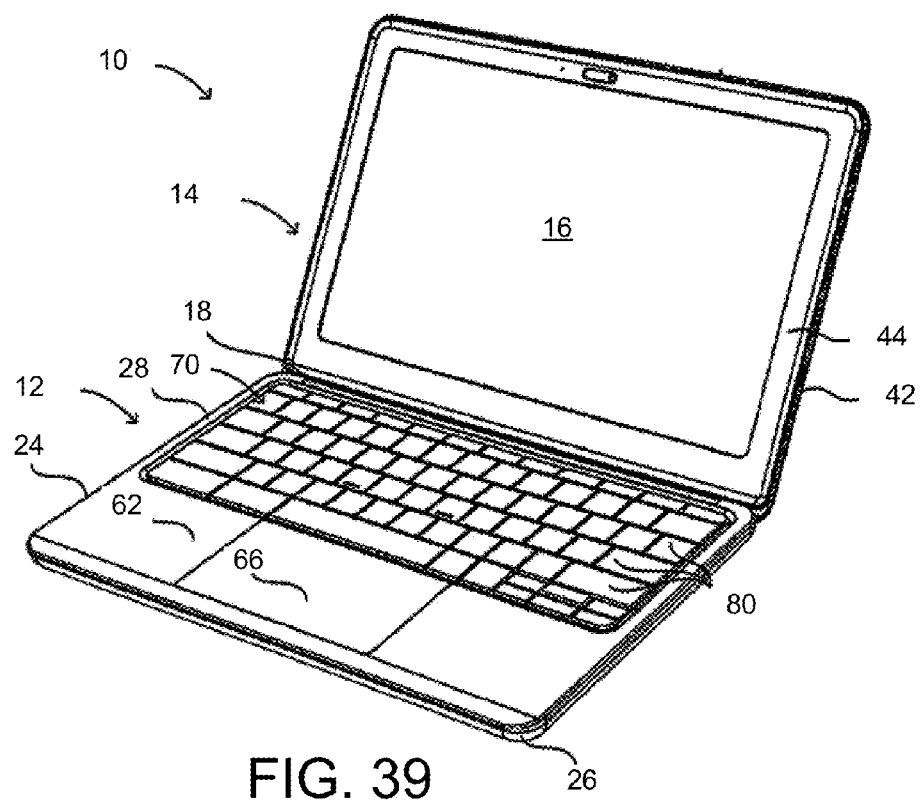
FIG. 39 illustrates a computing device having an open configuration.
Figure 40:
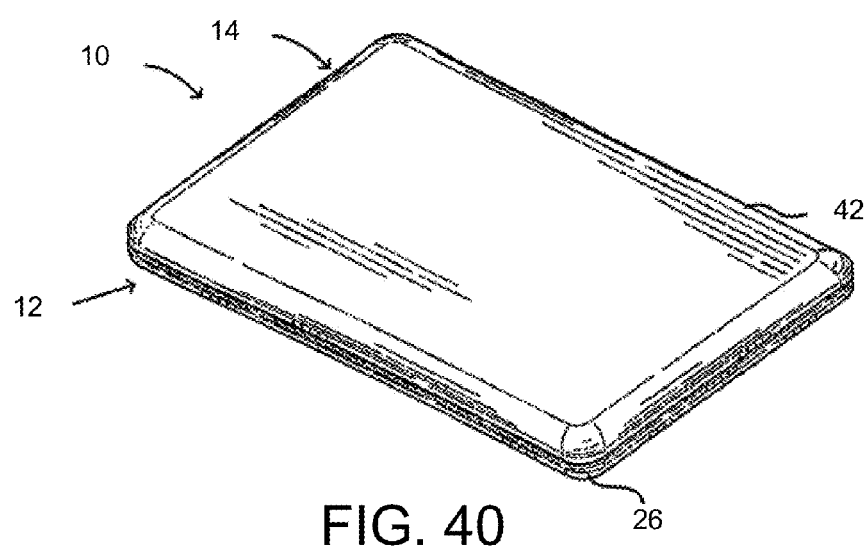
FIG. 40 illustrates the computing device having a closed configuration.

FIGS. 39 and 40 illustrate a computing device 10 in the form of a notebook, laptop, or clamshell computer with a base assembly 12 configured to rest on a surface and to support a display portion 14 having a display screen 16. The display portion 14 may be connected to the base assembly 12 by a hinge 18 that allows the display portion 14 to close against the base assembly 12, as shown in FIG. 40, and to be opened by rotation away therefrom into a user-selectable viewing position, as shown in FIG. 39.

For example, the hinge 18 may connect the base assembly 12 with the display portion 14. The hinge 18 may be configured to allow the display portion 14 to rotate with respect to the base assembly 12 to provide the desired range of rotation to allow the display portion 14 to be positioned in the closed position or a range of open positions. The hinge 18 may also be configured to provide internal friction to maintain a selected open position of the display portion 14 relative to the base assembly 12.

The base assembly 12 may be configured to receive and retain a keyboard assembly 70 and a trackpad assembly 66 for receiving user input to the computing device 10. The keyboard assembly 70 may include a plurality of keys 80, as well as other keyboard components. The keyboard assembly 70 is further explained with reference to FIG. 41. The plurality of keys 80 may include any number of keys 80 that can be arranged according to any known keyboard configurations such as the Dvorak Simplified Keyboard, or QWERTY, for example.

The trackpad assembly 66 may also be referred to as a touchpad and may include any type of touch-sensitive input, operating by capacitive, magnetic, resistive, surface-acoustic wave or other forms of touch-sensitivity. Both the keyboard assembly 70 and the trackpad assembly 66 are mounted to the base assembly 12 such that the keyboard assembly 70 and the trackpad assembly 66 are exposed at (or otherwise available for user interaction on) an upper portion of the base assembly 12. For example, the keyboard assembly 70 and the trackpad assembly 66 may be exposed to the user by an opening defined by an upper surface 28 of the base assembly 12. It is noted that the terms upper, lower, and other terms related to relative positions of components or elements as depicted in the figures. Such terms are used for convenience and do not limit the actual positions of the elements or components should the device be repositioned.

The base assembly 12 may include a first housing 24 having a unitary material structure, and a second housing 26 that is assembled with the first housing 24 of the base assembly 12 to enclose some of the internal components of the computing device 10. The internal components may include a printed circuit board that carries the computer's central processor and any additional processors such as for graphics or the like as well as the computer's random-access memory (RAM). As shown in FIG. 39, the first housing 24 may be an upper housing located on an upper portion of the base assembly 12, and the second housing 26 may be a lower housing located on a lower portion of the base assembly 12. The first housing 24 may define an upper surface 28. For example, the upper surface 28 of the base assembly 12 may define an area 62 adjacent to the keyboard assembly 70 and the trackpad assembly 66. As further illustrated in FIG. 41, a portion of the upper surface 28 may define an opening configured to receive the keyboard assembly 70.

As with the first housing 24, the second housing 26 may have a unitary material structure. In some examples, the second housing 26 may include additional outer components, such as covers for externally-accessible batteries. In one example, the first housing 24 may be made from a single piece of plastic or metal, or multiple pieces of plastic or metal. Also, the second housing 26 can be made from a single piece of plastic or metal, or multiple pieces of plastic or metal. The plastic materials may include any type of plastic or semi-plastic materials. The metal materials may include any type of metal or semi-metal material such as aluminum, aluminum alloy, magnesium alloys, stainless steel, for example. The first housing 24 and the second housing 26 can be made by injection molding metal or plastic, and/or by die-casting metal.

In one implementation, the second housing 26 may be configured to enclose the internal components of the base assembly 12 when assembled with the first housing 24. The second housing 26 can also be configured to allow the computing device 10 to rest on a surface. As such, the second housing 26 can include a generally flat lower surface with a plurality of feet or grip members that allow the base assembly 12 to rest on the surface and to be resistant to sliding during normal use. The second housing 26 can be configured to attach with the first housing 24 using screws or other fasteners to enclose the internal components such as one or more batteries, CPU board assembly and related circuitry, and communications structures, connection components such as USB plugs, or power plugs, as well as internal portions of the trackpad assembly 66 and the keyboard assembly 70. The first housing 24 and the second housing 26 can be configured such that the internal components can attach with either the first housing 24 or the second housing 26 prior to attachment of the two housings together.

The display portion 14 may include an outer housing 42, and a display bezel 44 that is attached to the outer housing 42 of the display portion 14. Together, the outer housing 42 of the display portion 14 and the display bezel 44 may enclose additional components of the display portion 14 such as the display screen 16 as well as any type of internal components such as internal display drivers, for example.

The display bezel 44 may be configured to surround at least part of the display screen 16. Further, the display bezel 44 may assist in retaining the internal components that are configured to be positioned within the display portion 14. For example, the display bezel 44 may define a display opening through which at least the display screen 16 is viewable by a user. The distance by which the display bezel 44 extends inward can vary depending on the configuration of, for example, the display portion 14 and/or the materials from which the display portion 14 is constructed. The outer housing 42 of the display portion 14 and the display bezel 44 can be assembled together using glue, pressure-sensitive adhesive, or mechanical fasteners such as screws, or snap-fit elements, for example. In another example, the outer housing 42 of the display portion 14, as well as the first housing 24 and the second housing 26 of the base assembly 12 can be integrally formed with the bezel 44 as a unitary housing configured with multiple, solidly joined, walls of a single piece of material.

Figure 41:
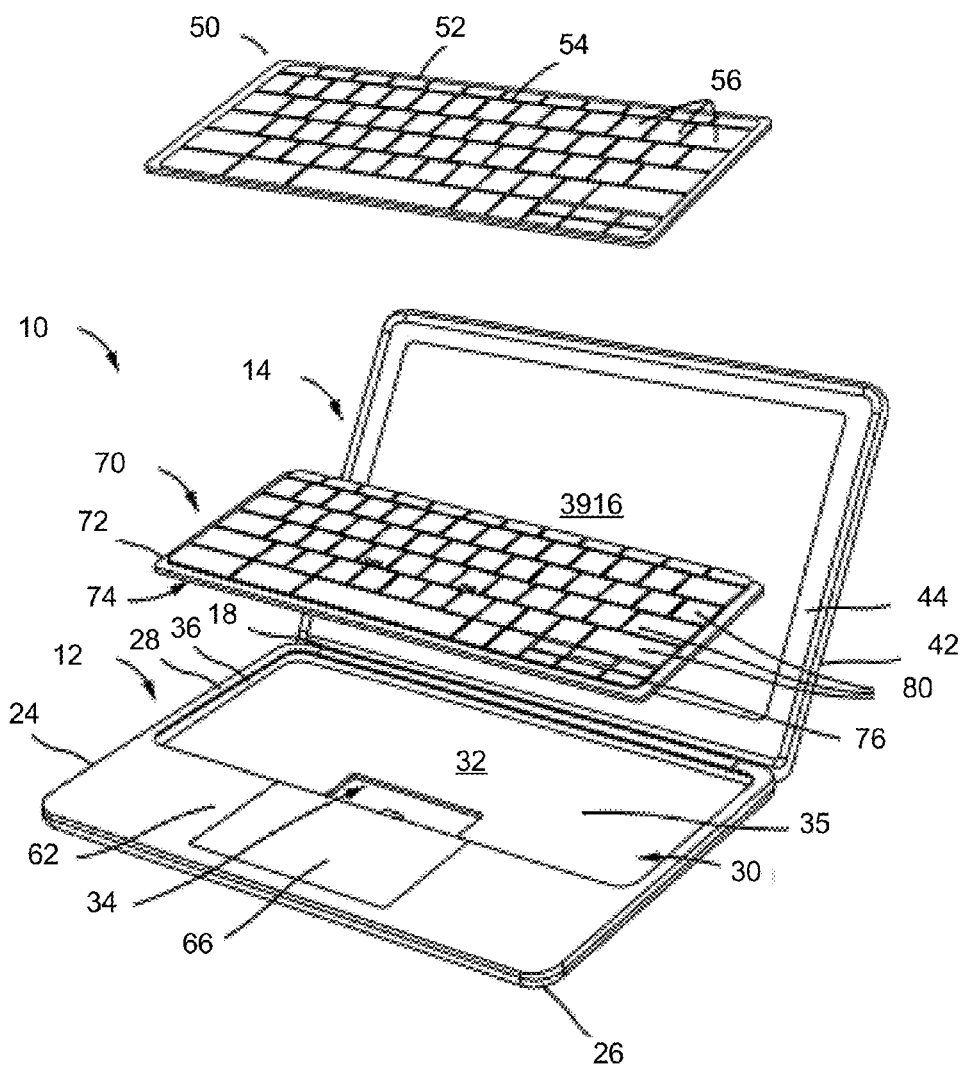
FIG. 41 illustrates an exploded view of the computing device with a keyboard support member configured to retain a keyboard assembly.

FIG. 41 illustrates an exploded view of the computing device 10 with a keyboard support member 50 configured to retain the keyboard assembly 70 according to an implementation.

As shown in FIG. 41, the computing device 10 may include the keyboard support member 50 configured to secure the keyboard assembly 70 to the base assembly 12. The keyboard support member 50 may include an outer circumference portion defining a support member bezel 52, and a lattice structure 54 defining a plurality of openings 56. The keyboard support member 50 may be configured to secure the keyboard assembly 70 to the base assembly 12 within a recess 32 defined by the first housing 24 of the base assembly 12 such that the plurality of keys 80 fit within the plurality of opening 56 defined by the lattice structure 54. For example, the lattice structure 54 of the keyboard support member 50 may be configured to fit around the keys 80 of the keyboard assembly 70 through the openings 56 of the keyboard support member 50. Accordingly, an arrangement of the lattice structure (e.g., the size of the openings 56) may be dependent upon the type of keyboard configuration such that the opening 56 may be configured to receive the keys 80. Once the keyboard support member 50 is secured to the base assembly 12 (with the keyboard assembly 70 located between the keyboard support member 50 and the base assembly 12), the inclusion of the keyboard support member 50 should not interfere with the operation of the keys 80.

In one implementation, the numbers of openings 56 of the keyboard support member 50 correspond to the number of keys 80 of the keyboard assembly 70. In other implementation, the number of openings 56 of the keyboard support member 50 is less than the number of keys 80 on the keyboard assembly 70. For example, an opening 56 may encompass one, two, three, or more keys 80. As such, although the lattice structure 54 may depend on the keyboard configuration, the number and size of the opening 56 defined by the lattice structure may widely vary.

The computing device 10 may be configured such that keyboard assembly 70 can be externally assembled with the base assembly 12 independently of the assembly of the internal computer components or the assembly of the first housing 24 with the second housing 26. As shown in FIG. 41, the computing device 10 can be configured such that substantially all of the components of the computing device 10 (excluding the keyboard assembly 70) can be assembled together before assembling the keyboard assembly 70 with the base assembly 12. In this example, this assembly is facilitated by the structure of the computing device 10, including the incorporation of a keyboard opening 30 positioned within the upper surface 28 of the first housing 24.

The keyboard opening 30 may be defined by the recess 32, which is defined by the first housing 24 that includes a lower surface 35 that is generally parallel to and positioned below the upper surface 28. A wall 36 may extend between the upper surface 28 and the lower surface 35 and may define an outer periphery of the recess 32 that extends from the periphery defined by the keyboard opening 30. The recess 32 may be formed along the wall 36 of the first housing 24 with a depth extending from the upper surface 28 to the lower surface 35. As such, the recess 32 from the upper surface 28 defines the keyboard opening 30. In one implementation, the support member bezel 52 may be configured to engage the wall 36 of the base assembly 12 and the keyboard assembly 70.

Generally, a size of the keyboard opening 30 is based on the structure of the keyboard assembly 70 (as well as the size of the support member bezel 52) such that the keyboard assembly 70 can be assembled therein with the keyboard support member 50 being placed over the keyboard assembly 70 in a manner that allows the keyboard support member 50 to be secured to the first housing 24. Also, the upper surface 28 of the base assembly 12 may define the area 62 adjacent to the keyboard assembly 70 and the trackpad assembly 66. A number of peripheral connection openings (not shown) to the interior of the base assembly 12 may also be included in the first housing 24 and/or the second housing 26, and may allow for access to peripheral connections such as a power adapter plug, a USB device, one or more memory cards, audio devices, for example.

The keyboard assembly 70 may include a body in the form of a substrate 72 that defines substantially parallel and spaced-apart upper 76 and lower 74 surfaces. The substrate 72 further has affixed thereto, over the upper surface 76, the plurality of keys 80 configured to provide various inputs to the computing device 10 common of computer keyboards in general. As shown, the substrate 72 may define its own outer periphery that extends beyond the outermost ones of the keys 80 supported by substrate 72.

The wall 36 of the recess 32 and the periphery of the substrate 72 can be configured such that the substrate 72 can be received within the recess 32 with the lower surface 74 of the substrate 72 resting on the lower surface 35 of recess 32. The particular fit between the substrate 72 and the recess 32 can vary, but in the present example can be such that keyboard assembly 70 can be moved into the recess 32 without significant resistance but such that lateral movement of keyboard assembly 70 within the recess 32 is limited.

The relative sizes of the substrate 72 and the recess 32 can be adjusted to account for tolerances in the various manufacturing processes used in formation thereof. Other configurations of the substrate 72 and the recess 32 are possible, including those in which a press or resistance fit is achieved between the substrate 72 and the recess 32 or those in which a certain degree of lateral movement of the keyboard assembly 70 within the recess 32 is permitted with other features, such as adhesives or other fasteners used to maintain the lateral position of keyboard assembly 70 within the recess 32. Further, the depth of the recess 32 relative to the overall height of the keyboard assembly 70 can be such that plurality of keys 80 are substantially even with the upper surface 28 of the first housing 24 or project slightly above the upper surface 28.

Further, the recess 32 may include an access opening 34 within the recess 32 to allow the keyboard assembly 70 to be connected with the internal components of the base assembly 12, such as the printed circuit board, for example. Although such features are omitted from the figures for clarity, the general structure of such features can be similar to those used in other portable computer applications. In an example, a connection cable (not shown) can extend from keyboard assembly 70 and can be extended through the access opening 34 to connect with a corresponding connection internal to the base assembly 12. In another example, a cable can extend from an internal component within the base assembly 12 that is configured to receive inputs from keyboard assembly 70 and can pass through the access opening 34 to be connected with the keyboard assembly 70 prior to the keyboard assembly 70 being placed within the recess 32.

Other configurations of portions of the first housing 24 within the keyboard opening 30 are possible. In one example, the first housing 24 of the base assembly 12 may be substantially open to the interior of the base assembly 12 within the keyboard opening 30 with a plurality of appropriately-positioned tabs or other support structures extending inward relative to the keyboard opening 30 to retain the keyboard assembly 70 in an appropriate position relative to the keyboard opening 30 and the upper surface 28 of the base assembly 12. In another example, the recess 32 can include a plurality of openings similar to the access opening 34 to provide additional pass-throughs for connection between the keyboard assembly 70 and the internal components of the base assembly 12 or to allow for cooling, weight reduction, or transmission of sound from internal speakers. In such a configuration, the plurality of openings can be sized and positioned such that a web-like support structure that is substantially open to the interior of the base assembly 12 defining the recess 32.

In a further implementation, the recess 32 may be defined such that different types of keyboards may be placed within the recess 32 and then coupled to the base assembly via the keyboard support member 50. For example, the structure of the recess 32 may permit the interchangeability of various kinds of keyboards. In addition, the keyboard support member 50 may be configured such that it can secure various types of keyboards. In this respect, the lattice structure 54 may be generic enough to fit around the keys 80 of various types of keyboards.

Figure 42:
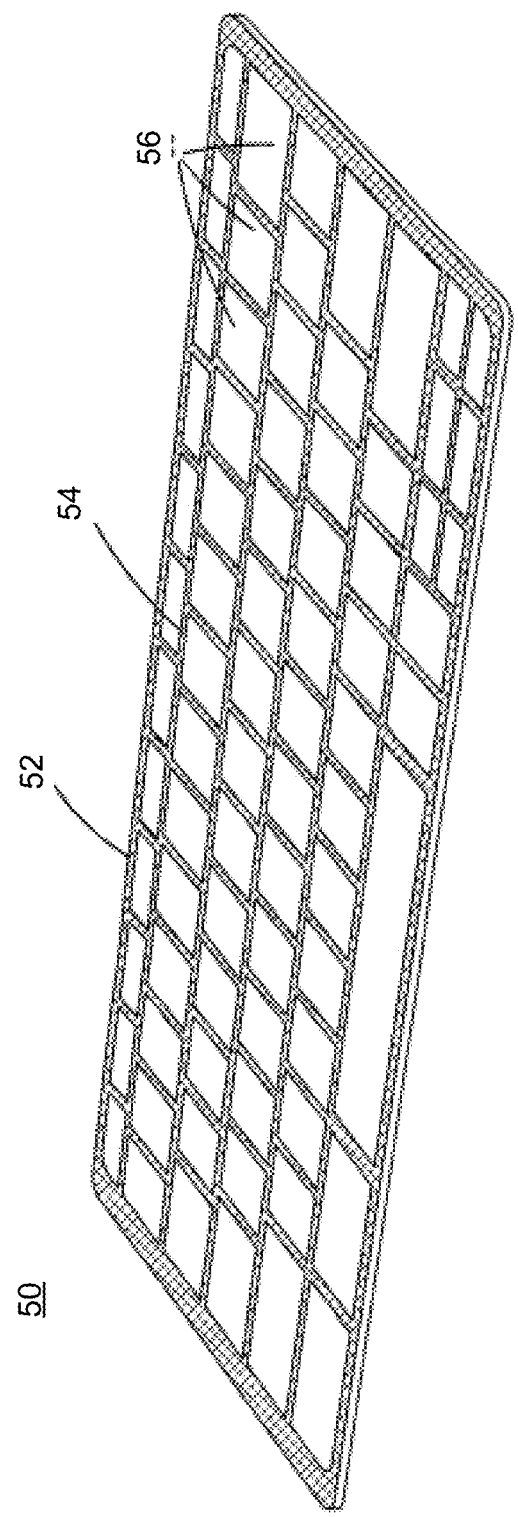
FIG. 42 illustrates a larger view of the keyboard support member.

FIG. 42 illustrates a larger view of the keyboard support member 50 according to an implementation. As shown in FIG. 42, the keyboard support member 50 may include the support member bezel 52 and the lattice structure 54 defining the plurality of openings 56. In one example, the keyboard support member 50 may be a continuous frame-like structure defining the support member bezel 52 and the lattice structure 54. FIG. 42 illustrates one-side of the keyboard support member 50, e.g., the surface that is exposed to the user. The opposite-side of the keyboard support member 50 (not shown) includes a surface exposed to the keyboard assembly 70 and the base assembly 12, which may include receiving units (e.g., screw bosses) on the support member bezel 52 for receiving fasteners, as further depicted in FIG. 43. Alternatively, the surface of the keyboard support member 50 exposed to the user (e.g., as shown in FIG. 42) may include a plurality of openings configured to receive the fasteners, which then are secured to the base assembly 12. In this configuration, the base assembly 12 may include the receiving units configured to receive a portion of the fasteners exposed through the keyboard support member 50. As such, the fasteners may be inserted from the surface exposed to the user to the base assembly 12. Also, it is noted that if the keyboard support member 50 is coupled to the base assembly 12 by heat staking or interference fit, the keyboard support member 50 does not include the receiving units.

The lattice structure 54 may include strips of material that connects to each other that form an interlaced structure or pattern. In particular, the lattice structure 54 may include a plurality of first elongated members (having a certain thickness) that extend from one end of the keys 80 to the other end of keys 80, and a series of smaller second elongated members (having a certain thickness) that extend from each of the first elongated members and possibly connect to another first elongated member. In one example, the first elongated members may be horizontal and substantially parallel to each other, and the second elongated members may be vertical. Also, the first elongated members may have the same or different thickness as the second elongated members. The first and second elongated members may be integrally formed such that their arrangement in the lattice structure 54 appears as one continuous material.

Also, the material of the support member bezel 52 may have a different thickness than the material of the lattice structure 54. In one implementation, the support member bezel 52 may have a greater thickness than the material of the lattice structure 54. In one example, the support member bezel 52 may include a first layer of material disposed on a second layer of material, whereas the lattice structure 54 may include the first layer of material. These features are further explained with reference to FIG. 45.

According to another implementation, the keyboard support member 50 may include the lattice structure 54 defining the opening 56, but not the support member bezel 52. For example, the lattice structure 54 may include portions that fit around at least some of the keys. However, the keyboard support member 50 may not include an outer circumference portion that is disposed on the outside of the outermost keys 80. In this example, the lattice structure 54 (e.g., the series of first and second elongated members) may extend to the edge of the keyboard opening 30 (or the first housing 24), and the interference between the lattice structure 54 and the base assembly 12 may secure the keyboard assembly 70 into position.

Referring back to FIG. 41, the keyboard support member 50 may be configured such that an outer circumference of the support member bezel 52 fits securely within the wall 36 and/or the keyboard opening 30 and further such that a portion thereof extends past the outer periphery of substrate 72 and contacts a portion of the upper surface 76 of the substrate 72. Accordingly, the keyboard support member 50 can be assembled with the base assembly 12 after the keyboard assembly 70 has been positioned within the recess 32 to secure the keyboard assembly 70 to the base assembly 12.

The keyboard support member 50 may be a flexible or semi-flexible material. In one example, the keyboard support member 50 made of a polymeric material such as a plastic, for example. Other materials can also be used for the keyboard support member 50 such as various rubbers or metals, for example. The keyboard support member 50 may be flexible or compressible so that it can make an appropriately tight fit within the keyboard opening 30 and so that it can exert a force against the substrate 72 to maintain contact between the lower surface 74 of the substrate 72 and the lower surface 35 of recess 32.

Figure 43:
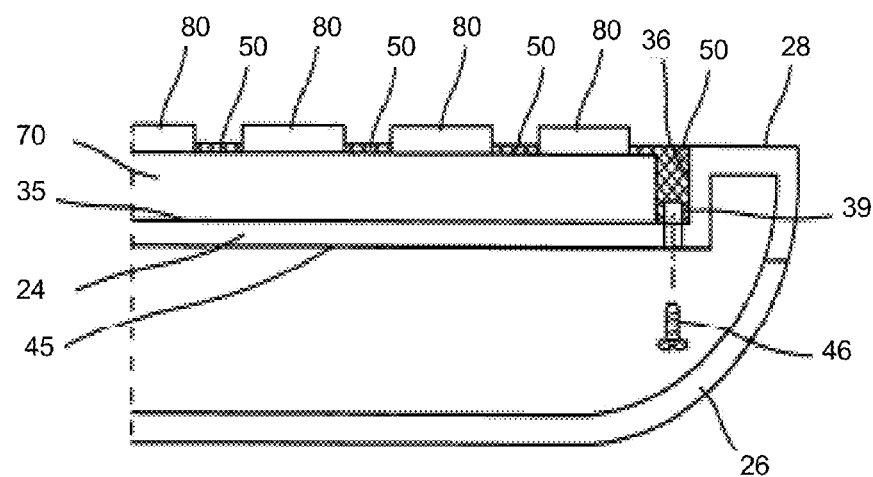
FIG. 43 illustrates a cross-sectional view of the computing device.

FIG. 43 illustrates a cross-sectional view of the computing device 10 according to an implementation. As shown in FIG. 43, the keyboard support member 50 is coupled to the base assembly 12 with the keyboard assembly 70 located between the keyboard support member 50 and the base assembly 12. For example, the keyboard support member 50 may be configured to secure the keyboard assembly 70 to the base assembly 12 within the keyboard opening 30 defined by the base assembly 12 such that the plurality of keys 80 are within the openings 56 defined by the lattice structure 54.

In particular, the keyboard assembly 70 is disposed within the recess 32 defined by the wall 36 to contact the lower surface 35. Then, the keyboard support member 50 is placed on top of the keyboard assembly 70 such that the plurality of openings 56 defined by the lattice structure 54 fit around the keys 80. At least a portion of the keyboard support member 50 (e.g., a portion of the support member bezel 52) may contact the lower surface 35 of the recess 32.

In one implementation, the keyboard support member 50 may be coupled to the base assembly 12 (e.g., the first housing 24) using a plurality of fasteners 46. The fasteners 46 may include threaded fasteners such as screws, or generally any type of fastener that capable of connecting two components together. In one example, the support member bezel 52 of the keyboard support member 50 may be coupled to the first housing 24 of the base assembly 12. As further explained below, the fasteners 46 may be positioned or threaded through the first housing 24 and through a portion of the keyboard support member 50.

Although one fastener 46 is illustrated in FIG. 43, the keyboard support member 50 may be secured to the base assembly 12 using any number of fasteners 46. For example, the fasteners 46 may secure the keyboard support member 50 to the base assembly 12 at locations around the first housing 24 that correspond to the support member bezel 52. Referring to the first housing 24 (which includes the lower surface 35 and a surface 45 exposed to the second housing 26), the fastener 46 may be positioned or threaded through the first housing 24 (e.g., through the surface 45 to the lower surface 35) and engage the keyboard support member 50. The support member bezel 52 may be configured to receive at least a portion of the fastener 46.

In one example, if the coupling is based on fasteners 46, the keyboard support member 50 may include a plurality of receiving units, one of which is illustrated by receiving unit 39. For example, the receiving unit 39 may be configured to receive a portion of the fastener 46. In one example, the receiving unit 39 may be a channel or void in the support member bezel 52 that accepts or receives the fastener 46. In one example, the receiving unit 39 may be considered a screw boss. In this context, the channel or void of the receiving unit 39 may include a structure that may correspond to the structure of the corresponding fastener 46. In one example, if the fastener 46 is screw, the receiving unit 39 may include threads that are capable of receiving the screw as the screw rotates. According to one example, a plurality of receiving units may be positioned around the support member bezel 52. The receiving unit 39 may extend into only a portion of the keyboard support member 50 such that the surface of the keyboard support member 50 exposed to the user does not expose any portion of the receiving unit 39. Rather, the receiving unit 39 is exposed on the surface of the keyboard support member 50 facing the lower surface 35.

Also, the receiving units 39 may be screw bosses (e.g., plastic bosses) that are located on the keyboard support member 50, and threaded fasteners (e.g., screws) can be directed threaded into the keyboard support member 50. The screw bosses may extend from the keyboard support member bezel area and/or the lattice structure area. Further, the keyboard support member 50 may include threaded metal inserts that can be molded or inserted into the material of the keyboard support member 50. Then, the screws can be fastened directly into the threaded metal inserts (e.g., brass threaded inserts molded into plastic bosses).

In another implementation, as indicated above, the keyboard support member 50 may include a plurality of openings positioned around the support member bezel 52, which are configured to initially receive the fasteners 46. For example, the fasteners 46 may be initially received by the surface of the keyboard support member 50 that is exposed to the user. Then, the fasteners 46 are configured to protrude from the keyboard support member 50 via the openings into the base assembly 12. In this configuration, the first housing 24 may include the plurality of receiving units including the receiving unit 39, which are configured to receive the portions of the fasteners 46 extending out of the keyboard support member 50.

In another implementation, the keyboard support member 50 may be coupled to the base assembly 12 based on thermoplastic staking. For example, thermoplastic staking (also referred to as heat staking) is a process of connecting of two components using heat. In this example, portions of the keyboard support member 50 (e.g., portions of the support member bezel 52) and/or portions of the first housing 24 may be heated to connect the keyboard support member 50 to the base assembly 12.

In yet another implementation, the keyboard support member 50 may be coupled to the base assembly 12 based on an interference fit. For example, the structure of the keyboard support member 50 may be dimensioned such that the keyboard support member 50 may fit around the keys 80, and in between the keyboard assembly 70 and the first housing 24. In particular, the support member bezel 52 may engage the keyboard assembly 70 and the wall 36 such that the keyboard support member 50 is securely fixed.

In particular, the keyboard support member 50 may be made of a resiliently-flexible material such as Nylon, plastic, or the like. The use of a flexible material can allow the keyboard support member 50 to be oversized with respect to the depth with which it extends into the recess 32 such that it flexes when pressed into contact with the upper surface 76 of the keyboard assembly 70 and the lower surface 35 of the recess. This can cause the keyboard support member 50 to exert a constant downward force onto the substrate 72 that can help to retain the position, both vertically, and laterally, of the keyboard assembly 70 within the recess 32. Other shapes and configurations of the keyboard support member 50 can be used and can be adjusted or otherwise devised to give varying cosmetic appearances, to provide varying fits or interactions with the recess 32 and the keyboard assembly 70 and to take advantage of various material properties.

Further, the keyboard support member 50 may be produced using a double shot method of molding. For example, in a first shot, the keyboard support member 50 may be molded into its lattice structure 54, and then in a subsequent shot, the support member bezel 52 of the keyboard support member 50 may be further molded to its structure. In one implementation, the support member bezel 52 may include a different color than the lattice structure 54.

Figure 44B:
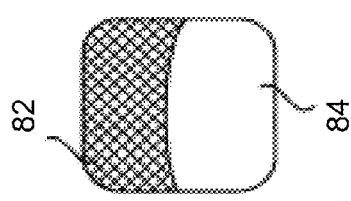
FIG. 44B illustrates a cross-section of the keyboard support member of FIG. 6A.
Figure 44A:
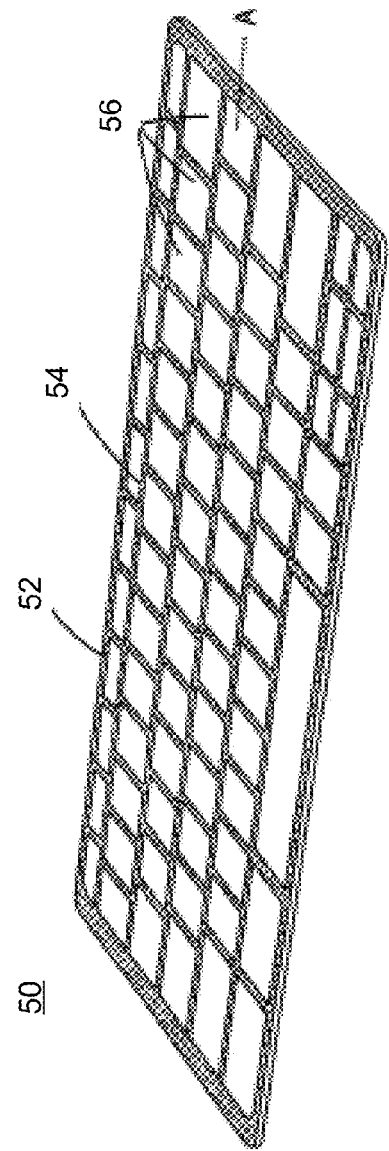
FIG. 44A illustrates the keyboard support member.

FIG. 44A illustrates the keyboard support member 50 according to an implementation. The keyboard support member 50 is the same as illustrated in FIGS. 41 *and* 42 except for the inclusion of the cross-section taken along line A.

FIG. 44B illustrates a cross-section of the keyboard support member 50 along the line A of FIG. 44A according to an implementation. As discussed above, the keyboard support member 50 may produced using a double shot method of molding, where the keyboard support member 50 is initially formed by a first shot of molding, and then the support member bezel 52 is further defined by the second shot of molding. As a result, the support member bezel 52 may include two layers of materials (one from the first shot and another one from the second shot). As shown in FIG. 44B, the support member bezel 52 may include a first layer of material 82 from the first shot of molding. In one example, as shown in FIG. 44B, the entire keyboard support member 50 includes the first layer of material 82 (e.g., as shown by the crisscrossed lines). Also, the support member bezel 52 includes a second layer of material 84 from the second shot of molding, which may be injected below the first layer of material 82. The second layer of material 84 may further define the structure of support member bezel 52.

In one example, the interior lattice structure 54 may not include the second layer of material 84. As such, the lattice structure 54 may have a smaller depth than the support member bezel 52. Also, in one example, the first layer of material 82 may be different than the second layer of material 84. In another example, the first layer of material 82 may be the same as the second layer of material 84. In another example, the first layer of material 82 may be a different color than the second layer of material 84.

Figure 45:
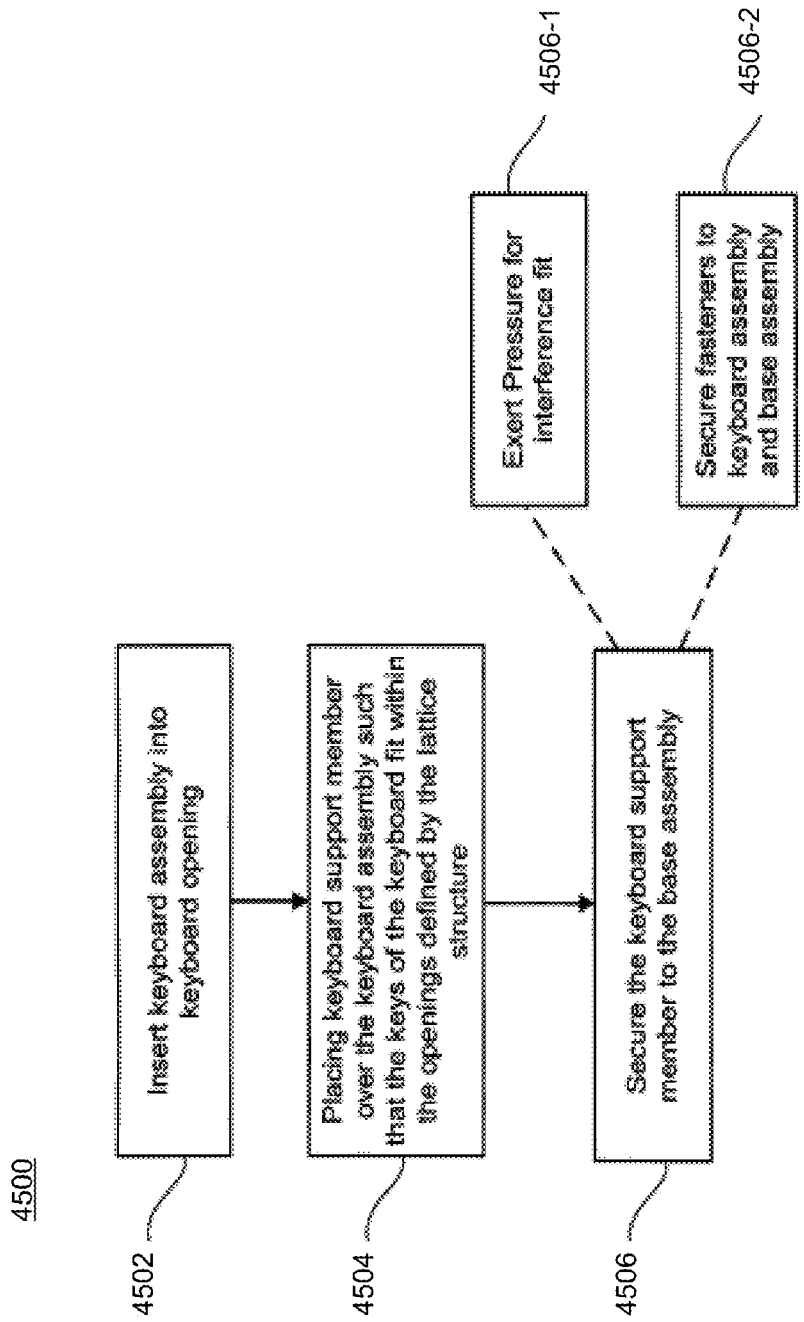
FIG. 45 illustrates a method of assembling the computing device.

FIG. 45 illustrates a method of assembling the computing device 10. In 4502, the keyboard assembly 70 may be inserted into the keyboard opening 30. For example, the computing device 10 may be configured such that keyboard assembly 70 can be externally assembled with the base assembly 12 independently of the assembly of the internal computer components or the assembly of the first housing 24 with the second housing 26. The computing device 10 can be configured such that substantially all of the components of the computing device 10 (excluding the keyboard assembly 70) can be assembled together before assembling the keyboard assembly 70 with the base assembly 12.

Then, the keyboard assembly 70 may be inserted into the keyboard opening 30. The keyboard opening 30 may be defined by the recess 32, which is defined by the first housing 24 that includes a lower surface 35 that is generally parallel to and positioned below the upper surface 28. A wall 36 may extend between the upper surface 28 and the lower surface 35 and may define an outer periphery of the recess 32 that extends from the periphery defined by the keyboard opening 30. The recess 32 may be formed along the wall 36 of the first housing 24 with a depth extending from the upper surface 28 to the lower surface 35. As such, the recess 32 from the upper surface 28 defines the keyboard opening 30.

Then, the wall 36 of the recess 32 and the periphery of the substrate 72 of the keyboard assembly 70 can be configured such that the substrate 72 can be received within the recess 32 with the lower surface 74 of the substrate 72 resting on the lower surface 35 of recess 32. The particular fit between the substrate 72 and the recess 32 can vary, but in the present example can be such that keyboard assembly 70 can be moved into the recess 32 without significant resistance but such that lateral movement of keyboard assembly 70 within the recess 32 is limited.

In 4504, the keyboard support member 50 is placed over the keyboard assembly 70 such that the keys 80 of the keyboard assembly 70 fit within the openings 56 defined by the lattice structure 54. For example, the keyboard support member 50 is placed on top of the keyboard assembly 70 such that the plurality of openings 56 defined by the lattice structure 54 fit around the keys 80. At least a portion of the keyboard support member 50 (e.g., a portion of the support member bezel 52) may contact the lower surface 35 of the recess 32.

In 4506, the keyboard support member 50 may be secured to the base assembly 12. For example, the keyboard support member 50 is coupled to the base assembly 12 with the keyboard assembly 70 located between the keyboard support member 50 and the base assembly 12. In one implementation, the support member bezel 52 may be configured to engage the wall 36 of the base assembly 12 and the keyboard assembly 70. The keyboard support member 50 may be secured to the base assembly 12 according to a number of different configurations.

In one example, in 4506-1, pressure may be applied to the keyboard support member 50 thereby creating an interference fit between the keyboard support member 50 and the base assembly 12. For example, the structure of the keyboard support member 50 may be dimensioned such that the keyboard support member 50 may fit around the keys 80, and in between the keyboard assembly 70 and the first housing 24. In particular, upon the application of downward pressure on the keyboard support member 50, the support member bezel 52 may engage the keyboard assembly 70 and the wall 36 such that the keyboard support member 50 is securely fixed.

In another example, in 4506-2, the keyboard support member 50 may be coupled to the base assembly 12 (e.g., the first housing 24) using a plurality of fasteners 46. The fasteners 46 may include threaded fasteners such as screws, or generally any type of fastener that capable of connecting two components together. In one example, the support member bezel 52 of the keyboard support member 50 may be coupled to the first housing 24 of the base assembly 12. As further explained below, the fasteners 46 may be positioned or threaded through the first housing 24 and through a portion of the keyboard support member 50.

The fasteners 46 may secure the keyboard support member 50 to the base assembly 12 at locations around the first housing 24 that correspond to the support member bezel 52. The fasteners 46 may be positioned or threaded through the first housing 24 (e.g., through the surface 45 to the lower surface 35) and engage the keyboard support member 50. The support member bezel 52 may be configured to receive at least a portion of the fastener 46.

According to one example, the keyboard support member 50 may include the plurality of receiving units including the receiving unit 39. For example, the receiving unit 39 may be configured to receive a portion of the fastener 46. In one example, the receiving unit 39 may be a channel or void in the support member bezel 52 that accepts or receives the fastener 46. In one example, the receiving unit 39 may be considered a screw boss.

In another implementation, as indicated above, the keyboard support member 50 may include openings positioned around the support member bezel 52, which are configured to initially receive the fasteners 46. For example, the fasteners 46 may be initially received by the surface of the keyboard support member 50 that is exposed to the user. Then, the fasteners 46 are configured to protrude from the keyboard support member 50 via the openings into the base assembly 12. In this configuration, the first housing 24 may include the plurality of receiving units, which are configured to receive the portions of the fasteners 46 extending out of the keyboard support member 50.

The following patent applications U.S. Ser. No. 14/041,496, U.S. Ser. No. 14/041,453, U.S. Ser. No. 14/041,466, and U.S. Ser. No. 14/041,483, all filed on Sep. 30, 2013, are all incorporated by reference herein in their entireties.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. An apparatus, comprising:
a display portion;
a base frame coupled to the display portion, the base frame including a channel defined by a top wall opposite a bottom wall and a side wall coupled to the top wall and to the bottom wall, the side wall having an outer surface defining at least a portion of an outer perimeter of the base frame,
the channel having a first side portion on a first side of the base frame, a second side portion on a second side of the base frame opposite the first side of the base frame, a distal portion, and a proximal portion,
the first side portion being aligned along a first longitudinal axis non-parallel to a second longitudinal axis along which the distal portion is aligned; and
a midplane having a first edge disposed in the first side portion of the channel and having a second edge disposed in the second side portion of the channel.

2. The apparatus of claim 1, wherein the midplane has a length between the first edge and the second edge that is greater than a length from an edge of the top wall of the first side portion of the channel to an edge of the top wall of the second side portion of the channel.

3. The apparatus of claim 1, wherein the top wall, the bottom wall, and the side wall are monolithically formed.

4. The apparatus of claim 1, wherein the first longitudinal axis is parallel to a third longitudinal axis along which the second side of the base frame is aligned.

5. The apparatus of claim 1, wherein the top wall is aligned along a first plane, the midplane is aligned a second plane parallel to the first plane.

6. The apparatus of claim 1, wherein the top wall has a least a portion defining a palm rest area and at least a portion defining a trackpad opening.

7. The apparatus of claim 1, wherein the top wall is aligned along a first plane, the top wall has a portion defining the distal portion of the channel and the bottom wall has a portion defining the distal portion of the channel, the portion of the top wall has an edge aligned along a second plane along which an edge of the portion of the bottom wall is aligned, the second plane is orthogonal to the first plane.

8. The apparatus of claim 1, wherein the side wall has a curved shape.

9. The apparatus of claim 1, wherein the distal portion is a first distal portion of the channel,
the apparatus further comprising:
a backbone component having a portion of a first end portion disposed in the distal portion of the channel and having a portion of a second end portion disposed in a second distal portion of the channel.

10. The apparatus of claim 1, wherein the first side portion has a cross-sectional profile that is substantially the same as the cross-sectional profile of the distal portion.

11. The apparatus of claim 1, wherein the midplane has a third edge aligned parallel to the second longitudinal axis and disposed within the proximal portion of the channel,
the midplane has a fourth edge opposite the third edge and aligned parallel to the second longitudinal axis, the third edge is disposed outside of the distal portion of the channel.

12. The apparatus of claim 1, wherein the distal portion of the channel is a first distal portion of the channel, the channel has a second distal portion aligned along the second longitudinal axis, the second distal portion of the channel has an end separated by a distance from an end of the first distal portion of the channel.

13. The apparatus of claim 1, wherein the first side portion of the channel and the distal portion of the channel each have a symmetrical cross-sectional profile, the proximal portion of the channel has an asymmetrical cross-sectional profile.

14. An apparatus, comprising:
a backbone component;
a display portion coupled to the backbone component;
a base frame including a channel defined by a top wall opposite a bottom wall and a side wall coupled to the top wall and to the bottom wall, the side wall having an outer surface defining at least a portion of an outer perimeter of the base frame,
the channel having a distal portion, a proximal portion, and a side portion,
the distal portion of the channel being aligned along a longitudinal axis substantially orthogonal to a longitudinal axis along which the side portion of the channel is aligned,
the backbone component having at least a portion disposed in a recess region of the distal portion.

15. The apparatus of claim 14, further comprising:
a midplane having an edge disposed in a recess region of the proximal portion and in a recess region of the side portion; and
a plate coupled to the midplane and to the backbone component.

16. The apparatus of claim 14, further comprising:
a midplane having an edge disposed in the a recess region of the proximal portion; and
a thermal bond film coupled between the midplane and an inner surface of the recess region of the proximal portion.

17. The apparatus of claim 14, wherein the top wall, the bottom wall and the side wall collectively define a shape having a curved surface.

18. The apparatus of claim 14, wherein the top wall, the bottom wall and the side wall collectively define a c-shape cross-sectional profile.

19. An apparatus, comprising:
a backbone component;
a display portion coupled to the backbone component;
a base frame coupled to the display portion, the base frame including a proximal channel portion on a front side of the base frame, a distal channel portion on a back side of the base frame opposite the front side of the base frame, and a side channel portion on a side of the base frame disposed between the back side and the front side of the base frame;
a midplane having a first edge disposed in the proximal channel portion and having a second edge disposed in the side channel portion, the backbone component having a portion disposed in the distal channel portion; and
a plate coupled to the backbone component and coupled to the midplane.

20. The apparatus of claim 19, wherein the backbone component includes a protrusion aligned with a recess of the midplane.

21. The apparatus of claim 19, the distal channel portion being aligned along a longitudinal axis orthogonal to the side channel portion and parallel to the proximal channel portion.

22. The apparatus of claim 19, wherein the distal channel portion is contiguous with the side channel portion.

23. The apparatus of claim 19, further comprising:
a thermal bond film disposed on the midplane and coupled to an inner surface of the proximal channel portion.

24. The apparatus of claim 19, wherein the distal channel portion defines a top wall opposite a bottom wall and a side wall coupled to the top wall and to the bottom wall, the side wall having an outer surface defining at least a portion of an outer perimeter of the base frame.

25. The apparatus of claim 19, wherein the distal channel portion defines a top wall opposite a bottom wall and a side wall coupled to the top wall and to the bottom wall, the bottom wall and the side wall collectively define a shape having a curved surface.

* * * * *

UNITED STATES PATENT AND TRADEMARK OFFICE
CERTIFICATE OF CORRECTION

| | | |
|---|---|---|
| PATENT NO. | : 8,861,191 B1 | Page 1 of 1 |
| APPLICATION NO. | : 14/041629 | |
| DATED | : October 14, 2014 | |
| INVENTOR(S) | : Michelle Yu et al. | |

It is certified that error appears in the above-identified patent and that said Letters Patent is hereby corrected as shown below:

In the Claims

In column 50, line 10, in claim 16, delete "the a" and insert -- the --, therefor.

Signed and Sealed this
Seventeenth Day of February, 2015

Michelle K. Lee
*Deputy Director of the United States Patent and Trademark Office*